US011543805B2

(12) United States Patent
Nixon et al.

(10) Patent No.: US 11,543,805 B2
(45) Date of Patent: Jan. 3, 2023

(54) SYSTEMS AND APPARATUS FOR DISTRIBUTION OF PROCESS CONTROL DATA TO REMOTE DEVICES

(71) Applicant: FISHER-ROSEMOUNT SYSTEMS, INC., Round Rock, TX (US)

(72) Inventors: Mark J. Nixon, Round Rock, TX (US); David R. Denison, Austin, TX (US); Hoa Van Lai, Austin, TX (US); Ken J. Beoughter, Round Rock, TX (US); Daniel R. Strinden, Austin, TX (US); Mariana Dionisio, Austin, TX (US); Kim Ordean Van Camp, Georgetown, TX (US); Matthew William Poplawski, Austin, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 0 days.

(21) Appl. No.: 15/623,653

(22) Filed: Jun. 15, 2017

(65) Prior Publication Data

US 2018/0109955 A1 Apr. 19, 2018

Related U.S. Application Data

(60) Provisional application No. 62/409,331, filed on Oct. 17, 2016.

(51) Int. Cl.
*G05B 19/418* (2006.01)
*G06F 16/248* (2019.01)
(Continued)

(52) U.S. Cl.
CPC ....... *G05B 19/41855* (2013.01); *G05B 15/02* (2013.01); *G06F 3/0482* (2013.01);
(Continued)

(58) Field of Classification Search
CPC .............. G05B 15/02; G05B 19/41855; G05B 2219/31105; G05B 2219/31246;
(Continued)

(56) References Cited

U.S. PATENT DOCUMENTS 5,432,932 A   7/1995   Chen
6,704,737 B1  3/2004   Nixon et al.
(Continued)

FOREIGN PATENT DOCUMENTS

CN    1534422 A    10/2004
CN    1950771 A    4/2007
(Continued)

OTHER PUBLICATIONS

Notice of Reason for Rejection for Japanese Application No. 2017-200617, dated Jul. 13, 2021.
(Continued)

*Primary Examiner* — Kendall Dolly
*Assistant Examiner* — Moeen Khan
(74) *Attorney, Agent, or Firm* — Marshall, Gerstein & Borun LLP

(57) ABSTRACT

A system for securely disseminating information relating to a process control plant includes a process control node and a controller that is coupled to a plurality of process control devices. The process control node includes a communicator module operable to transmit, via a first network, information of the process plant received from the controller. The system also includes a data services module operable to receive from the communicator module, via the first network, the information of the process plant and to transmit some or all of that information via a second network, and a mobile server, coupled to the second network and to a third network, and operable to receive data from the data services module.

(Continued)

The mobile server is operable to communicate with a plurality of mobile computing devices via the third network.

19 Claims, 36 Drawing Sheets

(51) Int. Cl.

| | | |
|---|---|---|
| G06F 16/951 | (2019.01) | |
| G06F 16/242 | (2019.01) | |
| H04L 12/40 | (2006.01) | |
| H04L 12/46 | (2006.01) | |
| H04W 12/06 | (2021.01) | |
| H04M 1/72472 | (2021.01) | |
| H04W 12/088 | (2021.01) | |
| H04L 65/70 | (2022.01) | |
| H04L 67/01 | (2022.01) | |
| H04L 67/75 | (2022.01) | |
| G05B 15/02 | (2006.01) | |
| H04L 41/0806 | (2022.01) | |
| H04L 43/10 | (2022.01) | |
| H04L 67/125 | (2022.01) | |
| H04L 67/00 | (2022.01) | |
| G06F 3/0482 | (2013.01) | |
| H04L 41/069 | (2022.01) | |
| H04L 43/045 | (2022.01) | |
| H04L 65/1083 | (2022.01) | |
| H04L 41/06 | (2022.01) | |
| H04L 9/40 | (2022.01) | |
| H04L 67/10 | (2022.01) | |
| H04L 67/55 | (2022.01) | |

(52) U.S. Cl.
CPC ........ *G06F 16/248* (2019.01); *G06F 16/2428* (2019.01); *G06F 16/951* (2019.01); *H04L 12/40* (2013.01); *H04L 12/4625* (2013.01); *H04L 41/06* (2013.01); *H04L 41/069* (2013.01); *H04L 41/0806* (2013.01); *H04L 43/045* (2013.01); *H04L 43/10* (2013.01); *H04L 63/0218* (2013.01); *H04L 65/1083* (2013.01); *H04L 65/70* (2022.05); *H04L 67/01* (2022.05); *H04L 67/10* (2013.01); *H04L 67/125* (2013.01); *H04L 67/34* (2013.01); *H04L 67/75* (2022.05); *H04M 1/72472* (2021.01); *H04W 12/06* (2013.01); *H04W 12/088* (2021.01); *G05B 2219/31105* (2013.01); *G05B 2219/31246* (2013.01); *G05B 2219/31457* (2013.01); *H04L 67/55* (2022.05); *Y02P 90/02* (2015.11)

(58) Field of Classification Search
CPC ............ G06F 3/0482; G06F 17/30398; G06F 17/30554; G06F 17/30864; H04L 12/40; H04L 12/4625; H04L 41/06; H04L 41/069; H04L 41/0806; H04L 43/045; H04L 43/10; H04L 63/0218; H04L 65/1083; H04L 65/607; H04L 67/10; H04L 67/125; H04L 67/34; H04L 67/36; H04L 67/42; H04M 1/72586; H04W 12/08; Y02P 90/14; Y02P 90/18
USPC ........................................................ 726/11
See application file for complete search history.

(56) References Cited

U.S. PATENT DOCUMENTS

| | | | |
|---|---|---|---|
| 6,775,707 B1* | 8/2004 | Bennett | H04L 1/1685 709/233 |
| 6,975,966 B2 | 12/2005 | Scott et al. | |
| 7,020,876 B1 | 3/2006 | Deitz et al. | |
| 7,162,534 B2* | 1/2007 | Schleiss | G06Q 10/06 709/232 |
| 7,206,646 B2 | 4/2007 | Nixon et al. | |
| 7,249,356 B1 | 7/2007 | Wilson et al. | |
| 7,272,531 B2 | 9/2007 | Kavaklioglu et al. | |
| 7,275,062 B2 | 9/2007 | Deitz et al. | |
| 7,574,509 B2* | 8/2009 | Nixon | H04W 72/02 709/228 |
| 7,647,126 B2 | 1/2010 | Blevins et al. | |
| 7,668,608 B2 | 2/2010 | Nixon et al. | |
| 7,934,251 B2 | 4/2011 | Hesselink | |
| 8,269,620 B2 | 9/2012 | Bullemer et al. | |
| 8,555,206 B2 | 10/2013 | Pederson et al. | |
| 9,122,764 B2 | 9/2015 | Neitzel et al. | |
| 9,323,247 B2 | 4/2016 | Dillon et al. | |
| 9,417,626 B2 | 8/2016 | Jones et al. | |
| 9,646,040 B2 | 5/2017 | Yu et al. | |
| 9,647,882 B1* | 5/2017 | Whittaker | H04L 41/08 |
| 9,778,626 B2 | 10/2017 | Nixon et al. | |
| 9,785,133 B2 | 10/2017 | Van Camp et al. | |
| 10,088,839 B2 | 10/2018 | Saravanapriyan et al. | |
| 10,095,202 B2 | 10/2018 | Maturana et al. | |
| 10,129,261 B2 | 11/2018 | Rauhala et al. | |
| 10,255,156 B2 | 4/2019 | Frenz et al. | |
| 10,338,549 B2 | 7/2019 | Nixon et al. | |
| 10,534,342 B2 | 1/2020 | Nixon et al. | |
| 10,539,936 B2 | 1/2020 | Nixon et al. | |
| 10,671,032 B2 | 6/2020 | Nixon et al. | |
| 10,809,702 B2 | 10/2020 | Nixon et al. | |
| 11,073,805 B2 | 7/2021 | Neitzel et al. | |
| 2002/0111948 A1* | 8/2002 | Nixon | G05B 19/4185 |
| 2003/0226056 A1 | 12/2003 | Yip | |
| 2005/0149481 A1 | 7/2005 | Hesselink | |
| 2006/0069689 A1 | 3/2006 | Karklins et al. | |
| 2007/0078530 A1* | 4/2007 | Blevins | G05B 13/041 700/29 |
| 2007/0139441 A1* | 6/2007 | Lucas | G06Q 10/06 345/619 |
| 2007/0142941 A1 | 6/2007 | McGreevy et al. | |
| 2008/0046104 A1 | 2/2008 | Van Camp et al. | |
| 2008/0082186 A1 | 4/2008 | Hood et al. | |
| 2008/0125877 A1 | 5/2008 | Miller et al. | |
| 2008/0294275 A1 | 11/2008 | Reichard | |
| 2009/0292915 A1* | 11/2009 | Sakane | H04L 63/08 713/155 |
| 2009/0307627 A1 | 12/2009 | Adams | |
| 2010/0082125 A1 | 4/2010 | Pingel et al. | |
| 2010/0082132 A1 | 4/2010 | Marruchella et al. | |
| 2011/0029102 A1 | 2/2011 | Campney et al. | |
| 2011/0230980 A1* | 9/2011 | Hammack | G05B 19/409 700/17 |
| 2011/0238780 A1 | 9/2011 | Neitzel et al. | |
| 2011/0239109 A1 | 9/2011 | Nixon et al. | |
| 2011/0280143 A1* | 11/2011 | Li | H04L 12/14 370/252 |
| 2012/0016999 A1 | 1/2012 | Kieselbach | |
| 2012/0030323 A1 | 2/2012 | Matsuno | |
| 2012/0078896 A1* | 3/2012 | Nixon | G06F 16/90 707/732 |
| 2012/0179802 A1 | 7/2012 | Narasimhan et al. | |
| 2012/0310388 A1 | 12/2012 | Karaffa et al. | |
| 2013/0006399 A1 | 1/2013 | Tandon et al. | |
| 2013/0041479 A1 | 2/2013 | Zhang et al. | |
| 2013/0080348 A1* | 3/2013 | Pantaliano | G06Q 30/02 705/347 |
| 2013/0211546 A1 | 8/2013 | Lawson et al. | |
| 2014/0036774 A1* | 2/2014 | Lehane | H04W 24/02 370/328 |
| 2014/0195844 A1 | 7/2014 | Laval et al. | |
| 2014/0250153 A1 | 9/2014 | Nixon et al. | |

(56) References Cited

U.S. PATENT DOCUMENTS

| | | | |
|---|---|---|---|
| 2014/0277604 A1 | 9/2014 | Nixon et al. | |
| 2015/0005903 A1* | 1/2015 | Worek | G05B 19/41885 700/44 |
| 2015/0105875 A1 | 4/2015 | Tran et al. | |
| 2015/0106753 A1 | 4/2015 | Tran et al. | |
| 2016/0028650 A1* | 1/2016 | Agarwal | H04L 67/1014 709/203 |
| 2016/0066189 A1* | 3/2016 | Mahaffey | G06F 21/88 455/405 |
| 2016/0132538 A1 | 5/2016 | Bliss et al. | |
| 2016/0147206 A1 | 5/2016 | Neitzel et al. | |
| 2016/0147919 A1* | 5/2016 | Yabe | H04L 12/2816 700/275 |
| 2016/0182247 A1* | 6/2016 | Cregg | H04L 12/282 700/9 |
| 2016/0292046 A1 | 10/2016 | Botarelli | |
| 2016/0292895 A1 | 10/2016 | Billi et al. | |
| 2016/0337863 A1* | 11/2016 | Robinson | H04W 12/08 |
| 2016/0337962 A1* | 11/2016 | Peng | H04L 12/6418 |
| 2016/0349726 A1 | 12/2016 | Srinivasan | |
| 2017/0126843 A1 | 5/2017 | Pantea | |

FOREIGN PATENT DOCUMENTS

| | | |
|---|---|---|
| CN | 1969587 A | 5/2007 |
| CN | 101145228 A | 3/2008 |
| CN | 101169648 A | 4/2008 |
| CN | 101488104 A | 7/2009 |
| CN | 101610190 A | 12/2009 |
| CN | 101821688 A | 9/2010 |
| CN | 102063111 A | 5/2011 |
| CN | 102326128 A | 1/2012 |
| CN | 104049575 A | 9/2014 |
| CN | 104050182 A | 9/2014 |
| CN | 104254810 A | 12/2014 |
| CN | 104698948 A | 6/2015 |
| CN | 104950741 A | 9/2015 |
| CN | 105589349 A | 5/2016 |
| CN | 105593826 A | 5/2016 |
| CN | 105629924 A | 6/2016 |
| CN | 106020138 A | 10/2016 |
| EP | 2 760 179 A1 | 7/2014 |
| GB | 2 479 036 A | 9/2011 |
| GB | 2 556 444 A | 5/2018 |
| GB | 2 535 597 B | 11/2021 |
| JP | H06-333185 A | 12/1994 |
| JP | 2000-353010 A | 12/2000 |
| JP | 2001-184250 A | 7/2001 |
| JP | 2002-278684 A | 9/2002 |
| JP | 2003-223218 A | 8/2003 |
| JP | 2004-54848 A | 2/2004 |
| JP | 2004-227215 A | 8/2004 |
| JP | 2004-272914 A | 9/2004 |
| JP | 2005-239295 A | 9/2005 |
| JP | 2005-531826 A | 10/2005 |
| JP | 2008-147892 A | 6/2008 |
| JP | 2010-250841 A | 11/2010 |
| JP | 2011-164958 A | 8/2011 |
| JP | 2011-204237 A | 10/2011 |
| JP | 2011-204238 A | 10/2011 |
| JP | 2011-243128 A | 12/2011 |
| JP | 2012-513066 A | 6/2012 |
| JP | 2013-165491 A | 8/2013 |
| JP | 2014-149703 A | 8/2014 |
| JP | 2014-178891 A | 9/2014 |
| JP | 2014-186746 A | 10/2014 |
| JP | 2014-209346 A | 11/2014 |
| JP | 2014-233060 A | 12/2014 |
| JP | 2014-238819 A | 12/2014 |
| JP | 2015-187873 A | 10/2015 |
| JP | 2016-029587 A | 3/2016 |
| JP | 2016-105331 A | 6/2016 |
| JP | 2016-115358 A | 6/2016 |
| WO | WO-03/075206 A2 | 9/2003 |
| WO | WO-2016/054541 A1 | 4/2016 |

OTHER PUBLICATIONS

Notice of Reason for Rejection for Japanese Application No. 2017-200620, dated Jul. 13, 2021.
Notice of Reason for Rejection for Japanese Application No. 2017-200619, dated Jul. 6, 2021.
Notice of Reason for Rejection for Japanese Application No. 2017-200621, dated Jul. 6, 2021.
Notification of the First Office Action for Chinese Application No. 201710962903.1, dated Sep. 29, 2021.
Notification of the First Office Action for Chinese Application No. 201710962946.X, dated Oct. 9, 2021.
Notification of the First Office Action for Chinese Application No. 201710965444.2, dated Oct. 11, 2021.
Notice of Reason for Rejection for Japanese Application No. 2017-200618, dated Jul. 6, 2021.
Examination Report for Application No. GB1808973.0, dated Nov. 23, 2021.
Notification of the First Office Action for Chinese Application No. 201710967124.0, dated Sep. 29, 2021.
Notification of the First Office Action for Chinese Application No. 201710967123.6, dated Sep. 23, 2021.
Examination Report for Application No. GB1 808973.0, dated Jun. 20, 2022.
Notice of Reason for Rejection for Japanese Application No. 2018-111141, dated Jun. 28, 2022.
Notification of the Second Office Action for Chinese Application No. 201710962903.1, dated Apr. 21, 2022.
Notification of the Second Office Action for Chinese Application No. 201710965444.2, dated Apr. 27, 2022.
Office Action for Japanese Application No. 2017-200618, dated Jul. 6, 2022.
Examination Report for Application No. GB1716562.2, dated Mar. 16, 2022.
Examination Report for Application No. GB1716563.0, dated Mar. 16, 2022.
Examination Report for Application No. GB1716565.5, dated Mar. 16, 2022.
Examination Report for Application No. GB1715911.2, dated Mar. 16, 2022.
Examination Report for Application No. GB1716564.8, dated Mar. 16, 2022.
Decision of Rejection for Chinese Application No. 201710965444. 2, dated Aug. 31, 2022.
Notice of Reason for Rejection for Japanese Application No. 2017-200621, dated Sep. 20, 2022.
Notification of the Second Office Action for Chinese Application No. 201710962946.X, dated Jul. 13, 2022.
Examination Report for Application No. GB1808973.0, dated Oct. 20, 2022.

* cited by examiner

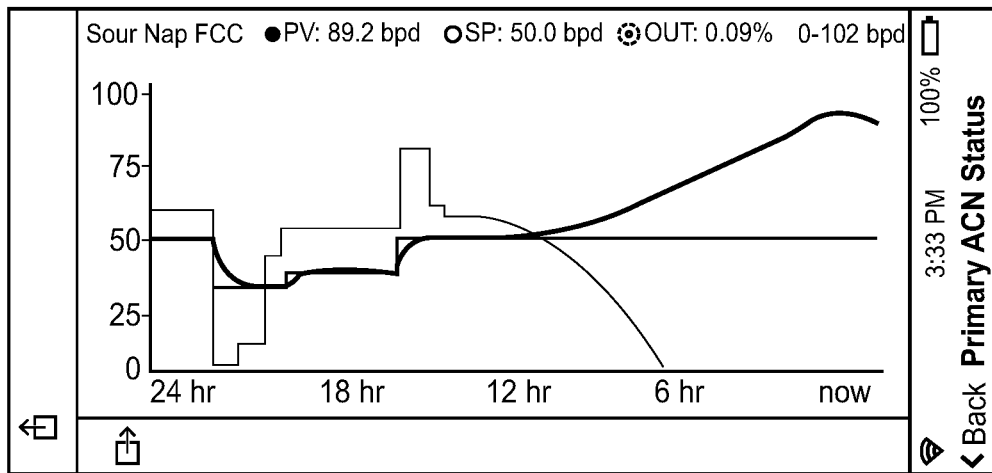
FIG. 1K
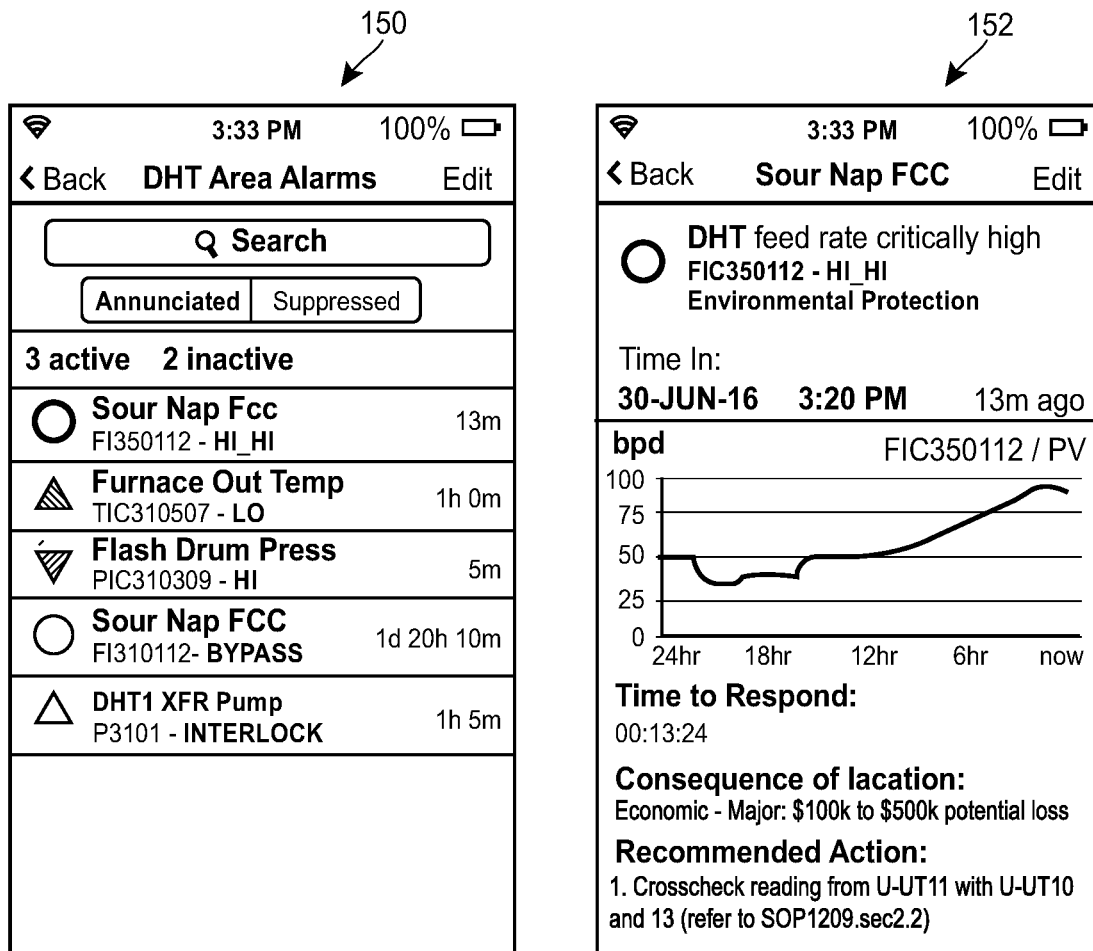
FIG. 1I
FIG. 1J

| 3:33 PM | 100% 🔋 |
| Home | Edit |

🔔 ⚙️

🔍 Search

| All Lists | Watch Lists | Alarm Lists |

🔔 DHT Area Alarms   FIC350112 - HI_HI
30 active 3 inactive 5 suppressed

⊥ DHT1
6 items 2 abnormal   TIC310507 - LO

🔔 Utilities Alarms
12 active 4 inactive 5 suppressed

⊥ DHT2
7 items 0 abnormal   PIC310309 - HI

🔔 Safety Alarms
0 active 3 inactive 0 suppressed

[ Show Shared Lists ]

| 3:33 PM | 100% 🔋 |
| Home | Edit |

🔔 ⚙️

🔍 Search

| All Lists | Watch Lists | Alarm Lists |

🔔 DHT Area Alarms   FIC350112 - HI_HI
30 active 3 inactive 5 suppressed

⊥ DHT1
6 items 2 abnormal   TIC310507 - LO

🔔 Utilities Alarms
12 active 4 inactive 5 suppressed

⊥ DHT2
7 items 0 abnormal   PIC310309 - HI

🔔 Safety Alarms
0 active 3 inactive 0 suppressed

Shared Lists

🔔 Shared Lists 1   FIC350112 - HI_HI
30 active 3 inactive 5 suppressed

⊥ Shared Lists 2   TIC310507 - LO
12 active 4 inactive 5 suppressed

⊥ Shared Lists 3
6 items 2 abnormal

[ Hide Shared Lists ]

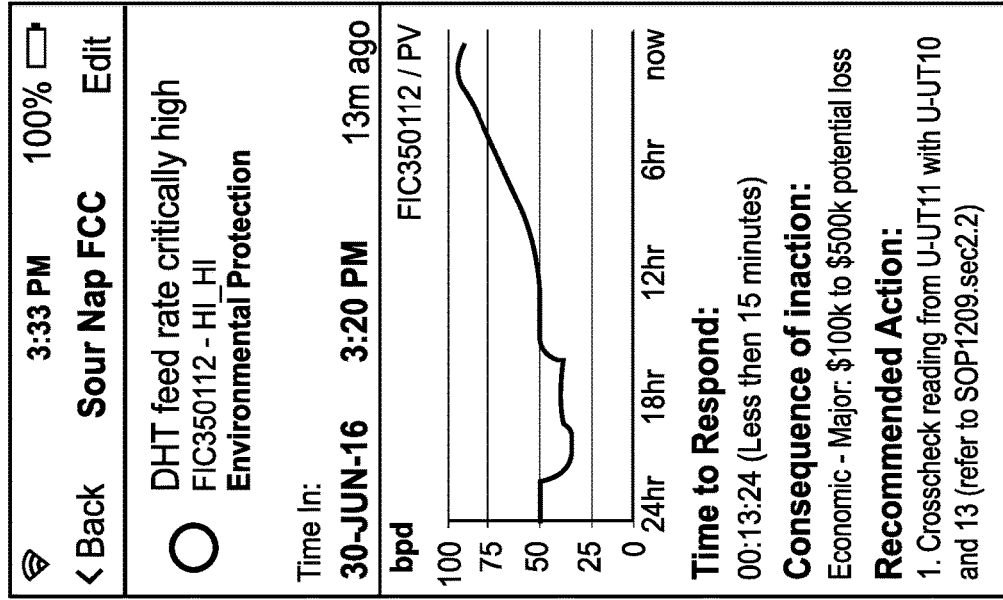

FIG. 3T

SYSTEMS AND APPARATUS FOR DISTRIBUTION OF PROCESS CONTROL DATA TO REMOTE DEVICES

FIELD OF THE DISCLOSURE

The present disclosure generally relates to mobile monitoring of process control environments and, in particular, to a system for providing customizable, real-time awareness of process control systems on a plurality of mobile devices.

BACKGROUND

Distributed control systems (DCS) are used in a variety of process industries including chemical, petrochemical, refining, pharmaceutical, food and beverage, power, cement, water and wastewater, oil and gas, pulp and paper, and steel, and are used to control batch, fed-batch, and continuous processes operating at a single site or at remote locations. Process plants typically include one or more process controllers communicatively coupled to one or more field devices via analog, digital or combined analog/digital buses, or via a wireless communication link or network. Collectively, the various devices perform monitoring, control, and data collection functions to control the process, safety shutdown systems, fire and gas detection systems, machine health monitoring systems, maintenance systems, decision support, and other systems.

The field devices, which may be, for example, valves, valve positioners, switches and transmitters (e.g., temperature, pressure, level and flow rate sensors), are located within the process environment and generally perform physical or process control functions such as opening or closing valves, measuring process parameters, etc. to control one or more process executing within the process plant or system. Smart field devices, such as the field devices conforming to the well-known Fieldbus protocol may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART®, WirelessHART®, and FOUNDATION® Fieldbus field devices. The control modules in the controller send the control signals over the communication lines or links to the field devices to thereby control the operation of at least a portion of the process plant or system.

Information from the field devices and the controller is usually made available over a data highway to one or more other hardware devices, such as operator workstations, personal computers or computing devices, data historians, report generators, centralized databases, or other centralized administrative computing devices that are typically placed in control rooms or other locations away from the harsher plant environment. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers and field devices may include a wired communication path, a wireless communication path, or a combination of wired and wireless communication paths.

As an example, the DeltaV™ control system, sold by Emerson Process Management, includes multiple applications stored within and executed by different devices located at diverse places within a process plant. A configuration application, which resides in one or more workstations or computing devices, enables users to create or change process control modules and download these process control modules via a data highway to dedicated distributed controllers. Typically, these control modules are made up of communicatively interconnected function blocks, which are objects in an object oriented programming protocol that perform functions within the control scheme based on inputs thereto and that provide outputs to other function blocks within the control scheme. The configuration application may also allow a configuration engineer to create or change operator interfaces which are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

In many distributed process control systems, each field device in the process plant is assigned a unique device tag. The unique device tag provides an easy way to reference the corresponding field device. Device tags may be used during the configuration of the process control system to specify the source or destination, respectively, of an input or output to a function block in a control module. Each signal type has associated with it a particular format or set of information, and the device tag for a particular device may have associated with it a specific signal type such that when the device tag is associated with an input or output of a function block, the function block knows the format and information associated with the signal. In cases in which a field device has multiple signals associated with it (e.g., a valve may measure and transmit both pressure and temperature), device signal tags may be associated with each signal of the field device.

For a variety of reasons, access to data of the process control system has traditionally been available only while on the process plant premises and/or while using a device connected to the data highway that couples the operator workstations, controllers, data historians, and other equipment. Security is a particular concern with respect to process control systems and, as such, process control system operators generally physically separate the process control system from external network environments (e.g., the internet) to limit or prevent opportunities for outside actors to cause damage to the process control system, affect product quality or viability, or access or steal proprietary information.

More recently, a few mobile solutions have emerged that allow users to view some information from the process control system via mobile devices such as smart phones, even when not coupled directly to the process networks and data highways that make up the process plant. These solutions allow monitoring of a single data source such as a data historian, and so the available data are limited to those data that are stored in the data historian (i.e., a small subset of the total data in the process plant). Additionally, even the data that are available via such systems are not available in real-time (because of the frequency with which data are stored to the data historian). Further, due to the delays in data availability, and the limited subset of data available, alarms are generally not available via the mobile systems presently offered and, to the extent alarm-like functionality may be available on some mobile systems, the alarms are either not "native" to the process control system (i.e., they are provided as a layer on top of the mobile system and require extensive and time-consuming engineering to implement) or lack the real-time and historical data necessary to evaluate and troubleshoot the alarms.

SUMMARY

Some aspects of the systems and methods as described herein relate to secure and timely communication of process data from a process control system of a process plant to remote computing devices. The systems and methods may allow secure access to any process data within the process control system in real-time via a mobile server receiving the process data from a data server, which in turn obtains the process data from the process control system in real-time as the data values are generated by or received by controllers within the process control system.

In embodiments, a system for securely disseminating information relating to a process control plant includes a process control node comprising a plurality of process control devices, operable to control a process in the process plant, and a controller, coupled to the plurality of process control devices. The process control node includes a communicator module operable to transmit, via a first network, information of the process plant received from the controller. The system also includes a data services module operable to receive from the communicator module, via the first network, the information of the process plant and to transmit some or all of that information via a second network, and a mobile server, coupled to the second network and to a third network, and operable to receive data from the data services module, the mobile server coupled to a third network. The mobile server is operable to communicate with a plurality of mobile computing devices via the third network, receive from each of the mobile computing devices a selection of one or more alarms, one or more process control parameters, and/or one or more notifications to be transmitted to the respective mobile computing device from the mobile server, and transmit to each of the mobile computing devices data of the selected notifications, alarms, and/or process control parameters according to the selection received from the respective mobile computing device.

In other embodiments, a mobile server, coupled to a first network and receiving from the first network information about a process control system, and to a second network coupled to a plurality of mobile computing devices, is operable to receive data from a data services module. The mobile server is further operable to receive from each of the mobile computing devices a selection of one or more alarms, one or more process control parameters, and/or one or more notifications to be transmitted to the respective mobile computing device from the mobile server, and to transmit to each of the mobile computing devices data of the selected notifications, alarms, and/or process control parameters according to the selection received from the respective mobile computing device.

BRIEF DESCRIPTION OF THE DRAWINGS

The features and advantages of the methods, apparatus, and systems described herein will be best appreciated upon reference to the following detailed description and the accompanying drawings, in which:

FIG. 1I depicts an example alarm list display according to the present description;

FIG. 1J depicts a display that may be generated for a particular alarm in the alarm list of FIG. 1I;

FIG. 1K depicts an alternate display of the information in FIG. 1H, that may be shown when a device is rotated to landscape orientation;

FIG. 3B is an example representation of a list of lists GUI executing on a mobile computing device;

FIG. 3C is an example representation of a list of lists GUI executing on a mobile computing device;

FIG. 3G is an example representation of an alarm list GUI executing on a mobile computing device;

FIG. 3H is an example representation of an alarm item GUI executing on a mobile computing device;

FIG. 3T is an example representation of a user access interface executing on a mobile computing device.

DETAILED DESCRIPTION

As described above, known distributed process control systems lack the ability for operators, maintenance personnel, and others associated with a process control system to maintain situational awareness when away from operator workstations and/or away from the physical location of the process plant. As a result, plant personnel are unable to observe the operation of the process control system and process plant unless they are physically present. Because process plants typically operate with multiple shifts, the observation and operation of the process plant is often handed off multiple times each day. While plant personnel on a particular shift may leave notes for those people on the following shifts, these shift changes result in discontinuities in the operation and management of the processes and equipment, which can have deleterious effects on product quality, plant efficiency, maintenance, environmental safety, regulatory compliance, and other aspects of process plant management. Implementations of the systems, devices, and methods for mobile information distribution described herein can mitigate many of the discontinuities resulting from such shift changes, and the issues associated therewith, provide increased situational awareness for plant personnel, and result in additional advantages that will become apparent throughout the following disclosure.

Figure 1A:
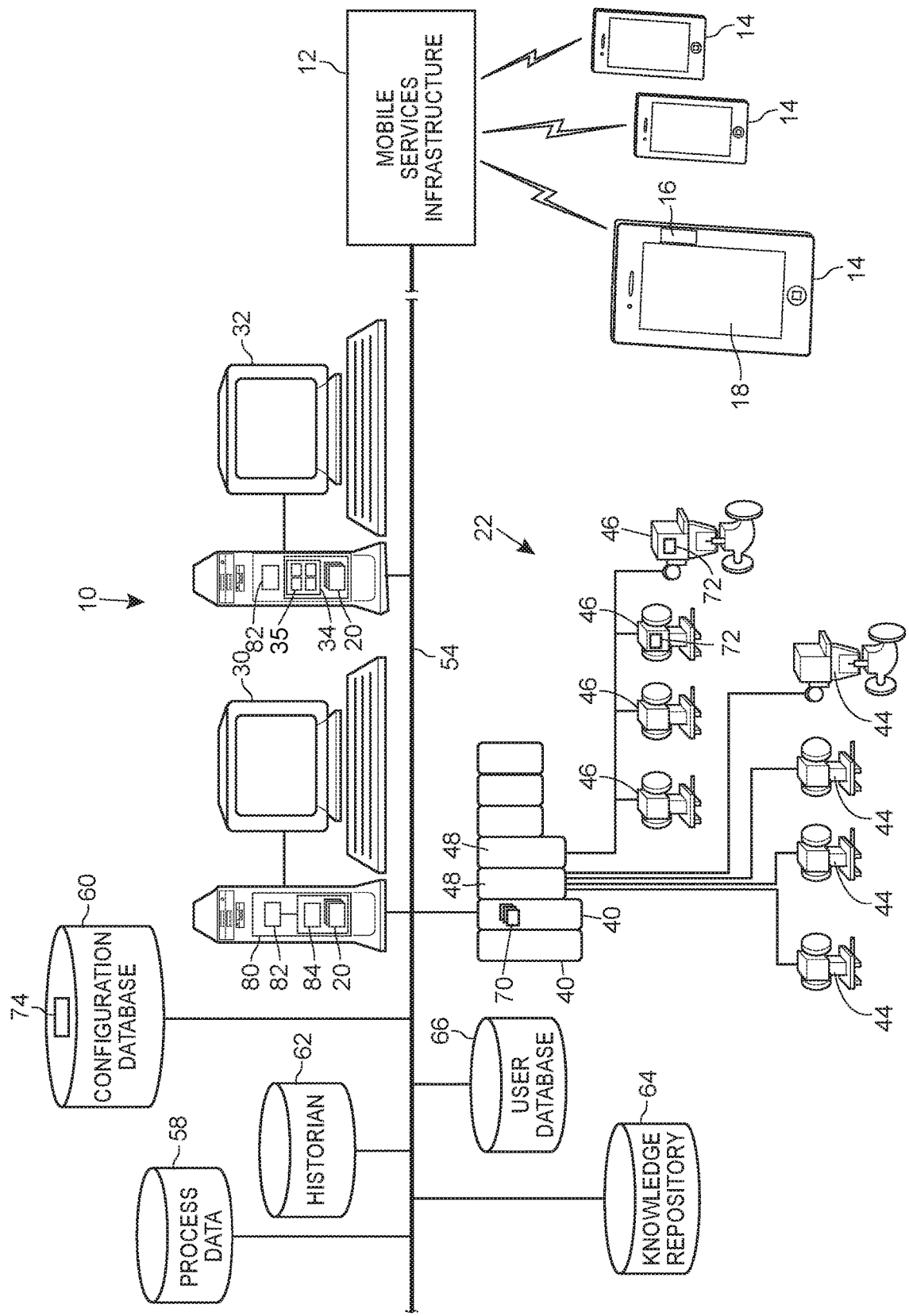
FIG. 1A is a block diagram of an example process control environment according to the present description.

FIG. 1A illustrates an example process plant network 10 including mobile services infrastructure 12 for supporting a plurality of mobile devices 14, not necessarily located on the process plant premises, having access to data associated with the process plant. As will be described in detail herein, the mobile services infrastructure 12 facilitates real-time communication to the mobile devices 14 of any of the process plant data available within the process control plant network 10, while maintaining the security of the process plant network 10. Each of the mobile devices 14 includes, among other elements, an application 16 executable by the mobile device 14 to allow a user to interact with the process plant data via a graphical user interface (GUI) 18.

In general, plant personnel utilize one or more applications 20 to supervise or control the operation of the process plant 10 and a distributed control system 22 implemented within the process plant 10. The viewing or monitoring applications 20 generally include a user interface application that uses various different displays to graphically depict process graphics to each of the operator and the maintenance technician and/or other users at workstations, such as workstations 30 and 32.

The process plant environment of FIG. 1A also includes a graphical configuration system 34. The graphical configuration system 34 generally facilitates the creation of control and monitoring schemes, including graphical displays, for control of the process plant. The graphical configuration system 34 may include, for example, a configuration editor 35 that can be used to control modules and control module templates, graphical displays and templates, and other aspects of the control system, that are stored in a library, and that can be subsequently used create instances or usages that are actually executed in the control of the process plant by downloading instances of the control modules to a controller, or by executing instances of the graphical displays in user displays presented to, for example, the operator and maintenance person, during operation of the plant 10. Of course, each of the graphics configuration system 34, the configuration editor 35, and the various control modules, templates, and graphical displays may be stored in a tangible computer readable memory or medium and execute on one or more processors to perform the functions described herein.

As is typical, the distributed process control system 22 illustrated in FIG. 1A has one or more controllers 40, each of which is connected to one or more field devices 44 and 46 (which may be smart devices) via input/output (I/O) devices or cards 48 which may be, for example, Fieldbus interfaces, Profibus interfaces, HART interfaces, standard 4-20 ma interfaces, etc. The controllers 40 are also coupled to the one or more host or operator workstations 30-32 via a data highway 54 which may be, for example, an Ethernet link. A process data database 58 may be connected to the data highway 54 and operates to collect and store process variable, process parameter, status and other data associated with the controllers, field devices and any other devices within the plant 10. During operation of the process plant 10, the process data database 58 may receive process data from the controllers 40 and, indirectly, the field devices 44-46 via the data highway 54.

A configuration database 60 stores the current configuration of the distributed control system 22 within the plant 10 as downloaded to and stored within the controllers 40 and field devices 44, 46. The configuration database 60 stores process control functions defining the one or several control strategies of the distributed control system 22, configuration parameters of the devices 44, 46, the assignment of the devices 44, 46 to the process control functions, and other configuration data related to the process plant 10. The configuration database 60 may additionally store graphical objects or user displays as well as configuration data associated with these objects or displays as described in more detail herein to provide various graphical representations of elements within the process plant 10. Some of the stored graphical objects may correspond to process control functions (e.g., a process graphic developed for a certain PID loop), and other graphical objects may be device-specific (e.g., a graphic corresponding to a pressure sensor).

A data historian 62 (another database) stores events, alarms, comments and courses of action taken by operators. The events, alarms, and comments may pertain to individual devices (e.g., valves, transmitters), communication links (e.g., wired Fieldbus segments, WirelessHART communication links), or process control functions (e.g., a PI control loop for maintaining a desired temperature set point). Further, a knowledge repository 64 stores references, operator logbook entries, help topics, or links to these and other documentation that operators and maintenance technicians may find useful when supervising the process plant 10. Still further, a user database 66 stores information about users such as the operator and the maintenance technician. For each user, the user database 66 may store, for example, his or her organizational role, the user's span of control, an area within the process plant 10 with which the user is associated, work team association, security information, system privileges, shift information, etc.

Each of the databases 58-66 may be any desired type of data storage or collection unit having any desired type of memory and any desired or known software, hardware or firmware for storing data. Of course, the databases 58-66 need not reside in separate physical devices. Thus, in some embodiments, some of the databases 58-66 may be implemented on a shared data processor and memory. In general, it is also possible to utilize more or fewer databases to store the data collectively stored and managed by the databases 58-66 in the example system of FIG. 1A.

While the controllers 40, I/O cards 48 and field devices 44, 46 are typically located down within and distributed throughout the sometimes harsh plant environment, the operator workstations 30 and 32 and the databases 58-66 are usually located in control rooms or other less harsh environments easily assessable by controller, maintenance, and various other plant personnel. However, in some cases, handheld devices coupled to the data highway 54 may be used to implement these functions and these handheld devices are typically carried to various places in the plant. Such handheld devices, and in some cases, operator workstations and other display devices may be connected to the DCS 22 via wireless communication connections. The handheld devices are distinguished from the mobile devices 14 in that the mobile devices are not necessarily present on the process plant premises and need not be coupled directly (via wired or wireless means) to the data highway 54.

As is known, each of the controllers 40, which may be, by way of example, the DeltaV™ controller sold by Emerson Process Management, stores and executes a controller application that implements a control strategy using any number of different, independently executed, control modules or blocks 70. Each of the control modules 70 can be made up of what are commonly referred to as function blocks wherein each function block is a part or a subroutine of an overall control routine and operates in conjunction with other function blocks (via communications called links) to implement process control loops within the process plant 10. As is well known, function blocks, which may be objects in an object oriented programming protocol, typically perform one of an input function, such as that associated with a transmitter, a sensor or other process parameter measurement device, a control function, such as that associated with a control routine that performs PID, fuzzy logic, etc., control, or an output function that controls the operation of some device, such as a valve, to perform some physical function within the process plant 10. Of course hybrid and other types of complex function blocks exist, such as model predictive controllers (MPCs), optimizers, etc. While the Fieldbus protocol and the DeltaV system protocol use control modules and function blocks designed and implemented in an object oriented programming protocol, the control modules could be designed using any desired control programming scheme including, for example, sequential function block, ladder logic, etc., and are not limited to being designed and implemented using the function block or any other particular programming technique. Each of the controllers 40 may also support the AMS® suite of applications sold by Emerson Process Management and may use predictive intelligence to improve availability and performance of production assets including mechanical equipment, electrical systems, process equipment, instruments, non-smart and smart field devices 44, 46, etc.

As described, the DCS 22 includes one or more of the controllers 40 communicatively coupled to the workstation(s) 30, 32 in the control room. The controllers 40 automate control of the field devices 44, 46 in the process area by executing process control strategies implemented via the workstations 30, 32. An example process strategy involves measuring a pressure using a pressure sensor field device and automatically sending a command to a valve positioner to open or close a flow valve based on the pressure measurement. The I/O cards 48 translate information received from the field devices 44, 46 to a format compatible with the controllers 40 and translate information from the controllers 40 to a format compatible with the field devices 44, 46.

Through the I/O cards 48, the controller 40 may communicate with the field devices 44, 46 according to the control modules 70 that have been downloaded to the controller 40. The control modules 70 are programmed using the configuration system 34. In the configuration system 34, an engineer may create the control modules 70 by, for instance, instantiating one or more function blocks. By way of example, the configuration engineer may instantiate an AI function block to receive an analog input from one of the field devices 44, 46, which AI function block may receive a variety of values (e.g., a signal value, alarm hi and low limits, a signal status, etc.) associated with the analog output of the field device 44, 46. The AI function block may output a corresponding signal to another function block (e.g., a proportional-integral-derivative (PID) control function block, a custom function block, a display module, etc.) Once the AI function block is instantiated, associating the function block with a unique device tag associated with the field device 44, 46 will cause the function block, once downloaded to the controller 40, to cooperate with the appropriate I/O card 48 to process information from the correct field device 44, 46.

In the plant network 10 illustrated in FIG. 1A, the field devices 44, 46 connected to the controllers 40 may be standard 4-20 ma devices, may be smart field devices, such as HART®, Profibus, or FOUNDATION® Fieldbus field devices, which include a processor and a memory, or may be any other desired type of devices. Some of these devices, such as Fieldbus field devices (labeled with reference number 46 in FIG. 1A), may store and execute modules, or sub-modules, such as function blocks, associated with the control strategy implemented in the controllers 40 or which perform other actions within the process plant, such as data collection, trending, alarming, calibration, etc. Function blocks 72, which are illustrated in FIG. 1A as being disposed in two different ones of the Fieldbus field devices 46, may be executed in conjunction with the execution of the control modules 70 within the controllers 40 to implement process control, as is well known. Of course, the field devices 44, 46 may be any types of devices, such as sensors, valves, transmitters, positioners, etc., and the I/O devices 48 may be any types of I/O devices conforming to any desired communication or controller protocol such as HART, Fieldbus, Profibus, etc.

With continued reference to FIG. 1A, the workstations 30 and 32 may include various applications that are used for various different functions performed by the personnel within the plant 10. Each of the workstations 30 and 32 includes a memory 80 that stores various applications, programs, data structures, etc., and a processor 82 which may be used to execute any of the applications stored in the memory 80. In the example illustrated in FIG. 1A, the workstation 30 also includes, in addition to the display and viewing application 20, one or more process controller configuration applications 84 which may include, for example, control module creation applications, operator interface applications and other data structures which can be accessed by any authorized configuration engineer to create and download control routines or modules, such as the control modules 70 and 72, to the various controllers 40 and devices 46 of the plant 10. The configuration applications 84 also include the display or graphical configuration system 34 having the configuration editor 35, which may be used to create the control modules 70.

Broadly speaking, the viewing application 20 allows operators to view display modules configured to provide specific information about the operation of specific areas of the process plant 10, and to control the operation of the process plant 10 according to the information on the display modules. The display modules are rendered on the workstations 30, 32, and incorporate real-time process data received from the controllers 40 and the field devices 44, 46. As used herein, "real-time" communication of data refers to electronic communication of data through electronic communication networks with ordinary delays for processing, routing, and transmission, without the intentional introduction of additional non-trivial delays. In some embodiments, trivial delays of less than five seconds (and preferably less than two seconds) may be introduced to reduce network congestion when communicating data in real-time. The display modules may be any type of interface that, for example, enables an operator or other use to manipulate data values (e.g., perform reads or writes) to monitor or alter operation of the field devices 44, 46, the control modules 70 and function blocks 72, and the DCS 22 and process plant 10 as a whole. The display modules may be stored in the memory 80 of the workstations 30, 32, and may also be stored in the configuration database 60.

The control modules 70 and, in some embodiments, the display modules may be part of a configuration file 74 in the configuration database 60. That is, the control modules 70 may be stored in the configuration file 74 together with the display modules or separately from the display modules. In any event, the configuration file 74 generally stores the entire configuration of the DCS 22, including devices, device tags, friendly names, data formatting information (e.g., scaling information, unit types, etc.) which variables are associated with each control loop, the control strategies defined, etc. As indicated previously, the configuration file 74 may also be downloaded to the controllers 40 to implement the control strategies defined in the configuration file 74.

As will be appreciated, the process plant 10 may include many hundreds, thousands, or even tens of thousands of signals, output from transmitters (i.e., sensors) on hundreds or thousands of field devices 44, 46, and/or input to those field devices 44, 46 to cause the field devices 44, 46 to perform control functions according to the control strategies programmed into the control modules 70. The plant 10 may be divided into different areas, multiples of which areas may be controlled by a single controller 40, each of which areas may be controlled by a single controller or multiple controllers 40, or some combination. In any event, the field devices 44, 46 that make up the process plant 10 are likely to be duplicated individually many times over in the process plant 10 (e.g., there may be many of any type of valve, many pumps, many heaters, many tanks, etc.). The field devices 44, 46 may also be combined into functional groups within a physical area ("process areas"), in which the field devices 44, 46 in that process area perform a specific portion of the overall process. For instance, a particular process area may have the equipment for generating steam for other parts of the process. Within the process areas, there may be duplicated pieces or groups of equipment ("process units") that share a similar construction and function. As an example, a process unit in the steam generation process area may include a boiler and a turbo generator, and the process area may include multiple instances of this process unit.

Figure 1B:
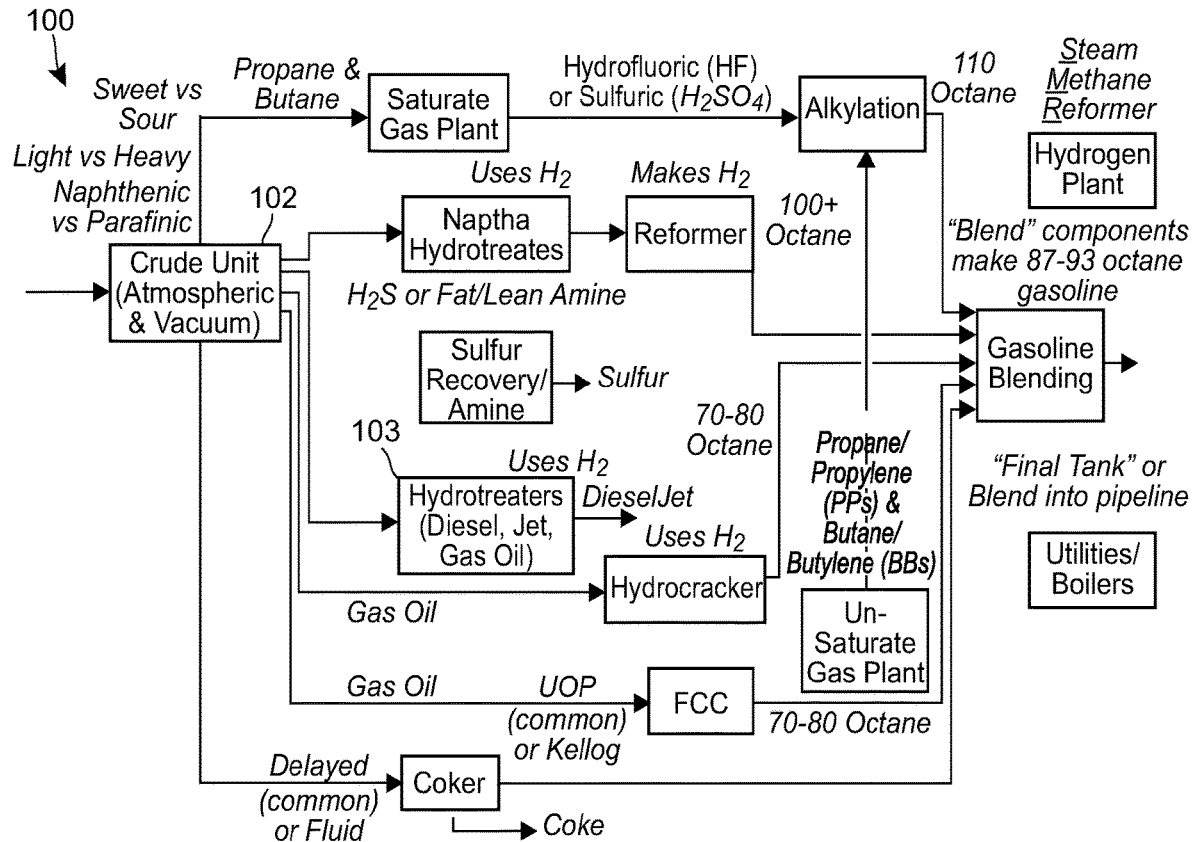
FIG. 1B is a flow diagram illustrating an example process in a process control environment.

By way of example, FIG. 1B depicts a flow diagram 100 illustrating the process for converting crude oil to other fuel products. At the entry point to the refining process, a crude unit 102 separates the components and distributes them for further downstream processing by other units. Each of the units may include a variety of equipment such as pumps, compressors, heat exchangers, reactors, tanks, separation and distillation columns, as well as a variety of valves, transmitters, pumps, and the like. Many of the units may include common processing equipment. For example, heaters may be used in different ones of the units.

Figure 1C:
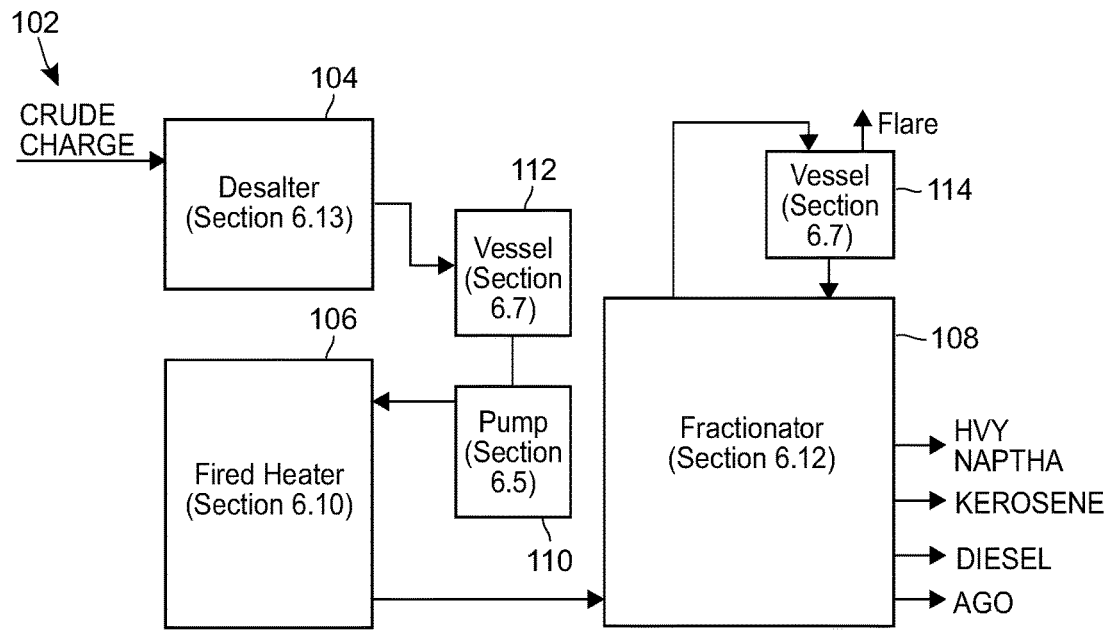
FIG. 1C is a block diagram of an individual unit within the example process of FIG. 1B.

With reference to FIG. 1C, which depicts a block diagram of the crude unit 102, the crude unit 102 includes a variety of field devices. While FIG. 1C depicts a desalter 104, a fired heater 106, a fractionator 108, a pump 110, and vessels 112, 114, the crude unit 102 also includes other field devices, such as temperature, level, and pressure transmitters, valves, etc., that are not depicted in FIG. 1C. Each of the field devices, each group of devices, each process unit, and/or each process area may have a corresponding display graphic that is used in the display modules to represent it to the operator during operation of the process plant 10, and to include information specific to its operation. For example, the fired heater 106 may be represented in a display module 116 with a limited set of parameters, as depicted in FIG. 1D.

Figure 1D:
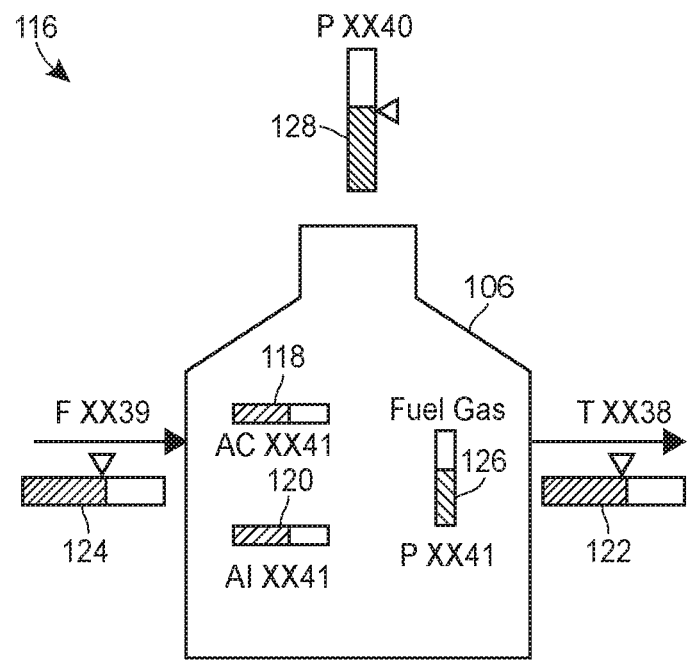
FIG. 1D illustrates an individual process control entity in the unit of FIG. 1C.

In FIG. 1D, the fired heater 106 is depicted with six parameters. Though the parameters will, of course, vary for each of the various pieces of equipment and, in some cases, different uses of the equipment (e.g., the parameters included with the fired heater 106 used in the crude unit 102 may differ from the parameters included with a fired heater used in a diesel hydrotreater), the parameters depicted in the display module 116 include $O_2$ and NOx levels in the flue gas (118, 120, respectively), outlet temperature 122, process fluid flow rate 124, fuel gas pressure 126, and draft pressure 128.

Figure 1E:
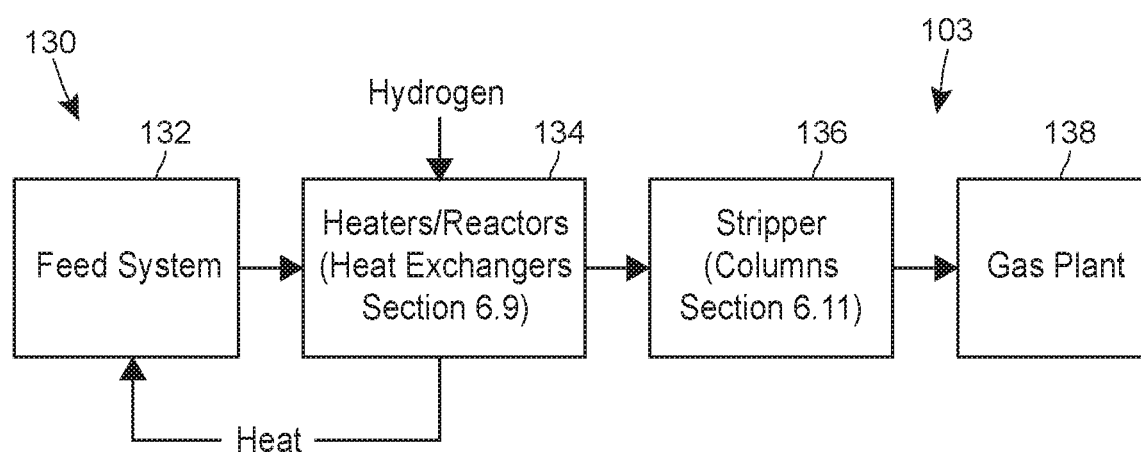
FIG. 1E is a block diagram illustrating the flow of product through another of the process control entities in the example process of FIG. 1B.
Figure 1F:
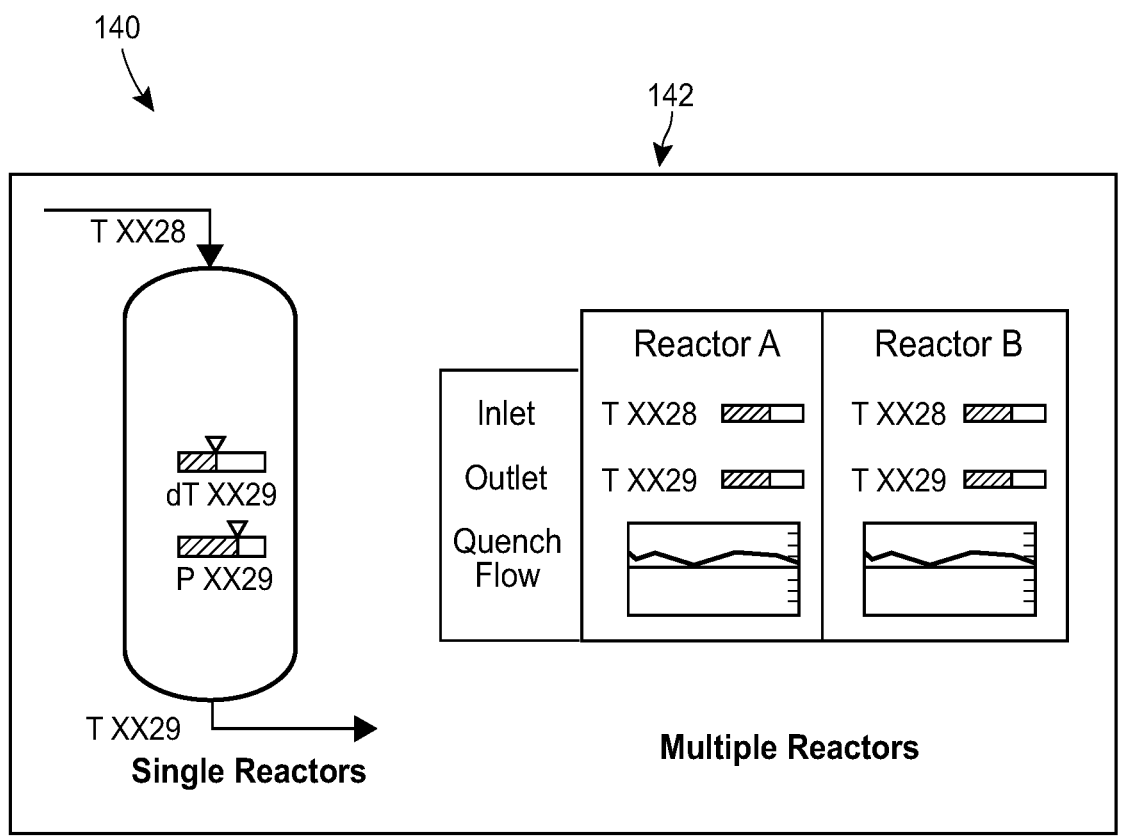
FIG. 1F depicts two example display graphics that may be displayed in accordance with the present description.

As another example, and referring back to FIG. 1B, the diesel fuel output from the crude unit 102 flows to a hydrocracker 103. The components of the diesel hydrocracker 103 are depicted in a block diagram 130 in FIG. 1E, and includes a feed system 132, a set of heaters and reactors 134, a stripper 136, and a gas plant 138. Of course, each of the components illustrated in FIG. 1E may be made up of several (or many) sub-components. For instance, the set of heaters and reactors 134 may include a single reactor or multiple reactors. Accordingly, the display graphic corresponding to the reactors 134 may include a single reactor or multiple reactors, and may be displayed differently depending on whether one or multiple reactors are included, as depicted in FIG. 1F. In FIG. 1F, a display graphic 140 depicts a single reactor, while a display graphic 142 depicts multiple reactors. Associated parameters for each of the display graphics 140 and 142 are also depicted and, one should appreciate, may differ depending on the particular arrangement and use of the equipment depicted.

Personnel in a refinery, or any process plant, typically are not responsible for monitoring or controlling the entire process plant. Instead, personnel have different "spans-of-responsibility." With reference to the example refining processes described above, for example, a specific operator may be responsible for one of the crude units and several diesel hydrotreaters. Other operators may be responsible for other sets of the same equipment (e.g., another crude unit in the same process area, a crude unit in another process area, etc.), some operators may be responsible for different sets of equipment (e.g., a naptha hydrotreater), and still other operators may be responsible for monitoring the process at a higher level (e.g., monitoring the overall refining process or characteristics of one or more of the output products). Each operator may view, monitor, and/or manipulate a different display module according to the operator's span-of-responsibility. Operators having similar spans-of-responsibility—for example, two operators that are each responsible for a crude unit—may look at identical looking display modules (that, respectively, show the data for the crude unit for which each operator is responsible), while other operators may look at different display modules adapted (i.e. designed or configured) to allow monitoring and/or manipulation of the parameters, devices, and processes corresponding to the span-of-responsibility of each. Still other personnel (e.g., not operators) may be responsible for environmental operations in the process plant, and may be interested in only the environmental parameters, alerts, and alarms associated with all of the equipment in the process plant, or subset of the equipment that may or may not correspond to the equipment within one of the operators' spans-of-responsibility.

The data and displays available in real time to operators and other personnel within the process plant, including real time process variables and parameters, alarms, warnings, alerts, configuration information (e.g., from the configuration file 74), control modules 70, display modules, batch information (for batch processes) and the like are collectively referred to throughout this specification as "process level data," and may include all of the data stored by, processed by, or communicated by the controllers 40. Process level data are valuable to operators, of course, but also to maintenance personnel and other business personnel who may need or desire to monitor the real-time conditions of all or part of the process.

In the embodiments described herein, personnel may access the process level data (and, in some embodiments, additional data described further elsewhere in the specification) via the mobile devices 14. This may be useful, for example, when an operator desires to monitor equipment within his span-of-responsibility during periods while she is not at work (e.g., during another shift), in order to keep watch on a particular issue that occurred previously, or just to maintain some amount of situational awareness for the purpose of continuity during shift changes (i.e., to have an idea of what has happened during previous shifts when coming back onto her shift). Meanwhile, maintenance personnel may wish to be alerted to problems that will need to be addressed upon their return to the process plant. Still further, personnel on the process plant premises (e.g., "on-shift" operators) may wish to collaborate with colleagues who are not presently not on the premises, to receive help diagnosing and/or resolving an anomalous situation in the process plant, and having access to the process level data while not physically present at the process plant may facilitate such collaboration. Of course, there are many other reasons why plant personnel would benefit from the availability of plant level data on the mobile devices 14.

Figure 1G:
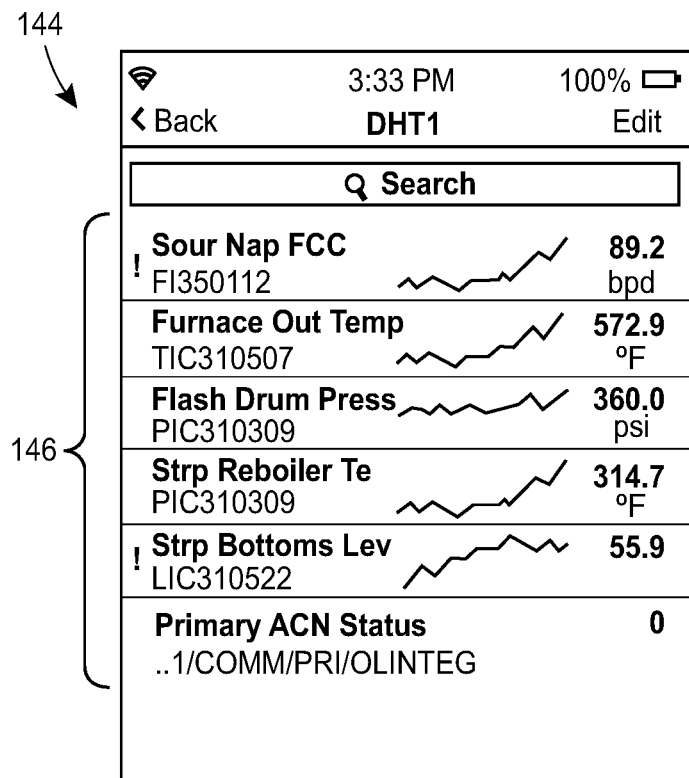
FIG. 1G depicts an example watch list that may be displayed in accordance with the present description.

Generally speaking, the contemplated embodiments facilitate access via the mobile devices 14 to the plant level data by allowing users of the mobile devices 14 to configure view lists. The view lists may include lists such as, by way of example and not limitation, watch lists, alarm lists, batch lists, calculation lists, system diagnostic lists, device alert lists, Key Performance Indicator (KPI) lists, decision support lists, and other derivatives of the "list" concept. FIG. 1G depicts an example watch list 144 for the diesel hydrotreater 103 (labeled "DHT1"). The watch list for the diesel hydrotreater "DHT1" includes a variety of items 146, which may be customized by the user of the mobile device 14, and the order of which items in the list 144 may also be customized by the user (as described later).

Figure 1H:
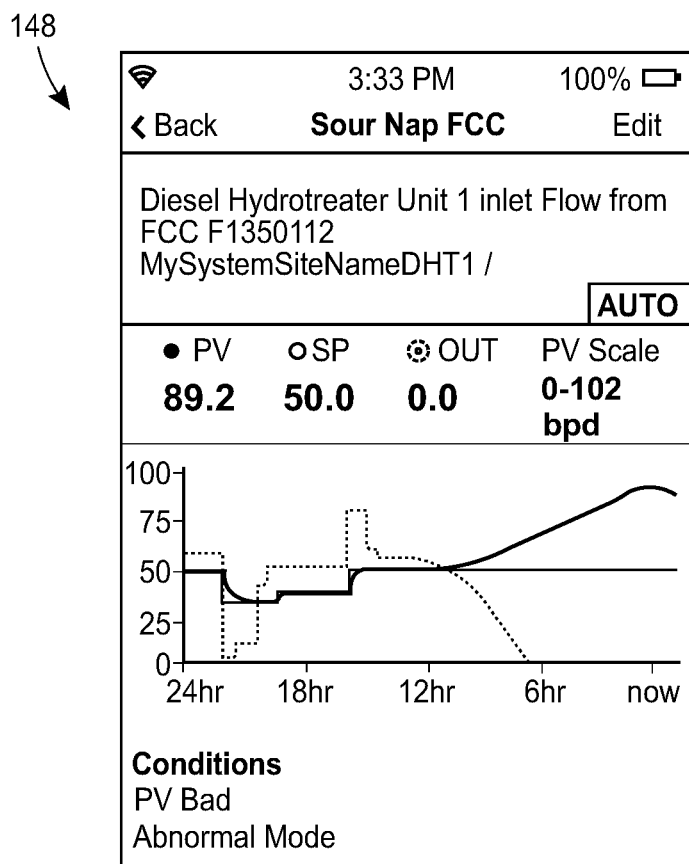
FIG. 1H depicts an example display showing data related to a particular item on the watch list of FIG. 1G.

From the list 144, the user may select one of the watch list items to retrieve and view other information about that item including, as depicted in a view 148 in FIG. 1H, historical values and other associated parameters such as tag, module name, friendly name, information source path, and other information that may be dependent on the item selected from the watch list. For instance, in the case of a control loop, the items can include the process variable itself, its setpoint, output, and scale, in addition to alarms and/or abnormal conditions associated with a process value. As will be described herein, much of the information displayed, and the manner in which it is displayed, is customizable by the user.

Just as the user could do in the process plant—for example from the operator workstation 30, 32—the user may navigate quickly from displayed data to related data. By tapping on an alarm, for instance, the user could navigate to an alarm list 150, as shown in FIG. 1I, and/or to an alarm view 152 (see FIG. 1J) from which the user may view the details of the alarm, such as the alarm name, description, time and date of the alarm, time to respond, functional classification, trends associated with the process value that triggered the alarm, recommended corrective actions, etc. This is analogous to the manner in which an operator at the workstations 30, 32 might interact with an alarm by clicking on it to see associated data.

The system may also provide the user with a list of key decisions to which attention needs to be paid. These lists could involve operations, planning, maintenance, asset management, and the like. The priority of the decisions could reflect a rapidly changing and not easily specified in advance condition (commonly referred to as unstructured and semi-structured decision problems). The decision support system could be either fully computerized, human-powered, or a combination of both.

Additional information may be made available, in embodiments, by rotating the mobile device 14 to landscape orientation, as depicted in FIG. 1K, and the information may be navigated and viewed in greater or lesser detail by zooming in/out using touch gestures.

Further features will be described in detail with reference to the infrastructure and system implementation.

System Architecture

Figure 1L:
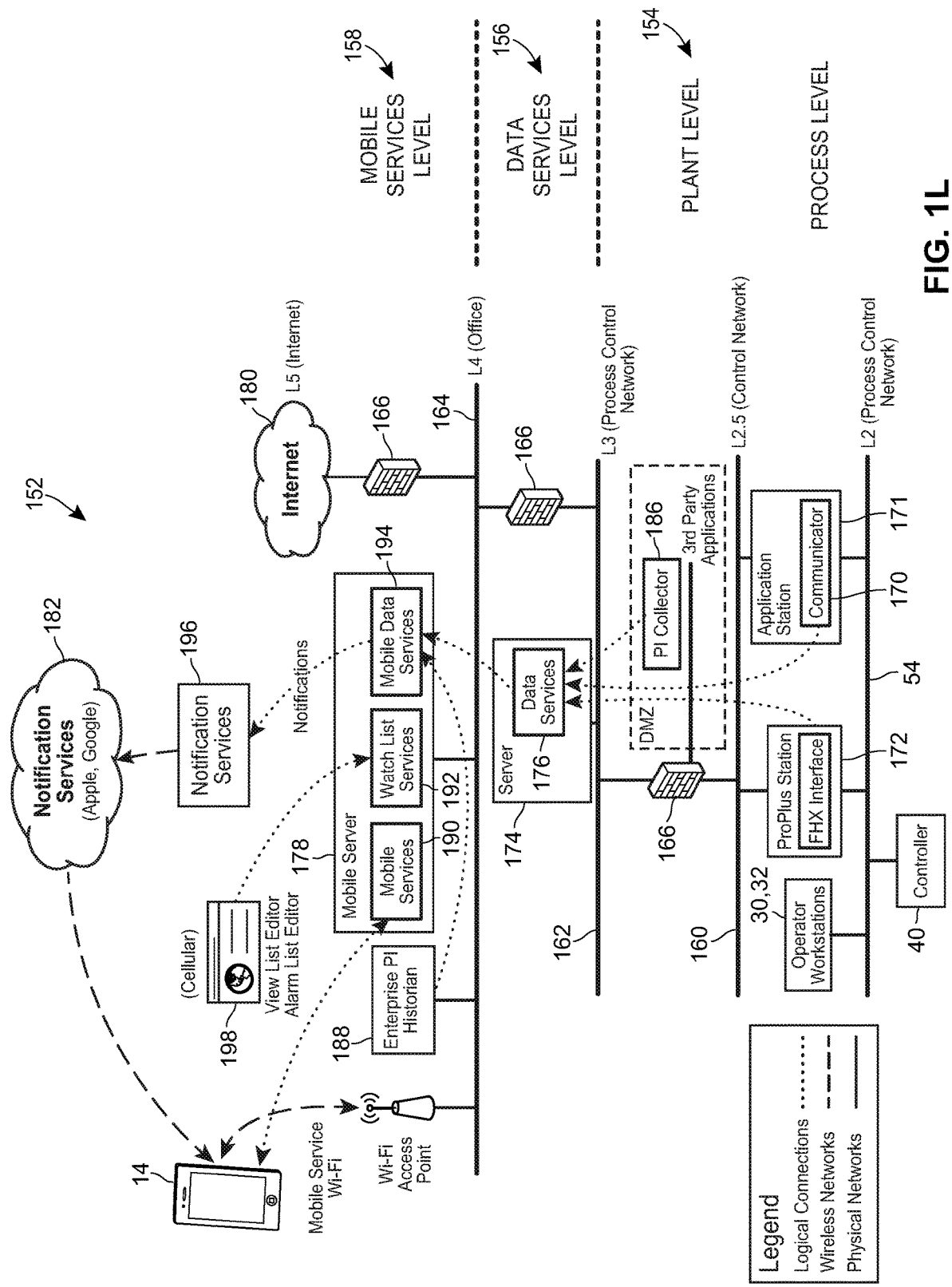
FIG. 1L depicts a block diagram illustrating an overall architecture of the system for mobile information distribution in a process control environment in accordance with the present description.

Turning now to FIG. 1L, a block diagram illustrates an overall architecture 152 of the system for mobile information distribution in a process control environment. The architecture is generally divided into three levels: a plant/process level 154, a data services level 156, and a mobile services level 158 that, collectively, include four to six different networks. The plant/process level 154 includes the field network (not shown) coupling the controllers 40 to the field devices 44, 46, and the control network (depicted in FIG. 1A as the data highway 54) coupling the controllers 40 to the workstations 30, 32, the databases 58-66, and other components that are within the process control plant 10. The plant/process level 154 may optionally include an intermediary network 160 that may couple the control network 54 to other business level applications. The plant/process level 154 is coupled to the data services level 156 by network 162. The data services level 156 is coupled to the mobile services level 158 by a network 164. The mobile services level 158 includes one or more other networks, such as the Internet and/or mobile telephony/data networks. Each of the layers 154, 156, 158 and, in fact, each of the networks, may be isolated from the others by hardware and/or software firewalls, in addition to other security measures. The layered architecture allows isolation between the various networks 54, 160, 162, 164, etc.

At the plant/process level 154, a communicator interface 170 provides the interface between the controllers 40 and the process plant 10 on one side, and the data services level 156 on the other side. While a single communicator interface 170 is depicted in FIG. 1L as communicating with a single controller 40 (and accordingly, with a single process plant 10), the communicator interface 170 may communicate with a multiplicity of controllers 40 controlling a single process plant, where various areas of the process plant 10 are controlled by separate controllers 40. It is also contemplated that, in embodiments, multiple process control systems 10 may be coupled to the data services level 156 and to the mobile services level 158 by multiple communicator interfaces 170. In a specific embodiment, a communicator interface 170 is coupled to each process control system 10, and the group of communicator interfaces 170 is coupled to the data services level 156. It is also envisioned that the multiple control systems may be physically located at different sites (e.g., at different chemical plants).

The communicator interface 170 may be part of a larger portal 171 that provides the overall interface to the data services and mobile services levels 156 and 158, respectively. The portal 171 may include functionality such as facilitating configuration of user information, device and system information, and software/hardware licenses.

Also in the plant/process level 154, a file interface 172 functions to transport the configuration file 74 to the data services level 156. In some embodiments, the file interface 172 is part of a dedicated one of the workstations 30, 32 used to configure the process plant 10 and including the graphical configuration system 34, the configuration editor 35, etc. In other embodiments, the file interface 172 may be part of the communicator interface 170. In any event, the file interface 172 is coupled to the data services level 156 and transports configuration data of the process plant to the data services level 156.

At the data services level 156, a data server 174 includes a number of different data services 176 that, collectively, receive data from the communication interface 170 and the file interface 172, and communicate the received data to the mobile services level 158. Among the data received from the plant/process level 154 and communicated to the mobile services level 158 are: alarms, process parameters, diagnostics, historical data, and configuration data. The various data services 176 may also serve to index the configuration file 74 received from the file interface 172. The indexing operations may including indexing for specific information such as module parameters and module hierarchy in order to support detailed search capabilities, which may allow users to search for parameter names, device tags, alarms, or other data of the process plant 10.

A mobile server 178 is the heart of the mobile services level 158. The mobile server 178 supports connections to the mobile devices 14, supports configuration of the various lists to which the mobile devices 14 are subscribed (e.g., alarm lists, watch lists, etc.), provides search capabilities, and manages mobile notifications. The mobile server 178 is also responsible for creating and maintaining the subscriptions to various data from the data services 176. The mobile server 178 is coupled to the mobile devices 14 over any of a variety of wireless data technologies, which may include Wi-Fi (i.e., protocols of the IEEE 802.11 protocol suite) and/or mobile ("cellular") infrastructure using any of the various data services available presently or in the future including, but not limited to, LTE services, some or all of which may make use of the internet 180.

The mobile devices 14 may include mobile devices running the Android mobile operating system developed by Google, mobile devices running the iOS mobile operating system developed by Apple, or any other operating system presently known or developed in the future. For mobile devices 14 running the Android and/or iOS mobile operating systems, notifications may be delivered to the mobile devices 14 via Apple or Google notification services 182, as will be readily understood by those familiar with the use of such services. The mobile server 178 facilitates configuration of the notification services at the system level and/or at the user level.

With respect to configuration of the mobile information distribution, the mobile server 178 provides some configuration services via the mobile device interface, which is native to the mobile devices 14. The mobile server 178 also provides configuration options via web pages (i.e., using a web browser). As will be described later, various alarm lists and watch lists may be configured via the web interface using searches (i.e., searching the indexed data of the configuration file 74) and/or filters, and taking advantage of the system hierarchy information, functional classifications, alarm priorities, alarm categories, and the like. Additional details on the configuration of the system will be provided in later sections of this description.

The availability of the configuration data at the mobile services level 158 may serve to provide a particularly rich mobile environment for the end user, because the system has access not just to the data, but to the relationships between the data. By way of example, instead of having only the status of an alarm (e.g., active) or the status of a parameter value (e.g., normal, high, low, etc.), the mobile server 178, by way of the configuration data from the configuration file 74, has access to the contextual relationships between the data and the data types. Thus, the system can determine that a particular active alarm is the result of a parameter status that is "high" and, in turn, that the parameter status is "high" because the parameter data value exceeds a particular limit. As a result of this rich contextual information available to the mobile server 178, the user interface is operable to present data in context—an alarm may be depicted with real-time data and history, for instance, or a process variable may be depicted with the current and historical set-point values and, optionally, relevant module relationships, which may allow the user to navigate from one data to other, related, data based on relationships between process control devices, function blocks, etc.

Process Data Configuration and Communication

As described more fully elsewhere herein, systems and methods for providing process data associated with a process plant to remote computing devices are disclosed. The process data may include data from controllers 40 via communicator interface 170, from process database 58, or otherwise communicated via the process plant network 10. In some embodiments, the process data may include or may be augmented by the addition of additional data regarding the process plant, such as data stored in the data historian 62, knowledge repository 64, or received from a specialized server 186. The additional data may include historical data of past operation of the process plant, summary data associated with past or current operation of the plant, batch data associated with batches running or scheduled for the process plant, scheduling data associated with operation of the plant, maintenance data associated with the process plant, business data regarding efficiency or profitability of the process plant, or other information associated with operation of the process plant. The process data (and, if applicable, additional data) may be generated by or derived from information generated by components in a process control system controlling operation of part or all of the process plant, such as DCS 22.

The process data (and any additional data) are provided to the remote computing devices through the data server 174 and the mobile server 178. The data server 174 may implement data services 176 to obtain the data via the process control network 162 and communicate with the mobile server 178 via the remote access network 164. These networks 162 and 164 may be separated by an existing firewall 166, thereby allowing secure communication using existing network architecture. To further secure the network communications and protect the process control system from unauthorized access, the data server 174 may only accept requested data lists from the mobile server 178 in particularly preferred embodiments. In such preferred embodiments, the data server 174 may transmit polling requests for such lists to the mobile server 178. In response to a polling request, the mobile server 178 may transmit a list of requested data to the data server 174. In further embodiments, the data server 174 may be configured to accept from the mobile server 178 only requested data lists, and such lists may only be accepted in response to a polling request. For example, the data server 174 may be configured to accept requested data lists from known mobile server 178 only during a predetermined time period following transmission of each polling request to the mobile server 178. The mobile server 178 may likewise be configured to transmit to the data server 174 only data request lists, and only in response to receiving from the data server 174 a polling request.

Based upon received lists of requested data, the data server 174 may obtain process data from the process control system via the process control network 162. This may include requesting or subscribing to data streams from one or more components within the process control system, such as process data associated with particular controllers 40 or field devices 46, 48. In some embodiments, the process data obtained by the data server 174 or communicated to the mobile server 178 may include only L1 Data from the process control system. As used herein, "L1 Data" refers to process data generated by or used by or in the workstations 30, 32 (e.g., display graphics and process entity visualizations), the controllers 40, or the field devices 44-46 of the process control system in controlling the operation of the process plant. In other embodiments, additional data may be included. If additional data are requested in the requested data lists, the data server 174 may further obtain data from additional components through the process control network 10. Such additional data may include, by way of example and not limitation, one or more of the following: key performance indicators (KPIs), batch information, maintenance information, efficiency information, knowledge base information regarding equipment or conditions within the process plant, decision support information, or schedule information. The data server 174 thus obtains a plurality of data values from the process control system. The data values may indicate specific process parameter values, such as sensor output values, process flow rates, material input or output values, equipment operating state values, derived or inferred values, control module parameter values, or any other values of types of data generated by or maintained within the process control system, including graphic display elements that may be used in operator workstations 30, 32.

When the data values are obtained from the process control system, the data server 174 may then identify or select any of the received data values corresponding to the requested data indicated in the lists to send to the mobile server 178. The data server 174 then communicates the identified data values via the remote access network 164 to the mobile server 178. In preferred embodiments, the data server 174 receives and sends the requested process data values to the mobile server 178 substantially in real-time as they become available (i.e., as the process data values are generated within the process control system, with only ordinary communication delays). Thus, the data server 174 may receive a plurality of data streams from entities within the process control system and may further transmit one or more data streams to the mobile server 178 to establish real-time data subscriptions.

When the mobile server 178 receives the requested data values from the data server 174, the mobile server 178 further identifies one or more remote computing devices to receive one or more sets of the data values. The mobile server 178 then communicates the sets of data values to the respective remote computing devices via a mobile network, which may include the remote access network 164, the Internet 180, or other networks facilitating communication between the mobile server 178 and the remote computing devices. In some embodiments, at least part of the mobile network may be an external network not associated with the process control system or the process plant (e.g., the Internet 180). In particularly preferred embodiments, the mobile server 178 communicates the sets of data values to the remote computing devices substantially in real-time, as the data values are received from the data server 174. Thus, the remote computing devices may receive data streams of process data values from the process control system. The remote computing devices may be the mobile devices 14 described above, such as smart phones, tablet computers, wearable computing devices such as smart watches, or other highly mobile computing devices. The remote computing devices may also include notebook, netbook, desktop, or similar computers located remotely from the process plant and communicating with the mobile server 178 via a web client 198 (e.g., a web browser or application running therein). In either case, the remote computing devices communicate with the mobile server 178 via the mobile network to obtain process data values from the process control system. In particularly preferred embodiments, the remote access devices only receive process data from the mobile server 178 and are not otherwise in communication with the process control network. Thus, in such embodiments, the remote access devices cannot access the process control network 10 or the process control system, except in the limited way described herein through the mobile server 178 and the data server 174.

Such configuration enhances the security of the process control system by limiting the access of the remote computing devices to receiving requested data via the mobile server 178, which mobile server 178 itself only receives data from the data server 174. These additional safeguards are important in process control systems because remote access (and particularly remote control) of controllers 40 or other components of the process control system by unauthorized users presents a serious, potentially fatal hazard. Significant injury and damage to the process plant may occur if unauthorized users obtain control of equipment in the process plant. Even without control, unauthorized users may utilize nonpublic information regarding process plant operations (which may include trade secrets) to the commercial detriment of the plant operator. In traditional process plants, these problems are addressed in part by physical security measures, such as restricting physical access to workstations 30, 32 and other sensitive equipment. With remote access, however, new means of securing the process plant beyond its physical boundaries are needed. While security could be achieved by limiting or eliminating access to process data from remote locations, such limitations would prevent information regarding the plant from reaching process plant personnel who need access to ensure proper operation of the plant.

To simultaneously address both issues, the systems and methods described herein allow remote computing devices to access process data via the mobile server 178, which communicates with the data server 174. To obtain the data, the remote computing devices request data values associated with data lists from the mobile server 178. The mobile server 178 then sends one or more lists of requested data to the data server 174 in response to polling requests. In some embodiments, the mobile server 178 may generate a combined list of requested data from data lists received from a plurality of remote access devices. When data values are received from the data server 174, the mobile server 178 may then determine which of the remote computing devices have requested data corresponding to the received data values, based upon the data lists. In any event, the mobile server 178 identifies data values received from the data server 174 and communicates the appropriate data values to one or more remote computing devices via the mobile network. To identify appropriate data values to communicate to each remote computing device, the mobile server 178 uses the data lists associated with each remote computing device.

The data lists may be received from the remote computing devices or may be identified by data list indicators received from the remote computing devices. For example, a remote computing device may request data values associated with a predetermined data list stored in a memory of the mobile server 178 by sending an indicator of the predetermined data list to the mobile server 178. Such requests may be automatically generated by the remote computing device under certain conditions, or the request may be generated upon an action of a user of the remote computing device. The indicated data lists may be data lists previously established by a user of the remote computing device or may be shared data lists available to a plurality of remote access device users. The data lists may be watch lists indicating process parameters to watch in the process control system, view lists associated with data views to display on the remote computing devices (corresponding, in certain, but not all, embodiments, with operator views available on workstations), alarm lists indicating alarms to monitor, or other types of data to receive at the remote computing devices. Each list may include a plurality of entries identifying data sources within the process control system (or additional data sources associated with additional data). The entries may be associated with entities within the process control system generating or otherwise providing process or additional data associated with the process plant, such as sensors, valves, control modules, function blocks, controllers, equipment units, process units, or areas. The entries may likewise be associated with process parameters associated with operation of the process plant by the process control system or conditions within the process plant. The entries may be hierarchically related, such that some parameters or entities may be subsets of the data associated with a higher-level parameter or entity. For example, an area of the process plant may include several process units, each of which may further include one or more equipment units, each equipment unit further associated with one or more control modules. The control modules may further be associated with a plurality of process parameters. Thus, the data lists may directly or indirectly reference data to be received, such as by requesting data for a higher-level entity.

In particularly preferred embodiments, the data lists may be based upon the same configuration data available to on-site operators. Specifically, the data lists may be generated based upon configuration files 74 from the process control system. Such configuration files 74 may be received from the controllers 40, configuration database 60, or file interface 172. The configuration files 74 may include information regarding the configuration of the process control system used by the controllers 40 of workstations 30, 32 in operating the process control system. As a particular example, the configuration files may be FHX configuration files used in the DeltaV™ control system, sold by Emerson Process Management. The configuration data may include a plurality of entries associated with entities or parameters within the process plant. Each entry may include a plurality of information items regarding the entity or parameter, which information items may be described by tags within the configuration data. Such tags may identify the entity or parameter, characteristics of the data values associated therewith, and other similar information. The tags may further indicate associations with other entities within the process control system, such as higher-level entities. In some embodiments, entries may include separate tags for different levels within the process control system, such as an area tag (e.g., PLANT_AREA NAME="AREA A"), a process unit tag (e.g., PROCESS_CELL NAME="PROCESSCELL1"), an equipment tag (e.g., BATCH EQUIPMENT UNIT NAME="UNIT1"), a control module tag (e.g., MODULE TAG="MODULE1"), or a module block tag (e.g., MODULE_BLOCK NAME="MODULE1"). Thus, a module may have tags associating the module with a process plant area and equipment unit, as well as the module. In further embodiments, the tags may include paths associating the entity or parameter with higher-level entities. From these tags, a full system architecture of the process control system may be determined. Thus, the remote computing device may request any process data within the process control system based upon the configuration data.

In some embodiments, the data server 174 may obtain the configuration data from the process control system via the process control network 156, which configuration data may include one or more configuration files 74. The data server 174 may then send the configuration data to the mobile server 178 via the remote access network 164. The configuration data may be sent periodically, without a request from the mobile server 178. The mobile server 178 may then store the configuration data locally within a memory of the mobile server 178 for communication to or searching by the remote computing devices. Configuration data may be further sent from the mobile server 178 to a remote computing device, or the remote computing device may search for configuration data based upon query parameters sent from the remote computing device to the mobile server 178. The remote computing device or mobile server 178 may then generate a data list based upon the configuration data. In embodiments in which the full configuration data associated with the process control system (or a part thereof) is sent to the mobile server 178, a fully authorized user of the remote computing device may access any information within the process control system (or part thereof) as fully as though the user were operating a workstation 30, 32 within the process plant. As discussed above, however, in preferred embodiments the user may still only be able to obtain data from the process control system, rather than controlling the operation thereof. Nonetheless, the full access to search process data and configure user displays on-the-fly from a remote computing device enhances operation of the process plant by allowing remote users access to the same data and displays they could access on-site at the process plant. Additionally, just as is the case with the workstations 30, 32, the available data relationships (which may be determined from the configuration files 74) drive the content of the information displayed on the mobile devices. That is, both the particular parameters, values, statuses, and alarms shown and the presentation of those parameters, values, statuses, and alarms are determined, optionally in part, by the logic and configuration of the process control system, and optionally in part by the status of the system (e.g., based upon alarm states, unit states, etc.). Authorization via user credential verification (e.g., via certificate, log-in, etc.) or device whitelisting may, of course, be used to limit user access to a portion of the total data generated by or related to the process plant. Even so, the data available to each user via a remote computing device may be the same data as would be available to the user from a workstation 30, 32 within the process plant.

Alarms and other notifications of conditions within the process plant are of particular interest in this respect. Any alarm in the process control system may be selected simply by inclusion in the data list. Additionally, any process parameter in the process control system may likewise be monitored by inclusion in the data list. In some embodiments, a user of the remote computing device may set notification or alarm criteria associated with any process data of the process control system by inclusion in the data list or by otherwise communicating such criteria to the mobile server 178. The mobile server 178 may then monitor the indicated process data and send any requested notifications or alarms to the remote computing device when the corresponding criteria are met. Because the data server 174 sends the requested process data values to the mobile server 178 substantially in real-time as they become available, the mobile server 178 is able to send the requested notifications or alarms to the remote computing device substantially in real-time. This is of particular importance because conditions within a process plant may require urgent attention of a process plant operator. For example, a critical alarm condition may require correction within minutes to avoid system failure, which may result in injury or damage, as well as significant plant downtime. The systems and methods described herein facilitate real-time alarm and notification presentation to remote users by utilizing existing network infrastructure where available and providing access to process parameter-level data, rather than periodic updates of summary data. In further embodiments, the mobile server 178 may utilize notification services to push notifications or alarms to remote computing devices. Such notification services may include third-party services, such as those associated with major operating system producers or cellular network operators. Such notification services may cause the remote computing devices to receive and present to the user the notification or alarm regardless of whether the user is currently interacting with a related application or program on the remote computing device.

These features of the presently described systems and methods are in contrast with prior art third-party systems, in which any data that can be viewed on the mobile device must be stored in an intermediary storage location to be accessed by the third-party software, which both limits the amount of information available to the user of the mobile device (e.g. the user can only access the data that are being stored or alarms that are recreated in the intermediary application), and results in differences between the data shown on the DCS (e.g., at the workstations 30, 32) and the data shown on the mobile device, because the sample rate is too slow, resulting in data lags. Additionally, in contrast to the prior art third-party systems, the presently described systems and methods provide a level of context for the data unavailable and unachievable in the prior art systems, because users are able to navigate the data of the system according to what is presented (e.g., selecting an alarm to see the real-time and/or historical process variables, statuses, etc., that resulted in the alarm's generation or selecting alarm to view the relevant information available in the DCS (limits, etc.), module relationships (e.g. the hierarchy), etc.).

Exemplary embodiments are described below to provide additional information regarding certain aspects of the systems and methods discussed above. Although particular embodiments are described in detail to illustrate particular aspects, other configurations or processes are contemplated within the scope of this application. Additional, fewer, or alternative components or actions may be included in other embodiments.

Data List Configuration

As discussed above, the remote computing devices receive data from the process control system based upon data lists requesting process data or additional data from the data server 174. In some embodiments, this may include generating or selecting a data list. In further embodiments, this may include searching for process data to monitor as a data list. In either case, the entries in the data lists may be selected based upon configuration data received from the process control system. Unlike other techniques of providing limited and predetermined types of process data to remote computing devices, the methods described below allow full access to any L1 Data in the process control system. Additionally, set-up and configuration of the system is simplified because the configuration data already used by the process control system is also used to generate the data lists. Thus, the systems and methods described herein facilitate greater access to process data while requiring less initial configuration and ongoing maintenance.

Figure 2A:
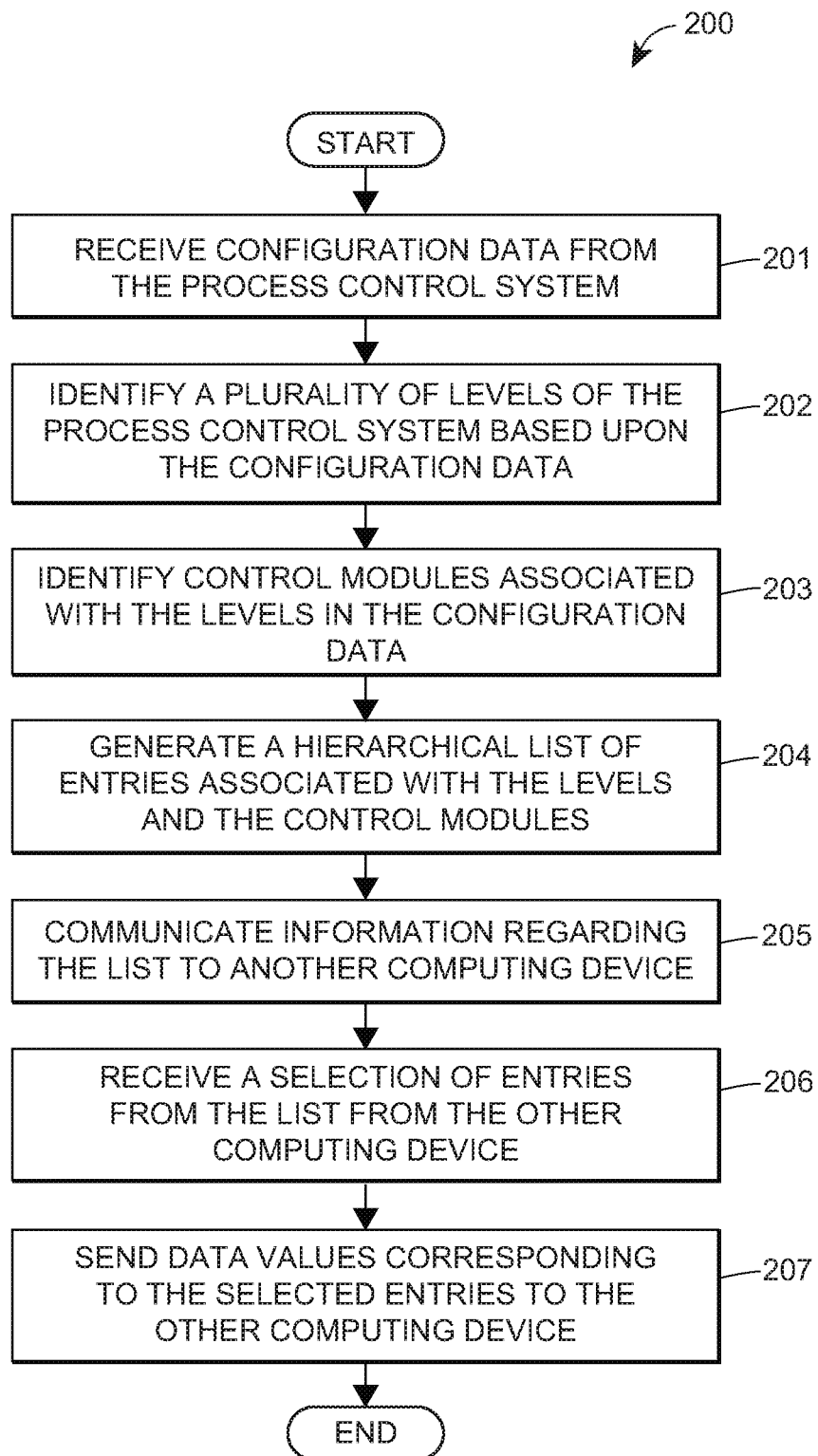
FIG. 2A is a flow diagram of an example data list configuration method in a process control system of a process plant.

FIG. 2A illustrates an example data list configuration method 200 using configuration data from the process control system to obtain a data list indicating process data to be communicated to a remote computing device. The data list configuration method 200 may be implemented by either the data server 174 or the mobile server 178, or both the data server 174 and the mobile server 178 may implement parts of the method 200. The method 200 begins with block 201, where the data server 174 or the mobile server 178 receives configuration data from the process control system. The configuration data indicates a plurality of entities or parameters within the process control system or process plant (or a part thereof). In some embodiments, the configuration data may be received as one or more configuration files 74 from a configuration database or file interface 172. The configuration files may include descriptions of entities and parameters within the process control system, which may include information used by the process control system to control operation of the process plant. The configuration data may include indications of various levels of entities, parameters, or other data within the process control system, including L1 Data. In particularly preferred embodiments, the configuration data may include information sufficient to construct a full hierarchy of all data levels for all L1 Data within the process control system or part thereof. For example, a configuration file 74 may include entries for all parameters within the process control system, such as process parameters associated with function blocks within modules. Such entries in the configuration file 74 may further include indicators associating the parameters with higher-level entities within the process control system, such as control modules, equipment, or areas. Additionally, or alternatively, the configuration file 74 may further include additional entries for the higher-level entities, which additional entries may include indicators of the entities and related entities or parameters (e.g., an equipment entity entry may include indicators of a plurality of control module entities associated with the equipment entity, which control module entity entries may include indicators of other control modules, function blocks, or parameters associated with the control module entity).

At block 202, the data server 174 or the mobile server 178 identifies a plurality of levels within the process control system (or part thereof) based upon the configuration data. The levels may be associated with any or all of the following: areas, process units, equipment, control modules, module blocks, or parameters. Entities or parameters may be associated within higher-level entities, and higher-level entities may be associated with lower-level entities or parameters. The configuration of the process control system (or part thereof) may thus be described as a hierarchy of entities and parameters. Identification of the levels may include identifying tags associated with levels for the entities and parameters within the configuration data. For example, each entry within the configuration data corresponding to an entity or parameter may include one or more tags indicating association with higher-level entities. Such tags may be separated by level (e.g., area tags, equipment tags, control module tags) or may be combined into one tag specifying a path within the process control system hierarchy (e.g., specifying the associated higher-level entities within one tag value). At block 203, the data server 174 or the mobile server 178 may further identify a plurality of control modules associated with the levels in the configuration data. The control modules may be identified in a similar manner to that used to identify the other levels, which may include identifying control module tags within the process control system. Identifying the control modules may further include identifying function blocks or parameters associated with the control modules. In some embodiments, the identification of levels and control modules may be combined.

At block 204, the data server 174 or the mobile server 178 generates a hierarchical list of the process control system (or part thereof) based upon the identified levels and control modules. Each entity or parameter may be placed within an ordered hierarchy representing the configuration of the process control system (or part thereof). The hierarchical list is generated using the values of the entities and parameters associated with the plurality of levels and control modules identified in the configuration data. The configuration of the process control system (or part thereof) may be described as a collection of nested sets, each set containing elements corresponding to lower-level entities or parameters, some of which elements may be subsets containing still lower-level entities or parameters. In some embodiments, the sets or subsets may be overlapping, viz. elements may be contained by multiple sets at the same level. In other embodiments, the sets and subsets may be non-overlapping, viz., each element belongs to at most one set at each level. Each set may be identified as a sub-list or group of entries within the hierarchical list having a common value within some field. Thus, the hierarchical list may include entries for all the L1 Data within the relevant process control system (or part thereof), which may be organized in such manner as to allow for roll-up categories representing each distinct set or subset associated with a higher-level entity. Entities may thus be treated as roll-up categories for selection by a user or generation of a view list, watch list, alarm list, or the like.

In some embodiments, one or more hierarchical lists are generated according to a display object in use in the process plant network 10. That is, the process plant network 10 and, in particular, the controller(s) 40 and/or workstation(s) 30 or 32 and/or the configuration database 60 may have, stored in a corresponding memory device, a plurality of display objects governing the manner in which information is displayed to operators of the process plant network 10. In particular, each display object includes depictions of, and/or information corresponding to, a plurality of process plant entities such as the field devices 44, 46. For example, an overview display may include all of the data and/or parameters determined to be critical in the section of the process plant. The display objects are part of the L1 data and/or are part of the configuration file 74. Thus, in some embodiments, the method 200 may include creating one or more watch lists, from the configuration file 74 and, in particular, creating the one or more watch lists according to the display object data. A default watch list may be created to include all of the parameters/data that are associated with a particular display object. A set of default watch lists may be created such that each includes the parameters/data that are associated with a corresponding display object. Of course, the default watch lists may be editable as described herein. In further embodiments, the watch lists are updated automatically when the configuration of the associated display objects is updated in the configuration file 74, and in still further embodiments, the data/parameters available to be added to each watch list are updated according to the updated configuration file 74.

Additionally, a user may select an area, unit, or cell of the process plant 10 and the watch lists may be created to include some or all of the modules in the unit, area, or cell of the module, or may include modules for which critical alarms are configured.

Alarm lists may also be auto-created to match the alarm configurations of individual operator stations, such that an operator, when not physically present in the plant and/or not at his/her workstation 30, 32, may still monitor the alarms that he/she has configured as important to his/her operational responsibilities. Alarm filter criteria, including alarm priority, function, and notification settings, as specified in the configuration file 74, may also be used to automatically create the alarm lists available for selection to monitor in the mobile application. As a result, a user of a mobile device may select a predefined list of alarms to monitor, may edit the predefined lists, may create a new list of alarms to monitor, etc.

With respect to batch data, which, of course, may be viewed or monitored in any of the watch lists, the alarm lists and watch lists may each be automatically configured according to a particular batch, a particular recipe, a particular set of batch equipment, etc.

At block 205, the data server 174 or the mobile server 178 may communicate information regarding the hierarchical list to another computing device. Such information may be communicated periodically or upon the occurrence of a change within the hierarchical list (e.g., the addition of a new entity or parameter, the removal of an existing entry, etc.). Such information may likewise be communicated in a summary form or as an indication of only changed information. The other computing device may be a remote computing device or may be the mobile server 178. When the hierarchical list is generated by the data server 174, the data server 174 may communicate the information regarding the hierarchical list to the mobile server 178. In some embodiments, the data server 174 may communicate only changed entries in the hierarchical list when changes occur. In further embodiments, the data server 175 may periodically communicate the full hierarchical list to verify accuracy, which full list may be communicated infrequently (e.g., daily, weekly, monthly). When the hierarchical list is generated by the mobile server 178, the mobile server 178 may communicate the information regarding the hierarchical list to one or more remote computing devices (e.g., mobile devices 14). In some embodiments, the information may include a limited list of entries within the hierarchical list. For example, the limited list may include entries the user or remote computing device is authorized to access. As another example, the limited list may include only high-level entries (e.g., entries associated with areas or process units). As yet another example, the limited list may include only entries associated with search parameters of a request or query from a remote computing device, such as in response to a user query for particular types of data (e.g., equipment operating states, temperatures, malfunctioning valves, critical alarms, etc.). As still another example, the limited list may include only entries associated with an entity, such as an entity previously selected by a user of a remote computing device.

At block 206, the data server 174 or the mobile server 178 may receive a selection of one or more entries from the other computing device. The selection may indicate a set of entries within the hierarchical list requested by the other computing device. For example, a remote computing device may send an indication to the mobile server 178 selecting a particular parameter or an entity for which to receive process data. Continuing the example, the mobile server 178 may further send an indication of the selected parameter or entity to the data server 174. In some embodiments, the selection may be received as an indicator of a predetermined set of entries (e.g., a preset view list or watch list) stored in a memory of the data server 174 or the mobile server 178. For example, an identifier associated with a predetermined view list may be received by the mobile server 178, which data list may include a plurality of entries to be requested.

At block 208, the data server 174 or the mobile server 178 may communicate data values corresponding to the selected entries to the other computing device. This may include communicating process data values from the data server 174 to the mobile server 178 or communicating process data values from the mobile server 178 to the remote computing device. In some embodiments, this may include sending one or more streams of process data values substantially in real-time as the process data values are received by the data server 174 or the mobile server 178. Thus, the remote computing device may subscribe to one or more data streams associated with entities or parameters within the process control system. In some embodiments, the mobile server 178 may further communicate additional data or historical process data (e.g., process data associated with the selected entries for the past hour, day, etc.). Such data may provide context to the user of the remote computing device and may be presented as discussed elsewhere herein. Communication of process data values is described in further detail elsewhere herein.

Figure 2B:
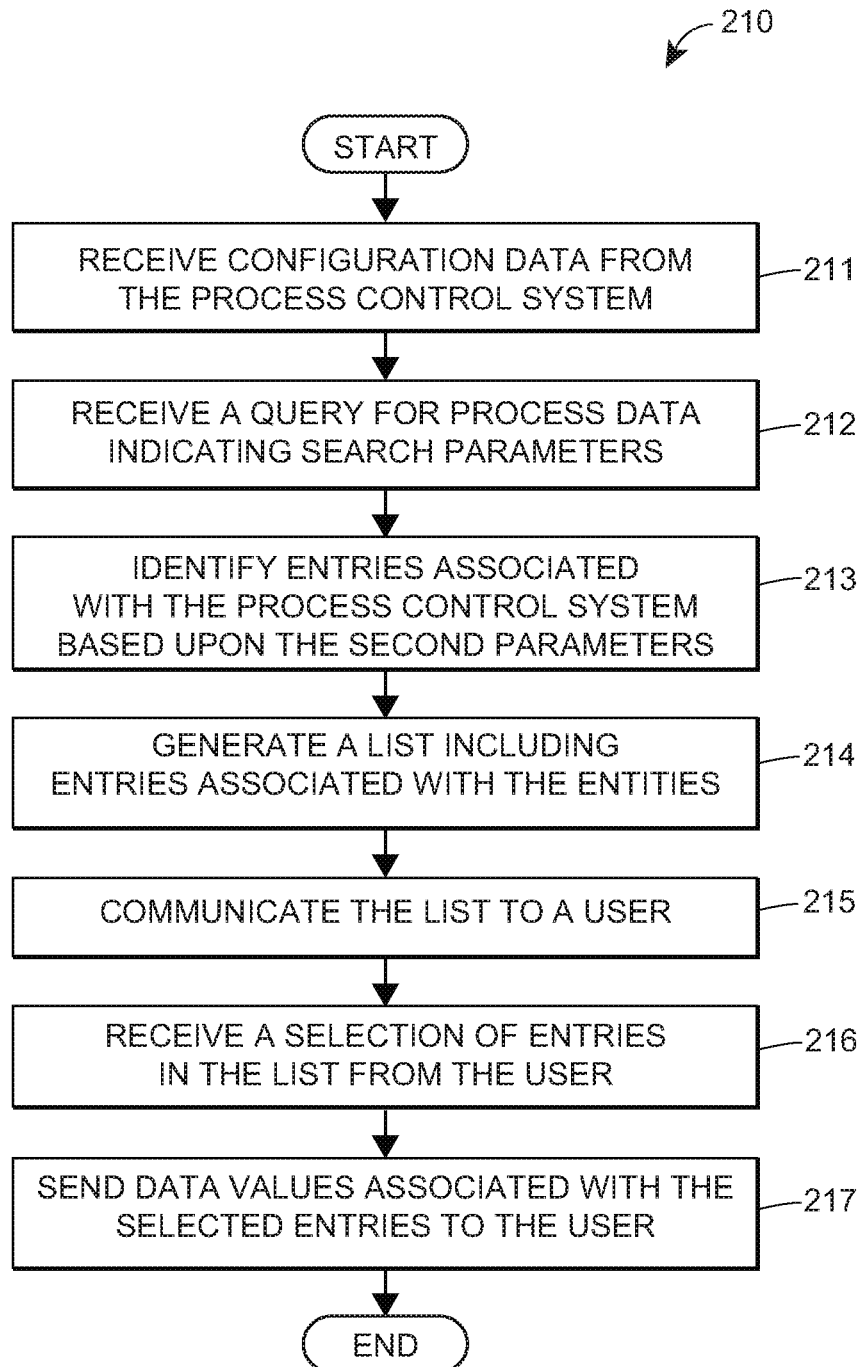
FIG. 2B is a flow diagram of an example configuration data search method in a process control system of a process plant.

FIG. 2B illustrates an example configuration data search method 210 for searching configuration data from the process control system to generate a data list indicating process data to be communicated to a remote computing device. The data list configuration method 210 may be implemented by either the data server 174 or the mobile server 178, or both the data server 174 and the mobile server 178 may implement parts of the method 210. In preferred embodiments, however, the method 210 is implemented by the mobile server 178 receiving the configuration data from the data server 174 and receiving the query from a remote computing device. In such embodiments, the mobile server further receives process data values from the data server 174 and sends the process data values to the remote computing device based upon the data list.

The method 210 begins with block 211, where the data server 174 or the mobile server 178 receives configuration data from the process control system, as described above with respect to block 201. At block 212, the data server 174 or the mobile server 178 receives a query from another computing device requesting process data, which query indicates one or more search parameters associated with the process data. The query may be generated by the other computing device in response to a user selection of the search parameters, such as by a user directly entering search terms or selecting common query parameters (e.g., current alarms, running batches, process data for the past day of plant operation, etc.). The search parameters may specify particular entities or process parameters within the process control system, each of which may be identified by user-friendly tag names or unique identifier numbers, for example. Alternatively, the search parameters may indicate a type or class of entity, such as a level, a process function, a type of equipment unit, a type of alarm, a type of control module, a type of sensor reading, etc. Beyond identifying entities or process parameters, the query parameters may specify other information. For example, the query parameters may specify particular values (or ranges of values) for process data values, time frames for historic or summary data (e.g., averages), other information to identify process data generated within the process control system, or additional non-process data associated with the process plant but not generated within the process control system.

At block 213, the data server 174 or the mobile server 178 identifies one or more entities or process parameters associated with the process control system based upon the search parameters of the received query. As discussed above, the configuration data may include tags containing information regarding the entities or parameters within the process control system. The tag values may be used to identify process data or parameters that are responsive to the query, i.e. matching the query parameters. For example, some of the search parameters may indicate values associated with tags of entities or parameters within the configuration data, such as values indicating particular areas, equipment units, alarm statuses, or data types (e.g., "temp," "pressure," etc.).

At block 214, the data server 174 or the mobile server 178 generates a list of entries based upon the search parameters. The list of entries may include a plurality of entries indicating the identified entities or parameters. In some embodiments, the list may further include entries indicating predefined lists (e.g., shared view lists) including entries associated with the identified entities or parameters. In further embodiments, the list may include related entries that are associated with the identified entities or parameters but that do not separately match the search parameters. For example, each higher-level entity associated with a matching entity or parameter may be included in the list. Because the related entries do not directly match the search parameters, the related entries may be marked in the list or included in a separate list to identify them as not directly responsive to the query. These related entries may then be presented to the user separately from the identified entities or parameters, or the related entries may be indicated by a graphical or stylistic indication in a graphical user interface. Generating the list may include determining a subset of the identified entities or parameters that the user or remote computing device is authorized to obtain. Such authorization may be determined based upon a user ID of the user or a device ID of the remote computing device.

At block 215, the data server 174 or the mobile server 178 communicates the generated list to the requesting computing device (e.g., the remote computing device). In some embodiments, this may involve sending only partial information regarding the entries to the requesting computing device, followed by additional information upon further request by the user. Upon receiving the list from the mobile server 178, the remote computing device may present at least a portion of the list information to the user. This may include presenting a list of entries, which may be organized or ordered to provide the most relevant or more frequently selected entries in more prominent locations on a display. When the user selects a set of one or more of the entries (e.g., to add the entries to a view list, to form a new watch list, etc.), the remote computing device may communicate the selection of the set of entries back to the mobile server 178. In some embodiments, the mobile server 178 may communicate an indication of the selected set of entries to the data server in response to a polling request from the data server 174.

At block 216, the data server 174 or the mobile server 178 receives the selection of the set of one or more entries from the list. Similar to other data list selections discussed herein, the selection may be received as a set of indicators of the entries or may be received as one or more indicators of predetermined lists. In response to receiving the selection, the data server 174 or the mobile server 178 obtains data values from the process control system and communicates data values associated with the selected entries to the remote computing device at block 217. As discussed elsewhere herein, the mobile server 178 may request the process data or additional data from the process control system by sending an indication of the requested process data to the data server 174 in response to a polling request from the data server 174. The data server 174 obtains a plurality of data values from the process control system and communicates the requested data values to the mobile server 178. The mobile server 178 then communicates the requested data values associated with the selected entries to the mobile computing device. Thus, the remote computing device may subscribe to one or more data streams associated with entities or parameters within the process control system using a query to identify and request data, as described above. In some embodiments, the mobile server 178 may further communicate additional data or historical process data (e.g., process data associated with the selected entries for the past hour, day, etc.). Such data may provide context to the user of the remote computing device and may be presented as discussed elsewhere herein.

Process Data Subscriptions

In order to securely subscribe remote computing devices to process data streams and to obtain additional data without compromising the security protections of the process control system, the following systems and methods may be used. As discussed above, the remote computing devices may obtain data values from the mobile server 178, which may in turn obtain the data values from the data server 174. The data server 174 obtains the data values from the process control system, such as from controllers 40 via communicator interface 170, from process database 58, the data historian 62, knowledge repository 64, or from a specialized server 186. In preferred embodiments, the data server 174 sends a polling requests to the mobile server 178, and the mobile server 178 sends a list of requested data to the data server 174 only in response to the polling requests. Such list of requested data may include only changed data requests, such as data subscriptions to add or remove (i.e., indicators of new data not previously requested or indicators of data previously requested but no longer requested). Because the process data subscriptions may be configured as needed as discussed above, the subscription methods described herein provide access to L1 Data from the process control system. Additionally, the process data may be communicated to the remote computing devices substantially in real-time without undermining the security protections in place in the process control system to protect the process plant from malicious or other unauthorized access. Moreover, the mobile server 178 may obtain only data actually requested, thereby reducing the process and storage requirements, while still providing access to the full range of L1 Data. By establishing the data subscriptions as needed while the process plant is operating, initial set-up and later system reconfiguration are reduced. Thus, the systems and methods described herein facilitate more extensive and timely access to process data, while requiring less initial configuration and ongoing maintenance.

Figure 2C:
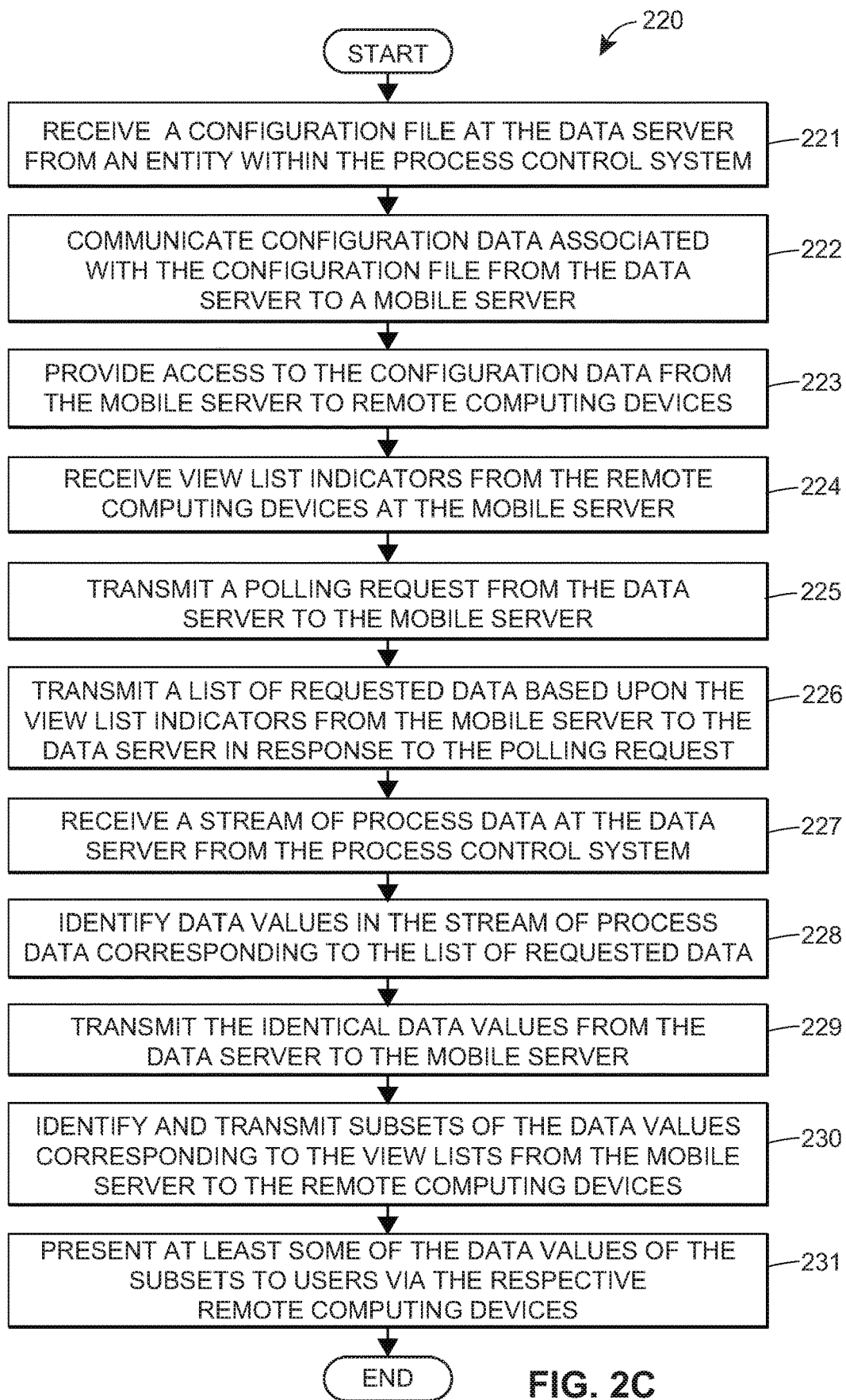
FIG. 2C is a flow diagram of an example data subscription method in a process control system of a process plant.

FIG. 2C illustrates an example data subscription method 220 for selecting and obtaining process data at a remote computing device. The data subscription method 220 may be implemented repeatedly to establish, edit, adjust, or terminate data subscriptions for one or more remote computing devices, and the data subscription method 220 may be implemented in conjunction with one or more of the other methods described herein.

At block 221, the data server 174 receives a configuration file 74 or other configuration data from an entity within the process control system. The configuration file 74 may include configuration data regarding the process control system and may be received from a file interface 172 or a configuration database 60, as described elsewhere herein. At block 222, the data server 174 may communicate data associated with the configuration file 74 to the mobile server 178, which may involve sending the configuration file 74, a portion of the configuration data contained therein, or configuration data derived therefrom by the data server 174. At block 223, the mobile server 178 may provide access to the configuration data to one or more remote computing devices. Providing access to the remote computing devices may include sending a list of available data or establishing an interface for searching the configuration data. As discussed elsewhere herein, the mobile server 178 may provide access to less than the full configuration data in some instances, such as by providing access to a portion of the configuration data for which the user is authorized.

At block 224, the mobile server 178 receives one or more view list indicators from the remote computing devices via the mobile network, indicating process data (and any additional data) requested by the remote computing devices from the process control system. In some embodiments, a user log-in event on a remote computing device may cause a default view list indicator to be sent automatically from the remote computing device to the mobile server 178. Such default view list indicator may be interpreted by the mobile server 178 as a request for the same data last requested by the user. Upon receiving one or more view list indicators, the mobile server 178 may determine or generate a list of requested data. Such list of requested data may be a combined list of all data requested by a plurality of remote computing devices, which may further be condensed by removing redundant entries. The mobile server 178 may update such combined list of requested data whenever a new indicator is received from any remote computing device, including indicators of a remote computing device terminating a previous request. To facilitate later transmission of the data values to the appropriate remote computing devices, the mobile server 178 may further maintain one or more lists associating requested data with specific remote computing devices. In some embodiments, this association data may be included in the combined list of requested data. In further embodiments, the mobile server 178 may additionally generate a list of requested changes, which may include only entries indicating changes to the requested process data (or additional data) received from the remote computing devices since the previous data request was send to the data server 174. By transmitting such list of requested changes, rather than the full list of requested data, the mobile server 178 may efficiently communicate with the data server 174.

At block 225, the data server 174 transmits a polling request to the mobile server 178 via the remote access network 164, requesting information regarding the data requested by the remote computing devices. The polling request may be sent periodically at intervals slower than some process data values update, thereby reducing the total data to be transmitted via the remote access network 164. In response to receiving the polling request, the mobile server 178 then transmits a list of requested data to the data server 174 via the remote access network 164 at block 226. As noted above, in some embodiments, the list of requested data may be a combined list and may further be a list of requested changes. In preferred embodiments, the mobile server 178 may transmit the list only in response to receiving polling requests from the data server 178. In further embodiments, the data server 174 may be configured to accept lists of requested data only from the mobile server 178 and only during a predetermined interval following each polling request. Noncomplying requests may be ignored by the data server 174. In alternative embodiments, the data server 174 may accept lists of requested data (particularly lists of changed requests) from the mobile server 178 at any time. Such embodiments may be advantageous inasmuch as the delay before data values are transmitted from the data server 174 to the mobile server 178 is reduced.

At block 227, the data server 174 receives a stream of process data from the process control system via the process control network 162. The process data may be received from one or more data sources within the process control system, including one or more of the following: controllers 40 via communicator interface 170, from process database 58, or otherwise communicated via the process plant network 10. In some embodiments, the data server 174 may subscribe to one or more data sources by communicating a request for particular data from the data source. Such subscription requested may be further generated based upon lists of requested data from the mobile server 178. In further embodiments, the data server 174 may further obtain additional data requested by the mobile server 178 from a data historian 62, knowledge repository 64, or specialized server 186.

At block 228, the data server 174 identifies data values in the received data to be further transmitted to the mobile server 178. The data server 174 may identify process data values in the data stream that correspond to the data requested in the list of requested data from the mobile server 178. At block 229, the data server 174 then transmits the identified data values to the mobile server 178 via the remote access network 164. To reduce network traffic on the remote access network 164, the data server 174 may only transmit updated or changed data values associated with the requested process data. For example, unchanged data values may not be transmitted or may be transmitted only as an indicator of an unchanged value. In alternative embodiments, the data server 174 may transmit the data values in real-time as they are received from the process control system, or the data server 174 may transmit the data values in groups at intervals. When transmitted in real-time, the data values may be transmitted as data streams from the data server 174 to the mobile server 178. When transmitted at intervals, the data server 174 may group data values received from the process control system at various times during the interval, which may be a fixed period or a variable interval. For example, the data server 174 may transmit data values to the mobile server 178 at a fixed period (e.g., every second), unless a requisite quantity of data (e.g., 5 MB) is received from the process control system prior to the periodic transmission.

At block 230, the mobile server 178 similarly identifies and transmits subsets of the received data values to the remote computing devices via the mobile network. The mobile server 178 may select the subsets based upon the entries in the view lists indicated by the remote computing devices. In alternative embodiments, the mobile server 178 may transmit the subsets of data values in real-time as they are received from the data server 174, or the mobile server 178 may transmit the data values in groups at intervals. For example, the data values may be grouped and transmitted periodically (e.g., every second) to reduce the number of transmissions via a mobile telephony network. In further embodiments, the mobile server 178 may communicate the data values in real-time, but third-party networks (e.g., mobile telephony networks) may communicate the data values in groups on a periodic transmission schedule. Once received by the mobile computing devices, however, at least some of the data values of the subsets are presented to users at block 231. Such presentation may include presentation as an notification, chart, icon, or other summary presentation based upon part of a data value.

Figure 2D:
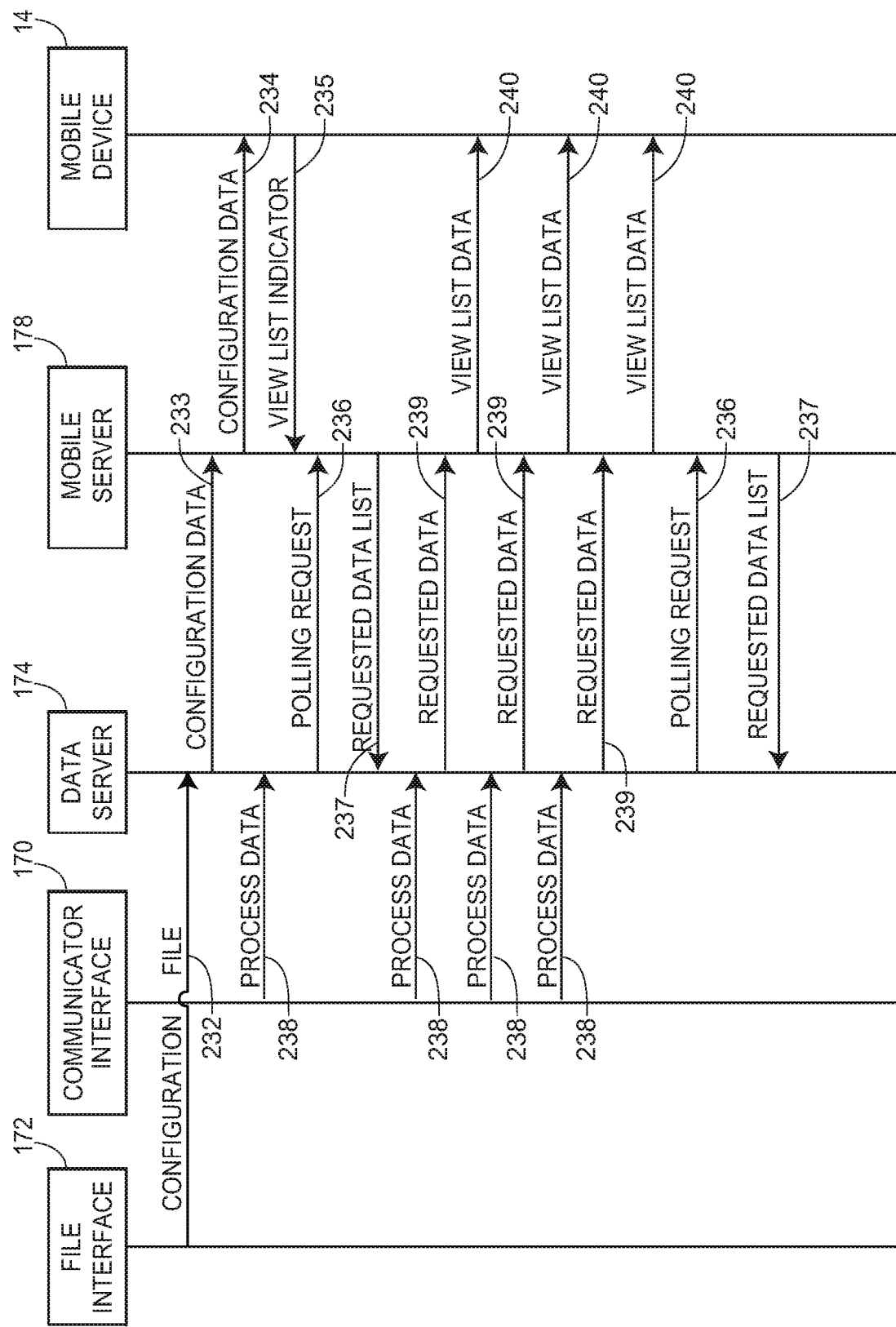
FIG. 2D is a sequence diagram of an example data subscription communication sequence in a process control system of a process plant.

FIG. 2D illustrates an example data subscription communication sequence showing communication between the process control system (specifically, a file interface 172 and a communicator interface 170), the data server 174, the mobile server 178, and a remote computing device (specifically, a mobile device 14). Although the connections are shown as being direct in order to better illustrate the salient features of the sequence, it should be understood that intervening components may be involved. For example, the controller 40 may communicate configuration data to the data server 174 via a file interface 172 and may further communicate process data to the data server 174 via a communicator interface 170. While described variously throughout the specification as the being communicated from the controller 40 to the data server 174, it should be understood that, at least in some embodiments, the configuration data 74 are stored in the configuration database 60, and communicated from the configuration database 60 to the data server 174 via the file interface 172. That is, the file interface 172 may retrieve the configuration data 74 from the configuration database 60 (or from the controller 40) and communicate the configuration data 74 to the data server 174. In any event, the communicator interface 170, the file interface 172, and the data server 174 communicate via the via the process control network 162. The data server 174 and the mobile server 178 communicate via the remote access network 164. The mobile server 178 and the mobile device 14 communicate via the mobile network, which may include a local network at the process plant (e.g., a part of the remote access network 164), a notification service 196, or the Internet 180. Although the example sequence only illustrates one of each of the file interface 172, data server 174, mobile server 178, and mobile device 14 for clarity, further embodiments my include a plurality of any or all of these components.

The exemplary communication sequence begins with the communication of a configuration file 74 from the file interface 172 to the data server 174 (line 232). Upon receiving the configuration file 74, the data server 174 determines and sends configuration data to the mobile server 178 (line 233), which may be a portion of the information included in the configuration file 74. The mobile server 178 then provides the configuration data or a portion thereof to the mobile device 14 (line 234). When a data request is received from a user or otherwise determined at the mobile device 14, the mobile device 14 send a view list indicator to the mobile server 178 (line 235). In the illustrated embodiment, the mobile server 178 receives the view list indicator and waits for a polling request from the data server 174. After an interval of time, the data server 174 sends a polling request to the mobile server 178 (line 236). In response to receiving the polling request, the mobile server sends a requested data list or indication thereof to the data server 174 (line 237). As illustrated, the polling request may be sent by the data server 174 periodically or at intervals (lines 236), in response to each of which the requested data list or updated thereto may be returned by the mobile server 178.

The data server 174 receives process data associated with the controller 40 from the communicator interface 170 at various times (lines 238), which may be periodic with one or more periods or may be aperiodic (e.g., episodic). As illustrated by the lines 238, the process data may be received even without a specific data request in some embodiments. When process data is received at the data server 174, the data server 174 may determine whether the received process data values correspond to any requested data in the requested data list. When such requested data is identified, the data server 174 sends the requested data to the mobile server 178 (line 239). Upon receiving the requested data, the mobile server 178 may select data values corresponding to the view list data requested by the mobile device 14. The mobile server 178 then sends the requested view list data to the mobile device 14 (line 240). This sequence of communicating process data values from the communicator interface 170 to the data server 174 (line 238), from the data server 174 to the mobile server 178 (line 239), and from the mobile server 178 to the mobile device 14 (line 240) may repeat during process plant operation until the mobile device 14 terminates the data subscription. The data subscription may be terminated by communicating an indicator of the termination or a new view list indicator not requesting any process data.

Figure 2E:
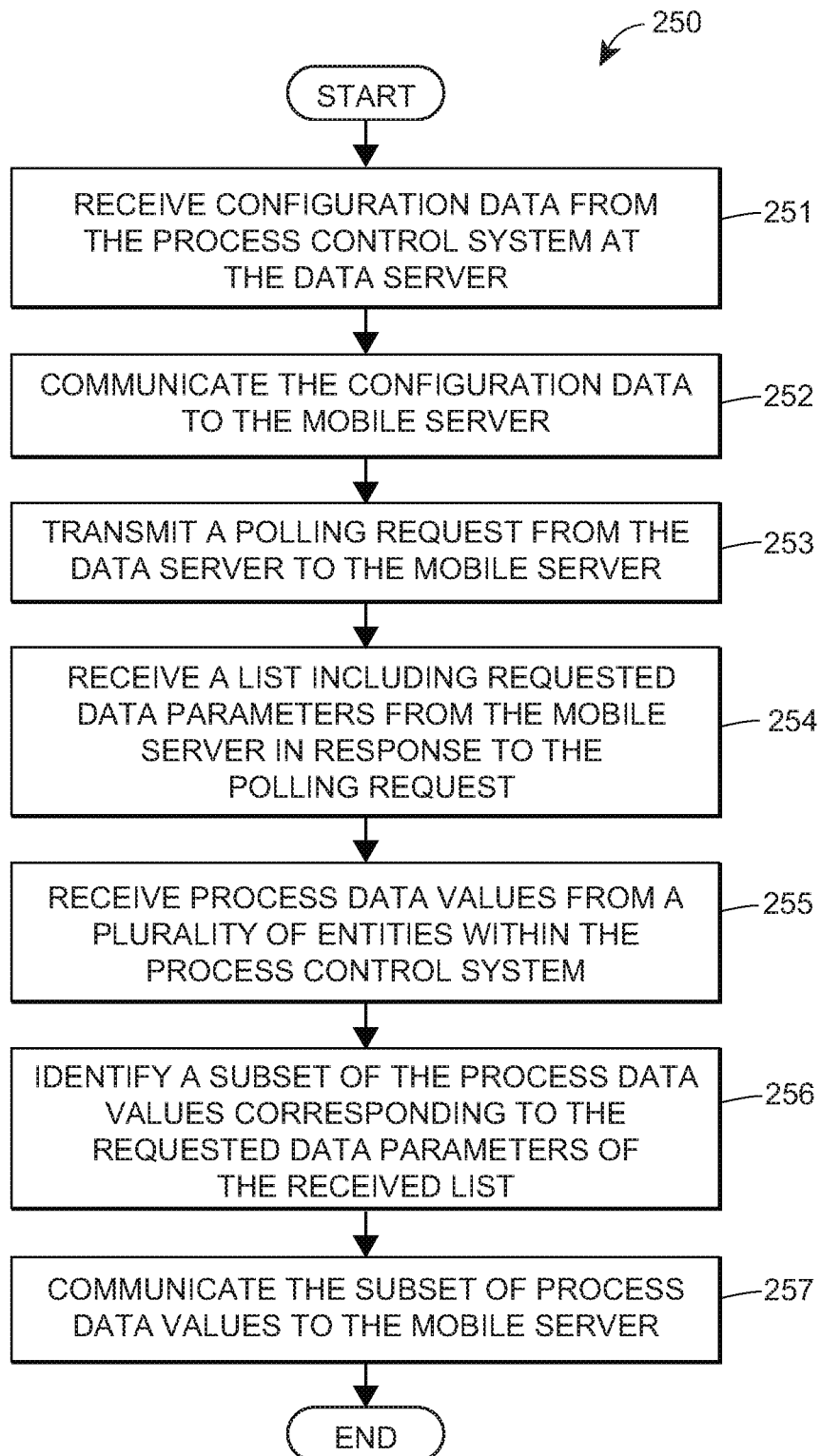
FIG. 2E is a flow diagram of an example data server communication method in a process control system of a process plant.

FIG. 2E illustrates an example data server communication method 250 for providing process data from the data server 174 to the mobile server 178. The data server communication method 250 (or parts thereof) may be implemented repeatedly by the data server 174 to provide data streams or otherwise provide process data values from the process control system to the mobile server 178, and the method 250 may be implemented in conjunction with one or more of the other methods described herein. Although the method 250 is described as receiving and communicating process data, the data server 174 may also obtain and transmit additional data relating to the process plant to the mobile server 178 in some embodiments.

At block 251, the data server 174 receives configuration data from the process control system via the process control network 162. This configuration data may be received as one or more configuration files 74 from controllers 40, file interfaces 172, or configuration databases 60, as discussed elsewhere herein. After receiving the configuration data, the data server 174 may further communicate the configuration data to the mobile server 178 at block 252. To communicate the configuration data, the data server 174 may determine a subset of changed or updated configuration data or may otherwise determine a subset of configuration data to send to the mobile device 178. In further embodiments, the data server 174 may generate configuration information to send to the mobile server 178, such as by deriving summary or hierarchical list information from the configuration data received from the process control system.

At block 253, the data server 174 transmits a polling request to the mobile server 178 via the remote access network 164. The polling request may instruct the mobile server 178 to respond by communicating a requested data list to the data server 174. In response to the polling request, the mobile server 178 may send a list of requested data to the data server 174 via the remote access network 164. The list of requested data may include a plurality of requested data parameters, indicating entities or parameters from the process control system for which the mobile server 178 is requesting data. In some embodiments, the list may further include indications of additional data associated with the process control system. In further embodiments, the list may include only entries for new, revised, changed, cancelled, or updated requested data parameters.

At block 254, the data server 174 receives the list of requested data from the mobile server 178 via the remote access network 164. The data server 174 may then obtain process data values associated with the list of requested data, and (where applicable) the data server 174 may further obtain additional data if indicated in the list of requested data. In some embodiments, the data server 174 may then subscribe to receive process data from one or more controllers 40 or communicator interfaces 170. At block 255, the data server 174 receives a plurality of process data values via the process control network 162, which process data values are associated with a plurality of entities within the process plant. The process data values may include control values, measurement values, or other parameter values generated or used within the process control system. In preferred embodiments, the process data values may be received as one or more data streams from the process control system in real-time as the process data values are generated or updated.

When the data server 174 receives the process data values, the data server 174 next identifies a subset of the process data values corresponding to the requested data parameters of the received list of requested data to transmit to the mobile server 178 at block 256. Identifying the subset of the process data values may include identifying those process data values which have changed or updated, or which process data values are associated with process data newly requested by the mobile server 178. Similarly, in some embodiments, the identified subset may include indicators of updated but unchanged process data values. Thus, the subset of process data values may be identified for efficient communication to the mobile server 178. Once the subset of process data values has been identified, the data server 174 communicates the subset of process data values to the mobile server 178 at block 257. In preferred embodiments, the identification and communication of the subset of process data values may be performed in real-time as the process data values are received by the data server 174. Thus, the data server 174 may provide a streaming process data subscription to the mobile server.

Figure 2F:
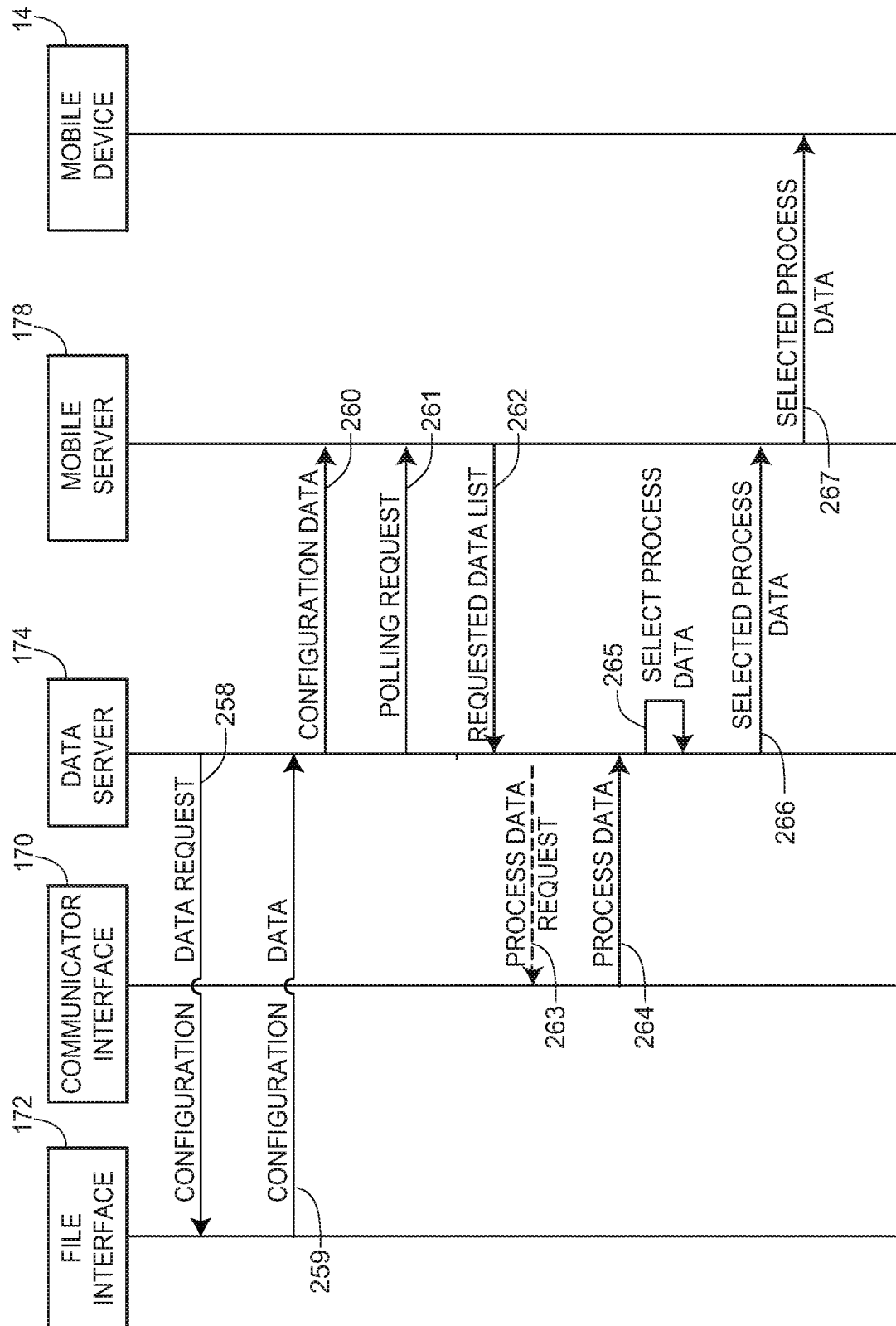
FIG. 2F is a sequence diagram of an example data server communication sequence in a process control system of a process plant.

FIG. 2F illustrates an example data server communication sequence showing communication between the process control system (specifically, a file interface 172 and a communicator interface 170), the data server 174, the mobile server 178, and a remote computing device (specifically, a mobile device 14). The example data server communication sequence particularly focusses on communication involving the data server 174. Although the connections are shown as being direct in order to better illustrate the salient features of the sequence, it should be understood that intervening components may be involved. For example, the controller 40 may communicate configuration data to the data server 174 via a file interface 172 and may further communicate process data to the data server 174 via a communicator interface 170. The controller 40 and the data server 174 communicate via the via the process control network 162. The data server 174 and the mobile server 178 communicate via the remote access network 164. The mobile server 178 and the mobile device 14 communicate via the mobile network, which may include a local network at the process plant (e.g., a part of the remote access network 164), a notification service 196, or the Internet 180. Although the example sequence only illustrates one of each of the file interface 172, communicator interface 170, data server 174, mobile server 178, and mobile device 14 for clarity, further embodiments my include a plurality of any or all of these components.

The exemplary communication sequence begins with the communication of a configuration data request from the data server 174 to the file interface 172 (line 258). The file interface 172 may obtain the configuration data from a configuration database 60. In response to the configuration data request, the file interface 172 sends the configuration data to the data server 174 (line 259), which may be sent as a configuration file 74 or otherwise. The data server 174 receives the configuration data, which may then be processed to determine further configuration data (e.g., a subset of the received configuration data, a set of lists based upon the configuration data, etc.) to communicate to the mobile server 178. The data server 174 sends the configuration data or information associated therewith to the mobile server 178 (line 260). At some point thereafter, the data server 174 transmits a polling request to the mobile server 178 (line 261). In response to the polling request, the mobile server 178 generates and communicates to the data server 174 a requested data list (line 262). The requested data list may include entries indicating process data requested from the process control system requested by the remote computing devices, as discussed elsewhere herein.

Based upon the requested data list, the data server 174 may in some embodiments send a process data request to communicator interface 170 (line 263). The communicator interface 170 may obtain process data from one or more controllers 40 in the process control system. Regardless of whether the embodiment involves a process data request, the data server 174 receives process data from the communicator interface 170 (line 264). Upon receiving the process data, the data server 174 selects process data associated with the requested data list for communication to the mobile server 174 (line 265). Selecting the process data may include identifying one or more sets or subsets of process data values, which may be identified as including updated or changed process data values in some embodiments. The data server 174 then communicates the selected process data to the mobile server 178 (line 266). The mobile server 178 may then further communicate the selected process data (or a subset thereof) to the mobile device 14, as described elsewhere herein.

Figure 2G:
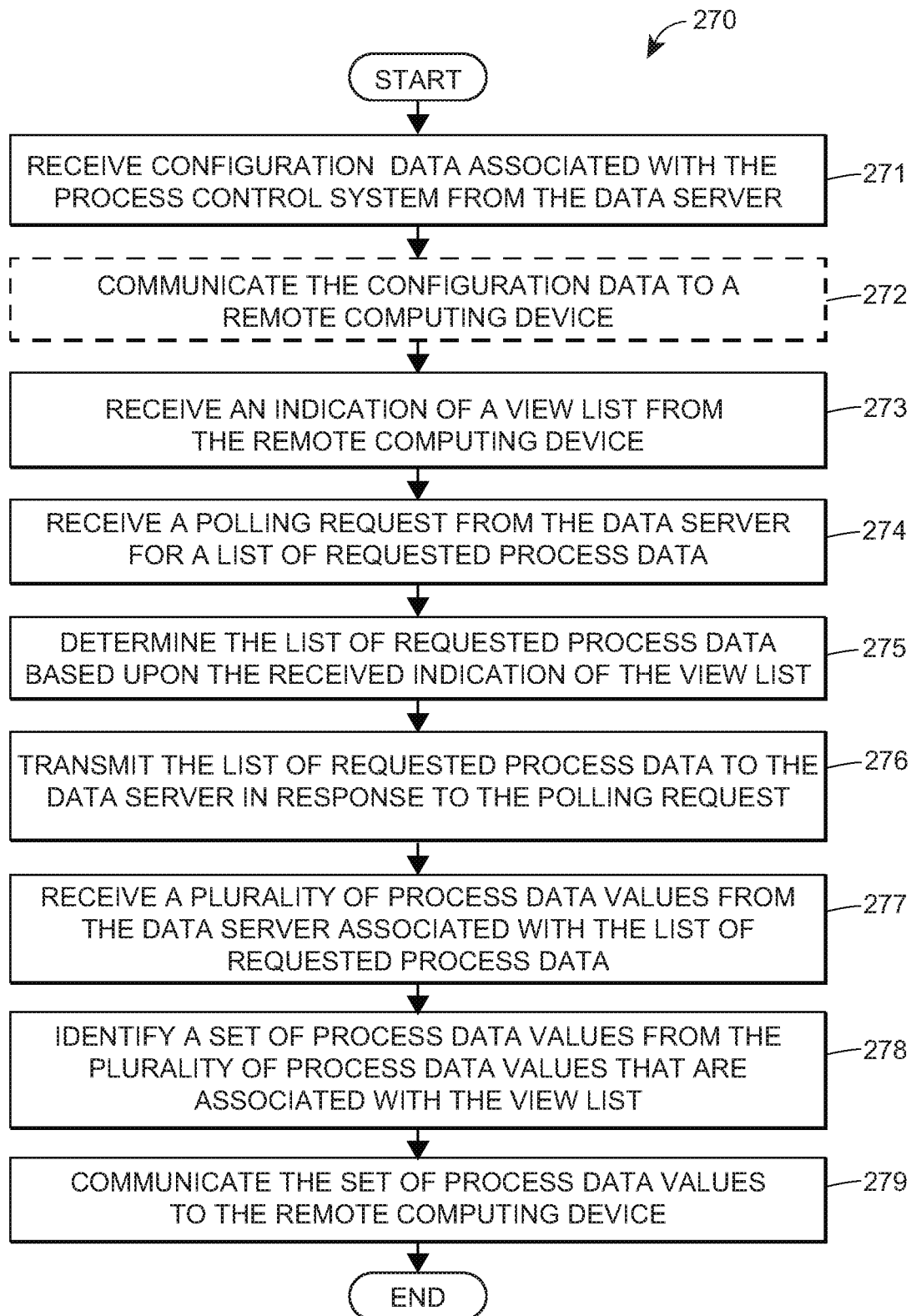
FIG. 2G is a flow diagram of an example mobile server communication method in a process control system of a process plant.

FIG. 2G illustrates an example mobile server communication method 270 for selecting, obtaining, and communicating process data to one or more remote computing devices. The mobile server communication method 270 (or parts thereof) may be implemented repeatedly by the mobile server 178 to provide data streams or otherwise provide process data values from the process control system to the remote computing devices, and the method 270 may be implemented in conjunction with one or more of the other methods described herein. Although the method 270 is described as receiving and communicating process data, the mobile server 178 may also obtain and transmit additional data relating to the process plant to the remote computing devices in some embodiments.

At block 271, the mobile server 178 receives configuration data associated with the process control system form the data server 174 via the remote access network 164. The configuration data may include one or more configuration files 74, information associated with such files, or other information describing available process data within the process control system. In some embodiments, the mobile server 178 may store a representation of a configuration of the process control system (or portion thereof) within a memory of the mobile server 178 to improve the speed of searches by remote computing devices. The data server 174 may then provide only updates or changes to the configuration data, which the mobile server 178 may use to modify the stored representation of the configuration of the process control system. In some embodiments, at block 272, the mobile server 178 may communicate some or all of the configuration data to one or more remote computing devices via the mobile network. For example, the mobile server 178 may provide lists of entities, parameters, or related information responsive to a request for a list of available process data or in response to a user query, as described elsewhere herein.

At block 273, the mobile server 178 receives an indication of a view list from at least one remote computing device via the mobile network. The indication may specify process data in the view list by data source or parameter, such as by specifying an area, processing unit, or process parameter within the process control system. The indication may alternatively specify a predetermined view list stored in the memory of the mobile server 178, which may include entries associated with entities or parameters within the process control system. The mobile server 178 may receive a plurality of such view lists from a plurality of remote computing device, in which case the mobile server 178 may further generate a combined list of requested data in some embodiments. The mobile server 178 may further generate a list of requested changes including only indications of changes in the process data requested. The mobile server 178 may continue to receive indications of view lists from remote computing devices and may update the lists until a polling request is received from the data server 174.

At block 274, the mobile server 178 receives a polling request from the data server 174 via the remote access network 164. In response to receiving the polling request, at block 275, the mobile server 178 determines a list of requested data based upon the received one or more indications of view lists from the remote computing devices. The mobile server may identify process data requested by the remote computing devices based upon indications of predetermined lists. In some embodiments, the mobile server 178 may further generate a combined list of requested data from a plurality of remote computing devices. The mobile server 178 may further generate a list of requested changes including only indications of changes in the process data requested. In yet further embodiments, the mobile server 178 may identified related process data that is related to requested data based upon context but not expressly requested by the remote computing devices. The list of requested process data may include an indication of such related process data in order to further obtain process data likely to be requested by the users of the remote computing devices. At block 276, the mobile server 178 then transmits the determined list of requested process data to the data server 174 via the remote access network 164. The transmitted list of requested process data may be any of the foregoing lists or other similar lists as described herein.

At block 277, the mobile server 178 receives a plurality of process data values from the data server 174 via the remote access network 164. The process data values may include data generated by entities within the process control system and communicated to the data server 174 via the process control network 162. In some embodiments, the plurality of process data values may include data requested by a plurality of remote computing devices. Therefore, the mobile server 178 identifies a set of process data values from the received plurality of process data values that correspond to the data associated with a particular view list at block 278. The mobile server 178 may identify a plurality of such sets of process data values, each associated with a view list indicated by one or more of the remote computing devices. Each set of process data values includes data values directly or indirectly requested by a remote computing device based upon the indication of the view lists received from the remote computing device. Once the set of process data values is identified, the mobile server 178 communicates the set of process data values to the corresponding one or more remote computing devices via the mobile network at block 279. This may include communicating via a notification service 196, which may be configured to push notifications to remote computing devices.

Figure 2H:
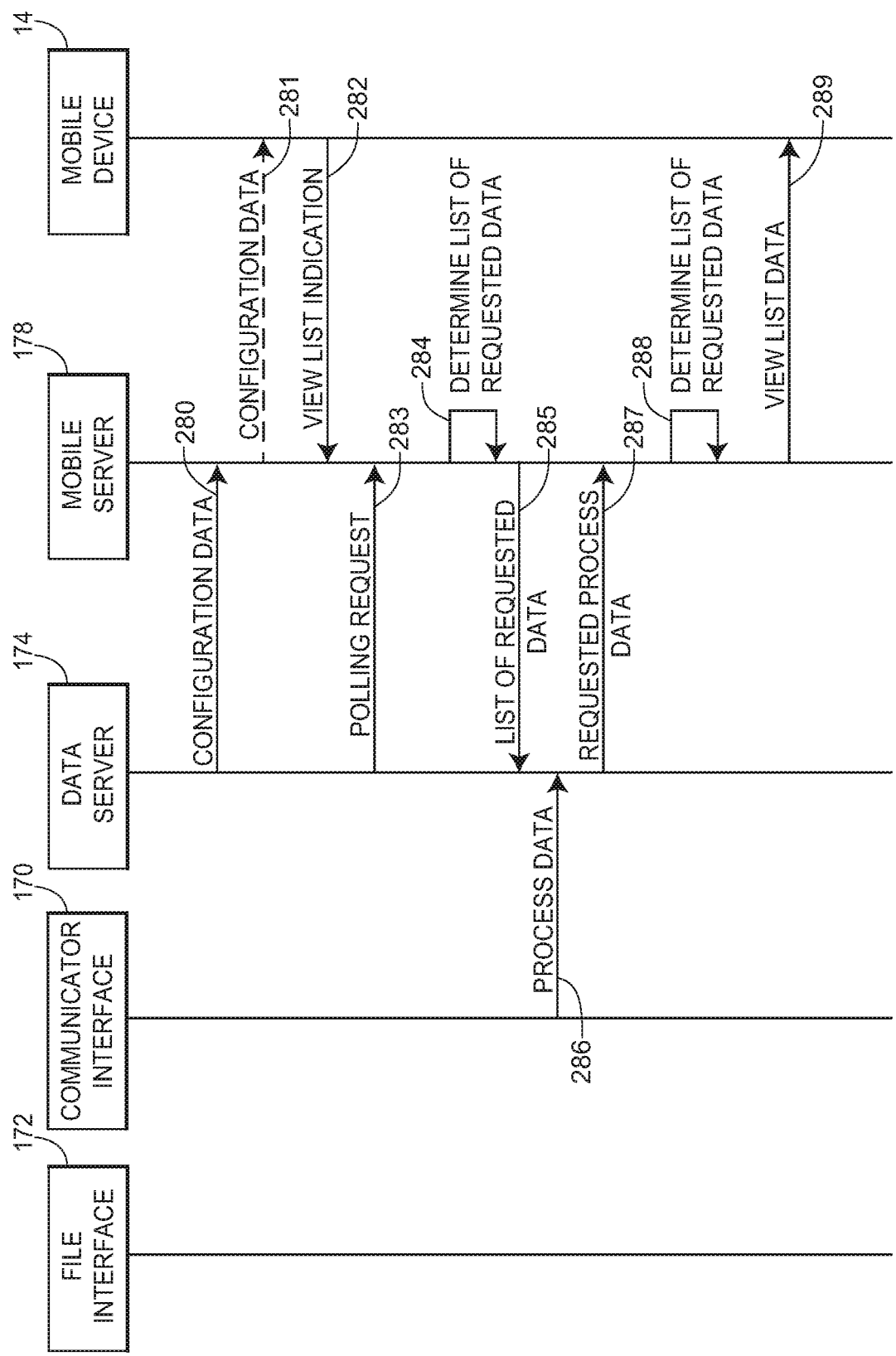
FIG. 2H is a sequence diagram of an example mobile server communication sequence in a process control system of a process plant.

FIG. 2H illustrates an example mobile server communication sequence showing communication between the process control system (specifically, a file interface 172 and a communicator interface 170), the data server 174, the mobile server 178, and a remote computing device (specifically, a mobile device 14). The example mobile server communication sequence particularly focusses on communication involving the mobile server 178. Although the connections are shown as being direct in order to better illustrate the salient features of the sequence, it should be understood that intervening components may be involved.

For example, the file interface 172 may communicate configuration data to the data server 174 and a communicator interface 170 may further communicate process data to the data server 174. The controller 40 and the data server 174 communicate via the via the process control network 162. The data server 174 and the mobile server 178 communicate via the remote access network 164. The mobile server 178 and the mobile device 14 communicate via the mobile network, which may include a local network at the process plant (e.g., a part of the remote access network 164), a notification service 196, or the Internet 180. Although the example sequence only illustrates one of each of the file interface 172, communicator interface 170, data server 174, mobile server 178, and mobile device 14 for clarity, further embodiments my include a plurality of any or all of these components.

The exemplary communication sequence begins with the communication of configuration data from the data server 174 to the mobile server 178 (line 280). In some embodiments, the mobile server 178 may further communicate the configuration data (or a portion thereof) to the mobile device 14 (line 281). The mobile device 14 then communicates a view list indication to the mobile server 178 (line 282), which may include entries associated with entities or parameters within the process control system or may indicate a predetermined list stored at the mobile server 178. The mobile server 178 may then wait for a polling request from the data server 174. The mobile server 178 receives the polling request from the data server 174 (line 283), which may be transmitted from the data server 174 periodically. In response to the polling request, the mobile server 178 determines a list of requested data based at least in part upon the view list indication received from the mobile device 14 (line 284). In some embodiments, determining the list of requested data may include determining view list entries, combining view list entries for a plurality of remote computing device, and determining changed or updated view list entries to request. When the list of requested data is determined, the mobile server 178 sends the list of requested data to the data server 174 (line 285).

The data server 174 receives process data from the communicator interface 170 (line 286). At least part of the received process data is then transmitted from the data server 174 to the mobile server 178 based upon the list of requested data (line 287). Upon receiving the process data from the data server 174, the mobile server 178 determines view list data (line 288), including process data values associated with the entities or parameters of the view list. Determining the view list data may include selecting a set of view list data values from the received process data for each view list associated with one or more mobile devices 14. The mobile server 178 then transmits the view list data to the mobile device 14 (line 289).

Figure 2I:
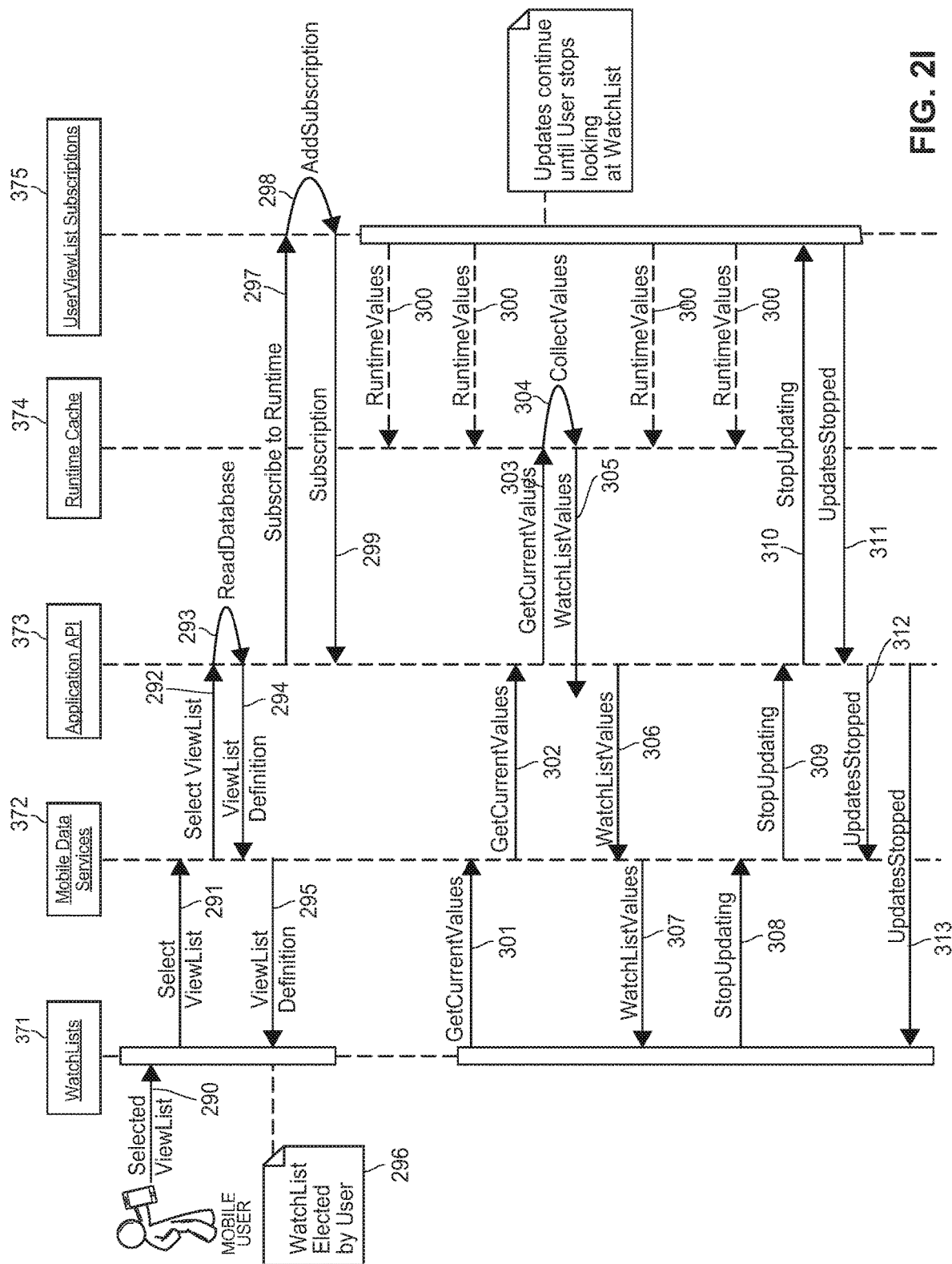
FIG. 2I is a sequence diagram of an example view list subscription sequence in a process control system of a process plant.

FIG. 2I illustrates an example view list subscription sequence showing communication between various modules implemented by a mobile device 14 and/or mobile server 178. With momentary reference to FIG. 2K, in an exemplary embodiment, the mobile server 178 may implement a watch list module 371, a mobile data services module 372, an application program interface (API) 373, a runtime cache 374, and a user view list subscriptions module 375. In an alternative embodiment, the watch list module 371 and mobile data services module 372 may run on the mobile device 14, while the runtime cache 374 and user view list subscriptions module 375 may run on the mobile server 178, and the API 373 may be split between both the mobile device 14 and the mobile server 178. The view list subscription sequence shows selection of a view list, subscription to a data stream associated with the view list, and disconnection from the data stream.

Selection of the view list begins with a user of the mobile device 14 selecting a view list at the mobile device 14. An indication of the selection may be communicated to the watch list module 371 by the mobile device 14 (line 290). Because the indication of the view list selection may not fully specify the data associated with the view list, the view list module 371 communicates the indication of the view list selection to the mobile data services 372 (line 291), which further communicates the indication of the view list selection to the API 373 (line 293). The API 373 then accesses a database storing a definition of the selected view list and reads a view list definition specifying the data associated with the view list (line 293). The view list definition is then communicated back to the mobile data services module 372 (line 294), which communicates the view list definition to the watch list module 371 (line 295). The watch list module 371 may provide the view list definition to the mobile device 14 or another module of the mobile device 14 to generate the user-selected watch list 296. The user-selected watch list 296 may be displayed to the user or the values stored for later use.

Subscription to a corresponding data stream begins, in response to the selection of the view list, with the API communicating a subscription request to the user view list subscriptions module 375 (line 297). The user view list subscriptions module 375 adds a subscription to process data values from the process control system based upon the view list selection (line 298). Adding the subscription may include requesting process data values from the data server 174, as described elsewhere herein. Once the subscription is added, the user view list subscriptions module 375 communicates a confirmation of the subscription to the API 373 (line 299), and the user view list subscriptions module 375 begins communicating runtime values from the process control system to the runtime cache 374 (lines 300). The runtime values may be process data values associated with entities or parameters within the process control system, as discussed elsewhere herein.

In the example view list subscription sequence, the watch list module 371 updates the runtime values periodically (e.g., every second) or episodically (e.g., when the user selects an option to view the specific data). To obtain the runtime values, the watch list module 371 sends a current value request to the mobile data services module 372 (line 301), which is further communicated to the runtime cache 374 (line 303). When the current value request is received at the runtime cache 374, the requested runtime values for the view list are collected (line 304) and communicated to the API 373 (line 305). The API 373 then communicates the runtime values for the view list to the mobile services module 372 (line 306), which communicates the runtime values to the watch list module 371 (line 307). This sequence may be repeated whenever new runtime values are desired.

Disconnection from the data stream occurs when a stop updating request is sent from the watch list module 371 to the mobile data services module 372 (line 308), which is further communicated to the API 373 (line 309). The API 373 communicates the stop updating request to the user view list subscriptions module 375 (line 310). Upon receipt of the stop updating request, the user view list subscriptions module 375 may stop obtaining runtime values (i.e., process data values) for the view list. The user view list subscriptions module 375 also sends a stop updating confirmation message to the API 373 (line 311), which communicates the stop updating confirmation message to the mobile data services module 372 (line 312), which further communicates the stop updating confirmation message to the watch list module 371 (line 313).

Figure 2J:
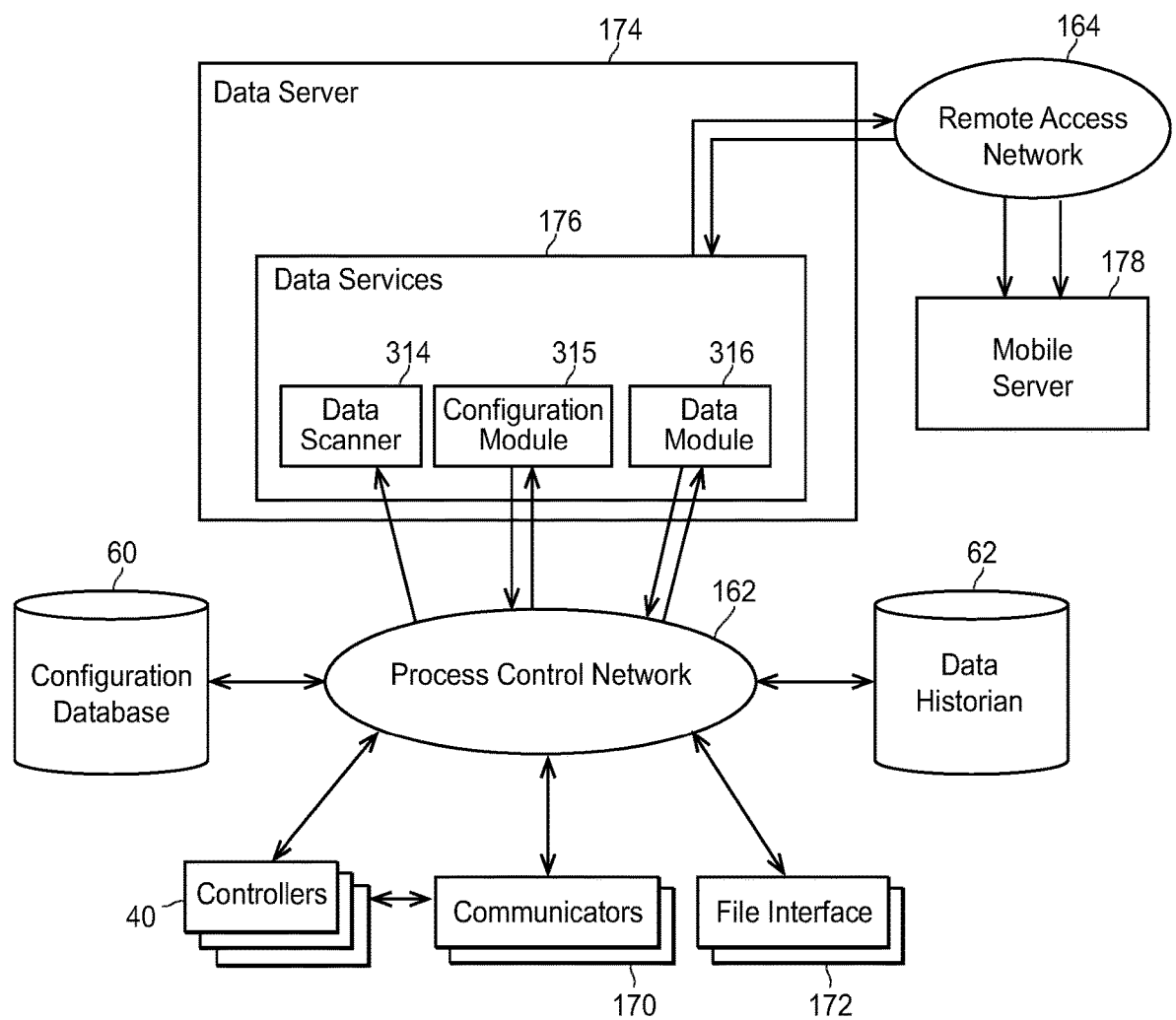
FIG. 2J is a block diagram of an example data server in a process control system of a process plant.

FIG. 2J illustrates an example data server 174 in the process control system. The data server 174 is communicatively connected to the server 178 via the remote access network 164. Additionally, the data server 174 is communicatively connected to a plurality of components within the process control system via the process control network 162. The process control network 162 connects the data server 174 to controllers 40, communicator interfaces 170 associated with the controllers 40, a configuration database 60, file interfaces 172 that provide configuration data to the data server 174, and a data historian 62 storing past process data associated with the process plant.

The data server 174 includes data services 176 to facilitate communication, which may include a plurality of specialized modules or routines. The data services 176 may include a data scanner 314, a configuration module 315, and a data module 316. The configuration module 315 may communicate with the configuration database 60 or file interface 172 to obtain configuration data regarding the process control system, such as configuration files 74. The data module 316 may request and obtain data values from the data historian 62, controllers 40, or communicator interfaces 170. The data module 316 may also select received data values for communication to the mobile server 178, according to the methods discussed elsewhere herein. The data scanner 314 may passively receive streaming process data values from controllers 40 or communicator interfaces 170 via process control network 162. In some embodiments, the data scanner 314 may scan all process data being communicated through the process control network 162, some of which process data values may then be identified for communication to the mobile server 178. Additional, alternative, or fewer elements may be included in other embodiments of the data server 174.

Figure 2K:
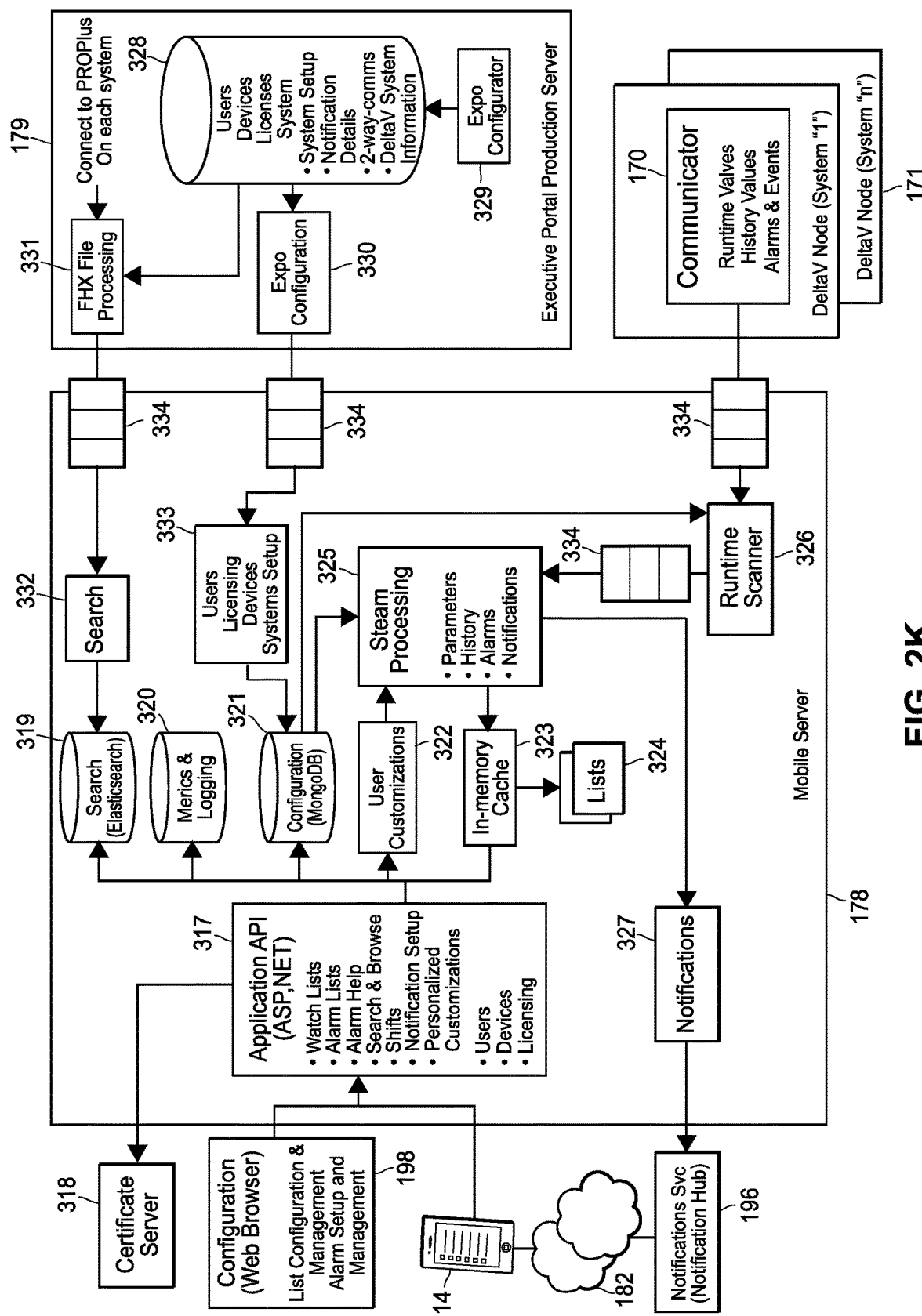
FIG. 2K is a block diagram of an example mobile server in a process control system of a process plant.

FIG. 2K illustrates an example mobile server 178 in the process control system. The mobile server 178 is communicatively connected with the mobile device 14 or web client 198 to provide process data to a remote user, which may include L1 Data. An application API 317 handles communication of data lists (e.g., alarm lists, watch lists, etc.) and related data values between the mobile server 178 and the remote computing device (i.e., the mobile device 14 or web client 198). Additionally, the mobile server 178 may include a notification module 327 that communicates notifications to the mobile device 14 via a notification service 196, which may further send the notification through third-party notification services 182, such as Google or Apple notification services. The application API 317 may further handle user authentication and personalization, for which purpose the application API 317 may further communicate with a certificate server 318, as well as various internal components of the mobile server 178. The internal components related to authentication and personalization may include a configuration database 321 and a user customization module 322. The configuration database 321 may further receive information from a user module 333, which may process configuration and personalization data received from a configuration unit 330 of an executive portal (expo) server 179 via a data connection 334.

In addition to authorization and personalization components, the application API 317 may communicate with a search database 319, a logging database 320, and a memory cache 323. The search database may receive configuration data from a search module 332 to facilitate searching available process data within the process control system at the level of L1 Data or summary data, as discussed elsewhere herein. The search module 332 may receive configuration data from a configuration file processing unit 331 of the expo server 179 via a data connection 334. The logging database 320 may store usage metrics for off-line analysis. The memory cache 323 communicates with the application API 317 and stream processing unit 325 to facilitate notifications and manage stored lists 324.

The stream processing unit 325 receives process data values from the process control system via a runtime scanner 326 via a data connection 334. The runtime scanner 326 further obtains process data values from the communicator interfaces 170 of a portal 171 within the process control system via a data connection 334. The runtime scanner 326 may identify process data values based upon configuration data from the configuration database 321. Upon receiving the process data values, the stream processing unit 325 evaluates the received data values to identify requested data values associated with parameters, entities, alarms, or notifications requested by a remote computing device. The user customization module 322 and configuration database 321 may provide information regarding data to be communicated to the remote computing devices, which may be added to the memory cache 323. When the stream processing unit 325 determines that a notification should be sent, the notification information may be sent to the notification module 327 to be pushed to the mobile device 14 via the notification service 196.

The expo server 179 may include an expo database 328 storing information regarding users, devices, licenses, and system-level information for the process control system. This may include configuration files 74, as well as information regarding user authorizations to access process data. The expo database 328 may be configured by an expo configurator unit 329 operating within the process control system. The expo database 328 then provides configuration and authorization data to the user module 333 via the configuration unit 330 and to the search module via the configuration file processing unit 331, via data connections 334. Additional, alternative, or fewer elements may be included in other embodiments of the mobile server 178. For example, the data server 174 may be included between the mobile server 178 and both the expo server 179 and the communicator interfaces 170.

Figure 2L:
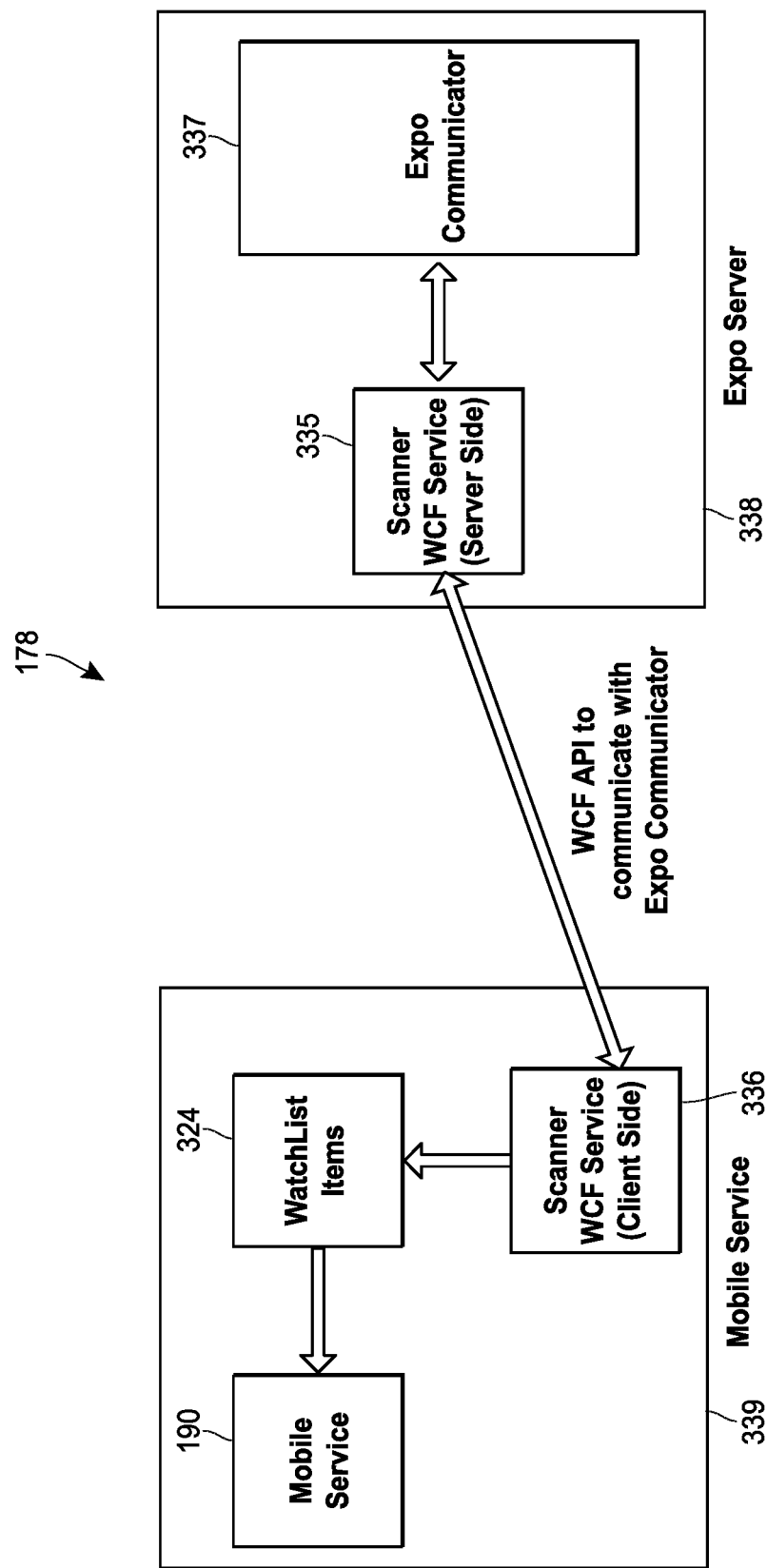
FIG. 2L is a block diagram of an example mobile server internal communication architecture in a process control system of a process plant.

FIG. 2L illustrates an example mobile server internal communication architecture within the mobile server 178. The example architecture presents an alternative view of the logical connections within the mobile server 178. The mobile server 178 may include a mobile service 339 and an expo server 338, which communicate via an asynchronous communication API, such as the Windows Communication Foundation (WCF) framework (developed by Microsoft Corp.) between a server-side scanner 335 within the mobile service 339 and a client-side scanner 336 within the expo server 338. Within the expo server 338, the server-side scanner 335 communicates with the expo communicator 337 to handle configuration from the expo database 328. Within the mobile service 339, the client-side scanner 336 communicates received data to the watch list items unit 324, which further communicates to the mobile service 190. The mobile service 190 further manages communication with the mobile devices 14.

Notifications and Alarms

In addition to other process data, the systems and methods described herein may be used to communicate alarms associated with the process plant to the users of remote computing devices. Because alarms are frequently time-sensitive and may be urgent, the real-time data communication aspects of the systems and methods herein are of particular value for alarms. The alarms may be included as L1 Data generated by the process control system and may be included in the process control data values communicated to the mobile server 178 via the data server 174. For example, an alarm may be a parameter defined in the configuration data and may be included in the process data associated with an entity, such as a control module. Such alarms may be process parameters and may have alarm statuses as process parameter data values, which may be selected from a predefined set of alarm statuses (e.g., suppressed, disabled, acknowledged, active unacknowledged, active acknowledged, and inactive unacknowledged). The alarm statuses may be based upon other parameters within the process control system or otherwise indicative of conditions within the process plant, such as a state of a processed material within a portion of the process plant, an environmental condition within a portion of the process plant, or a status of a device within the process plant (e.g., a field devices 44-46 or equipment units). In some embodiments, the conditions associated with the alarms may be monitored based upon process inputs or outputs associated with the conditions, such as where the condition itself is not directly measured within the process (e.g., due to physical constraints within the process plant).

As with other process data, the alarms may be selected for monitoring or subscription as part of alarm lists selected by users of remote computing devices. The mobile server 178 may thus receive alarm statuses as part of the process data values transmitted from the data server 174. The mobile server 178 may further process the alarm statuses to determine whether the user should be alerted. Alternatively, the alarms may be implemented by the mobile server 178 based upon associated process data values from the process control system. For example, an alarm may specify value ranges for one or more parameters associated with each of a plurality of alarm statuses. The mobile server 178 may then subscribe to the associated one or more parameters and determine the alarm statuses when the associated parameter values are received from the data server 174. Regardless of how generated, the alarms may be monitored to determine when to alert users. When an alarm status meets one or more criteria for transmission, the mobile server 178 may communicate a notification or alert to the corresponding remote computing device for presentation to a user. Such alerts or notifications may be communicated through the mobile network like other process data values, or the alerts or notifications may be transmitted via a notification service 196 (which may further interface with other services, such as third-party notification services 182, such as Google or Apple notification services). Thus, the alarm and notification methods and systems described herein may be implemented by or in conjunction with the other methods described elsewhere herein.

Figure 2M:
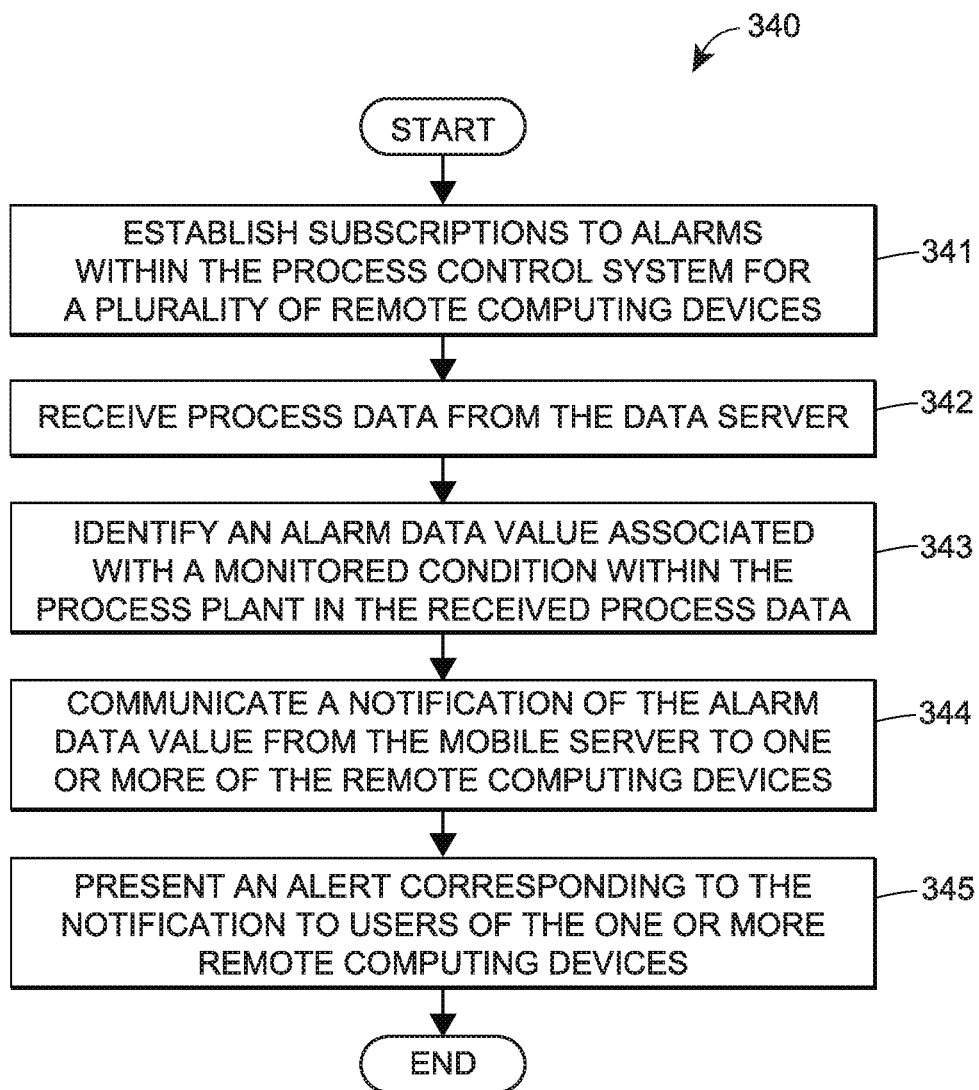
FIG. 2M is a flow diagram of an example alarm notification method in a process control system of a process plant.

FIG. 2M illustrates an example alarm notification method 340 for monitoring a process control system and providing alarms to a remote computing device. The alarm notification method 340 may be implemented by the mobile server 178 to identify and transmit notifications or other alerts associated with alarms. At block 341, the mobile server 178 establishes subscriptions to alarms in a process control system for one or more remote computing devices. As discussed elsewhere herein, such subscriptions may be established in response to selection of a data list (e.g., an alarm list or other list containing alarms as process data entries) and a request for process data including the alarms to the data server 174 from the mobile server 178, which may be sent in response to a polling request. At block 342, the mobile server 178 receives process data from the data server 174 via the remote access network 164. Such process data may include a plurality of process data values, which may be received as one or more streams of process data values transmitted in real-time as they are generated within the process control system.

Upon receiving the process data, the mobile server 178 identifies an alarm data value in the received process data at block 343. The alarm data value may be an alarm status associated with a monitored condition within the process plant. Alternatively, the alarm data value may be another process data values associated with an alarm status. Based upon the identified alarm data value, the mobile server 178 may determine a notification associated with the alarm status to communicate to a remote computing device.

At block 344, the mobile server 178 communicates the notification of the alarm data value to one or more remote computing devices. The notification may include the alarm status or may be an alternative notification. In some embodiments, the notification may further include additional information related to the alarm, such as a recommendation regarding addressing a condition associated with the alarm, a time in which to address the condition, or a note regarding the condition. Such additional data may be obtained from a data historian 62 or knowledge repository 64 via the data server 174, or the additional data may be obtained from an enterprise historian 188 by the mobile server 178. The data server 178 may communicate the notification (including any additional data) to one or more remote computing devices based upon view data lists associated with the remote computing devices, as discussed elsewhere herein. Communicating the notification may include sending the notification through the mobile network, such as the Internet 180 or a local network. A local network may be used, for example, to send the notification to a mobile device 14 via the remote access network 164 by a Wi-Fi access point 12*a*. In some embodiments, the notification may be communicated via a notification service 196 to the remote computing devices. The notification service 196 may push the notification to a remote computing device, regardless of whether an application associated with the process data (e.g., a special-purpose monitoring application or a web browser capable of receiving process data from the mobile server 178) is running on the remote computing device at the time the notification is communicated. Thus, the user may be alerted of the alarm even when the user is not viewing process data. Upon receiving the notification, the remote computing device presents an alert corresponding to the notification to the user at block 345.

Figure 2N:
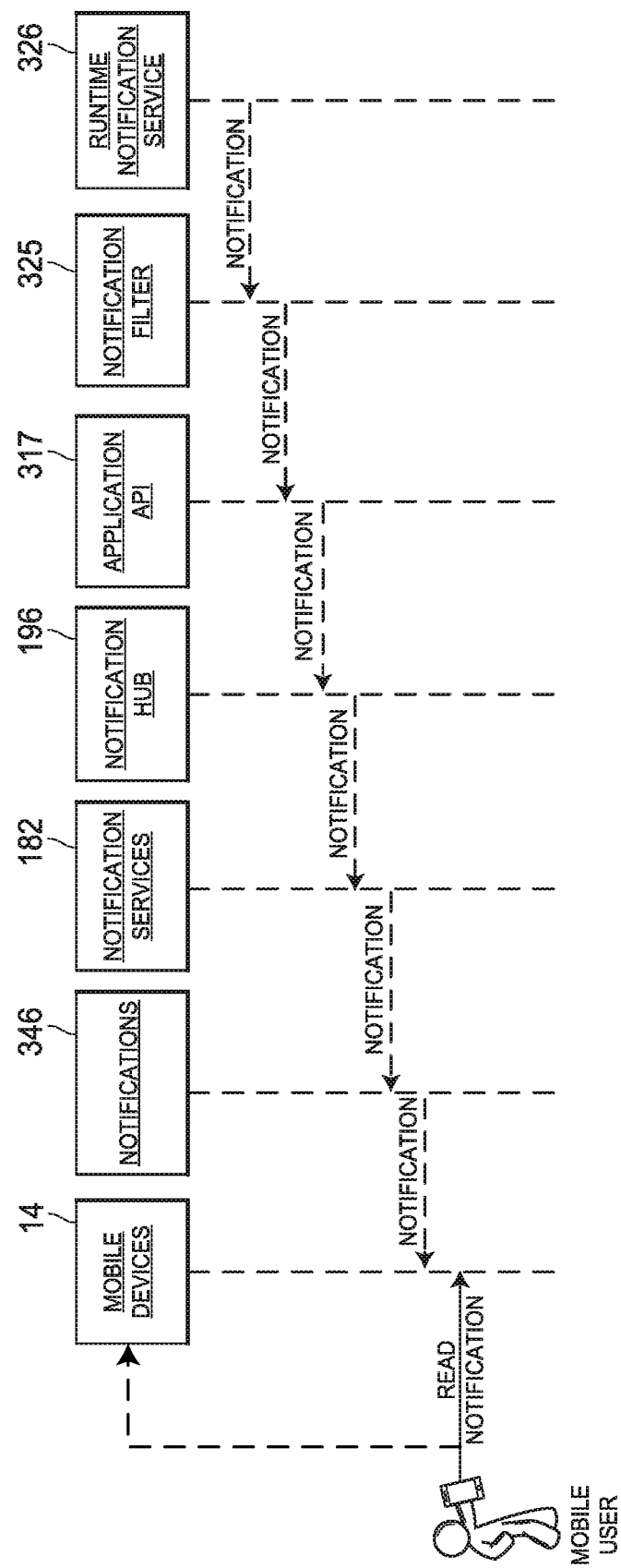
FIG. 2N is a sequence diagram of an example alarm transmission sequence in a process control system of a process plant.

FIG. 2N illustrates an example alarm transmission sequence showing communication of an alert or notification from the mobile server 178 to a mobile device 14. In an exemplary embodiment, the mobile server 178 may implement a runtime notification service 326, a notification filter 325, and an application API 317. When a notification is identified by the mobile server 178 for transmission to the mobile device 14, the notification may be generated by or communicated to the runtime notification service 326 of the mobile server 178. Alternatively, the runtime notification service 326 may identify the notifications to send to the mobile server 14. In either case, the runtime notification service 326 sends the notification to the notification filter 325, which may further determine how the notification is to be transmitted to the mobile device 14. The notification filter 325 then sends the notification to the application API 317 for further transmission.

The application API 317 may communicate with a notification service 196 (e.g., an Azure Notification Hub developed by Microsoft Corp.), which may be configured to further transmit notifications via third-party notification services 182, such as Google or Apple notification services via a notifications channel 346 to the mobile device 14. Upon receiving the notification, the application API 317 sends the notification to the notification service 196. The notification service 196 selects a third-party notification service 182 and sends the notification to the selected third-party notification service 182. The third-party notification service 182 receives the notification and sends it to the notifications channel 346, which communicates the notification to the mobile device 14. The mobile device 14 may then present the notification to the user. In some embodiments, the mobile device 14 may receive a request to read pending notifications, which may include a selection of a notification by the user. In response to such request, the mobile device 14 may provide additional information included with the notification or separately received from the mobile server 178. In further embodiments, the mobile device 14 may implement a process data application to obtain process data associated with the notification in response to receiving the request from the user.

Figure 2O:
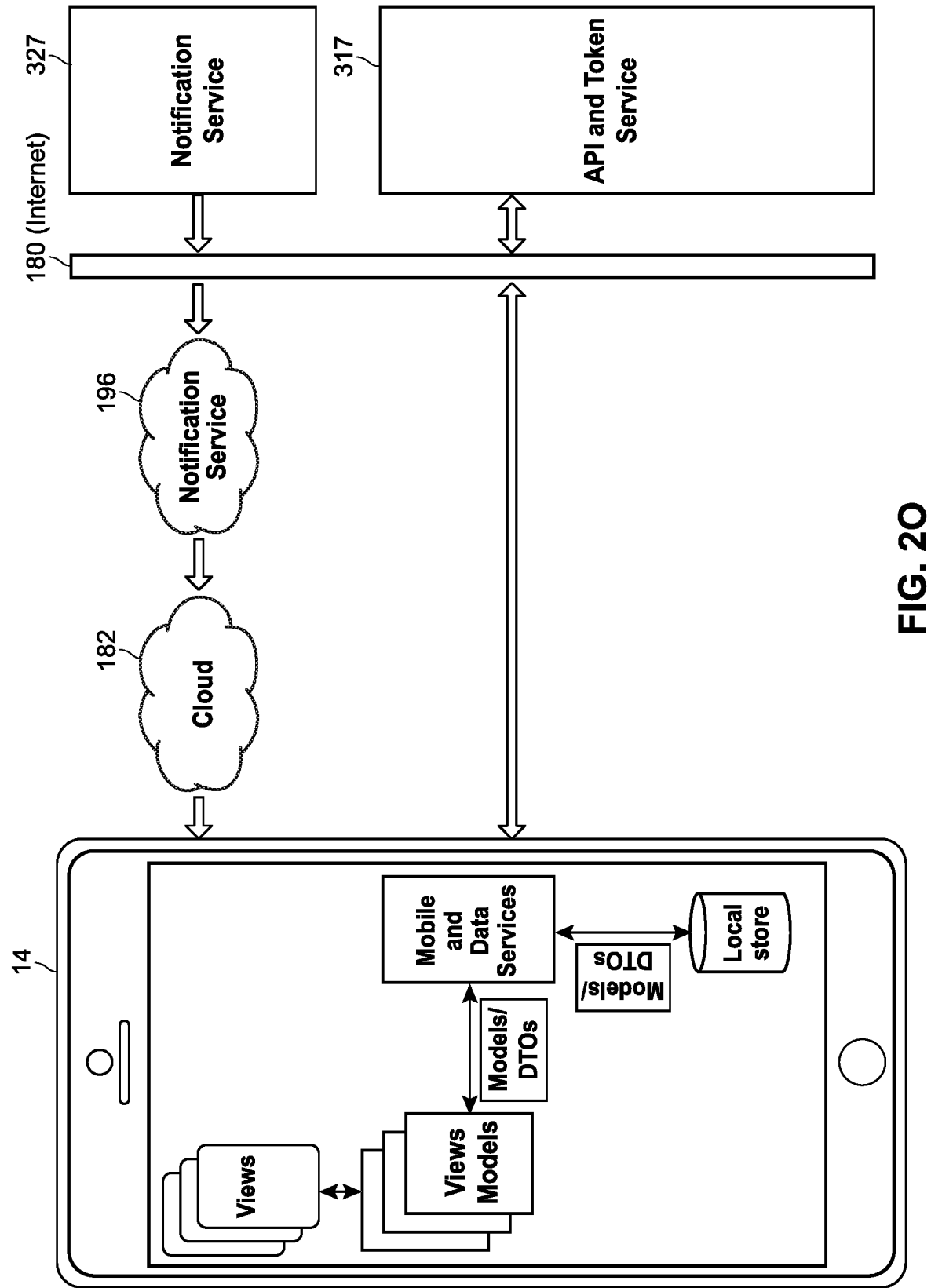
FIG. 2O is a block diagram of an example alarm notification architecture in a process control system of a process plant.

FIG. 2O illustrates an example alarm notification architecture, showing communication of notifications associated with alarms to a mobile device 14. The example architecture shows the main components involved in communicating data between the mobile device 14 and the mobile server 178. The mobile server 178 includes a notification module 327 that sends notifications (e.g., alerts associated with alarms) to the mobile device 14, but the notification module 327 does not receive communications back from the mobile device 14. The notification module 327 receives notifications to be sent to the mobile device 14 or determines such notifications based upon process data received by the mobile server 178. Upon identifying a notification, the notification module 327 may send the notification to the notification service 196 via the Internet 180. The notification service 196 may then send the notification to the third-party notification service 182, which may be a cloud-based service such as the iCloud by Apple Inc. The third-party notification service 182 may then push the notification to the mobile device 14 for presentation to the user.

The application API 317 of the mobile server 178 both sends and receives data. As discussed above, the application API 317 may send configuration data and requested process data values to the mobile device 14 via the mobile network, such as the Internet 180. The application API 317 also receives communication from the mobile device 14 via the mobile network, such as queries, requests for configuration data, or selections of process data (e.g., watch lists, alarm lists, etc.). The application API 317 may thus provide an interface between the mobile device 14 and the mobile server 178 for ordinary communication, while the notification module 327 pushes notifications of particularly time-sensitive information (e.g., alerts associated with alarms). The mobile device 14 may implement various software applications, modules, or routines to receive and send data, as well as to present data to a user via a GUI. For example, the mobile device 14 may include mobile and data services for handling communication via the mobile network (and, in some embodiments, to receive notifications). The mobile and data services may store and retrieve data from a local memory of the mobile device 14, as well as providing data for population in view models. The view models may combine views selected or created by a user with process data values received from the mobile server 178 or a local memory to present useable information regarding the process plant to the user. The view models may further communicate data to the mobile and data services for storage or for communication to the mobile server 178 to indicate a request for configuration data or process data from the process control system, as described elsewhere herein.

Figure 2P:
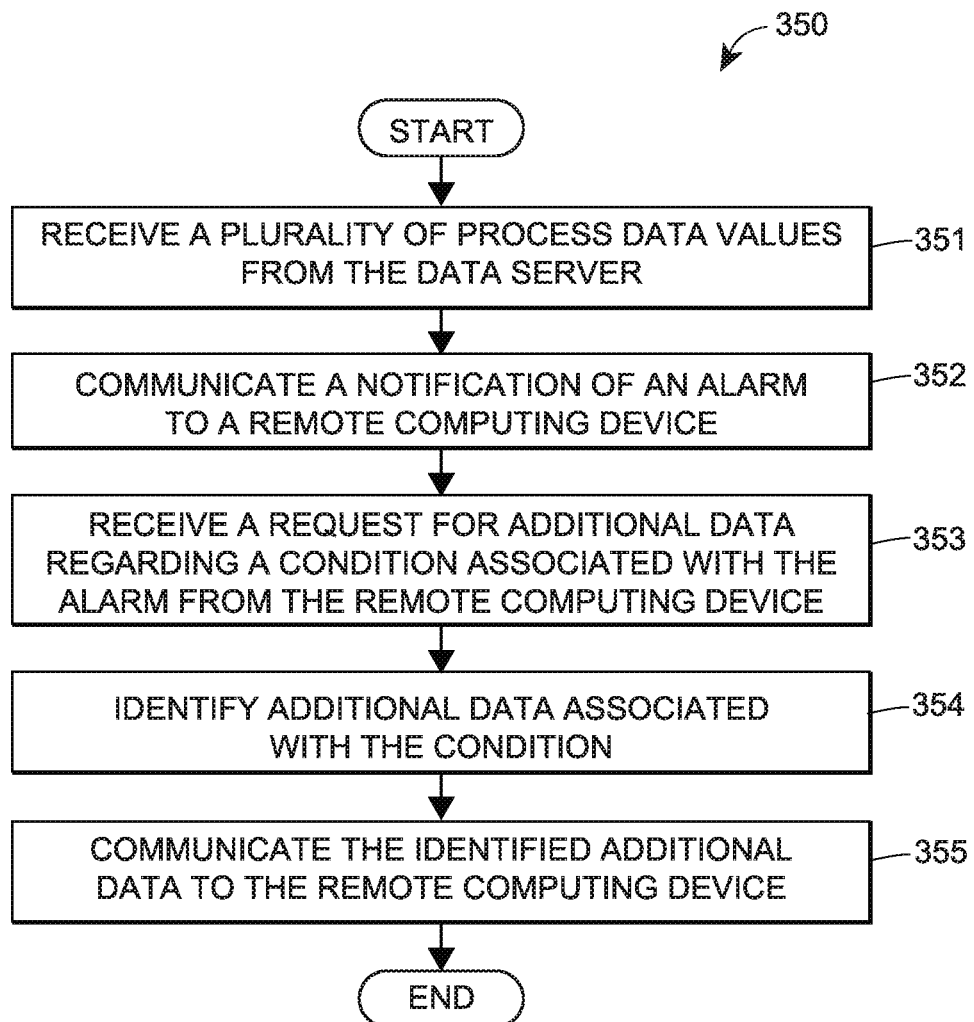
FIG. 2P is a flow diagram of an example alarm response method in a process control system of a process plant.

FIG. 2P illustrates an example alarm response method 350 for providing notifications and additional data regarding alarms within a process control system to a remote computing device, such as a mobile device 14. The method 350 may be implemented by the mobile server 178 to identify and transmit notifications or other alerts associated with alarms, receive requests for further information associated with such alarms, and provide additional data associated with the alarms. At block 351, the mobile server 178 may receive a plurality of process data values from the data server 174 via the remote access network 164, as described elsewhere herein. Upon receiving the process data from the mobile server 174, the mobile server 178 may identify data associated with alarms within the process control system. Identifying the alarms may include identifying alarm statuses in the plurality of process data values received from the data server 174, or identifying the alarms may include determining alarm statuses from parameter values within the plurality of process data values at the mobile server 178. The mobile server 178 may then generate or select a notification to transmit to the remote computing device, which may include an alarm status.

At block 352, the mobile server 178 communicates the notification associated with the identified alarm to the remote computing device. The notification may be communicated via a notification module 327 of the mobile server 178 to a notification service 196 for further communication to a mobile device 14 via a third-party notification service 182. Following receipt of the notification, the remote computing device may present the notification to the user and may receive a user request for additional data relating to the notification. The request for additional data may specify particular data associated with the alarm or a condition within the process plant associated with the alarm. For example, the user may select further detailed information from a list of available related information by selecting a representation of the notification. Alternatively, the request for additional data may simply request additional data that is available within the process control system and that is associated with the condition associated with the alarm.

At block 353, the mobile server 178 receives the request for the additional data associated with the condition from the remote computing devices. Such request for additional data may be received from the remote computing device to the mobile server 178 via the mobile network and received by as application API 317 of the mobile server 178. For example, a mobile device 14 may send a message including the request for additional data to the application API 317 of the mobile server 178 via the Internet 180. After the mobile server 178 receives the request for additional data, at block 354, the mobile server 178 may identify additional data associated with the condition to be sent to the remote computing device. The mobile server 178 may identify the additional data from an indication specifying the additional data included in the request. Additionally, or alternatively, the mobile server 178 may identify the additional data based upon configuration data previously received from the data server 174, such as by identifying areas, process units, equipment units, control modules, or parameters associated with the alarm (or an input parameter of the alarm). For example, process data regarding an equipment unit associated with a parameter value that triggered the alarm may be identified as additional data relevant to the request. In further embodiments, the mobile server 178 may identify data regarding the alarm or equipment that may be relevant to the condition in the process plant, such as recommendations or notes associated with the condition or entities within the process control system associated with the condition. If available at the mobile server 178, the identified additional data may be sent to the remote computing device. If part or all of the identified additional data is not available at the mobile server 178, the mobile server 178 may obtain the additional data. Obtaining the additional data may include requesting process data values associated with the additional data from the data server 174. Obtaining the additional data values may further include obtaining the additional data values from a data historian 62 or a knowledge repository 64. Once the mobile server 178 has the identified additional data, the mobile server 178 may communicate the identified additional data to the remote computing device via the mobile network. This may include sending one or more messages including the additional data values from the application API 327 to the mobile device 14 via the Internet 180. The remote computing device may then present the additional data values to the user or store the additional data values for later presentation.

Web Browser Implementation

Although the disclosure herein generally exemplifies remote computing devices as mobile devices 14, it should be understood that other remote computing devices (e.g., web clients 198, such as web browsers or applications therein) may use the disclosed systems and methods to access process data via the Internet 180 or other unsecured networks. In some embodiment, such remote computing devices may also communicate with the mobile server 178 via one or more secured networks. The processes described herein may nonetheless be used as a further security measure. An example web client implementation that may operate on a mobile device or a stationary computer connected to the mobile server 178 via an unsecure network is illustrated in FIG. 2Q.

Figure 2Q:
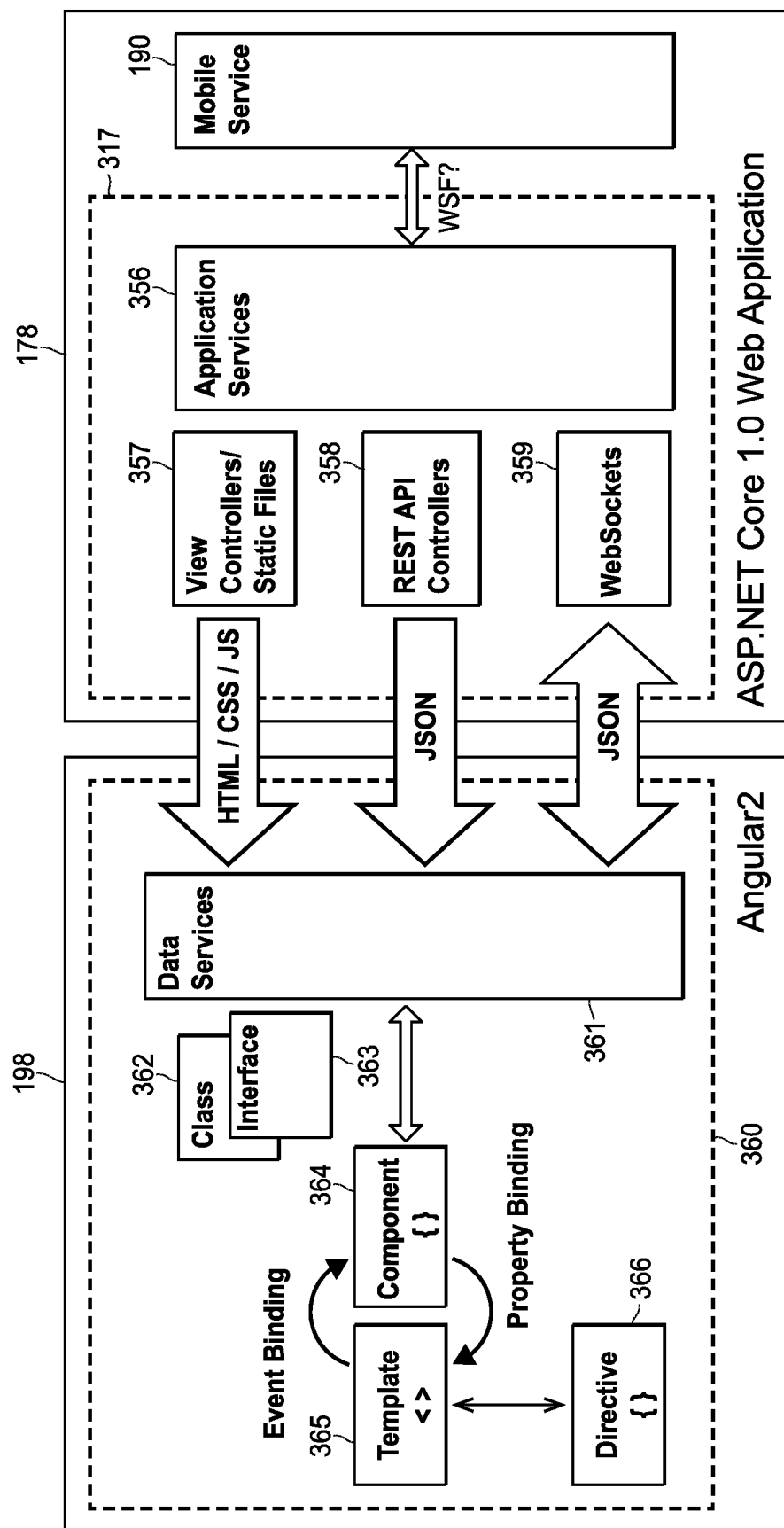
FIG. 2Q is a block diagram of an example web client implementation in accordance with the systems and methods described herein.

FIG. 2Q illustrates an example web client implementation for receiving process data at a web client 198 from a mobile server 178. The example diagram illustrates communication between components of the web client 198 and the mobile server 178. The mobile server 178 may include a mobile service 190 to control communication with remote computing devices, as discussed above. In web client implementations, the mobile service 190 may communicate with an application API 317 within the mobile server 178. The application API 317 may send and receive information from the mobile service 190 by one or more application services 356 of the application API 317. The application API 317 may then use view controllers 357, web services 358, or WebSockets 359. The view controllers 357 and web services 358 may provide data to the web client 198, while the WebSockets 359 may both send and receive data to and from the web client 359. The view controller 357 may transmit static files defining the contours of a view to be displayed by a GUI of the web client 198 (e.g., HTML pages, CSS files, or JavaScript). The web services 358 may transmit process data values to the web client 198 to be used with the static files. The web services 348 may be representational state transfer (REST) web services, and may transmit the data values efficiently using JavaScript Object Notation (JSON). The WebSockets 359 may also use JSON for communication between the mobile server 178 and the web client 198. Although not illustrated, the application API 317 may communicate with the web client 198 via the Internet 180 or other communication network.

The web client may include a data client unit 360, which communicates with the mobile server 178 via a data services module 361. The data services module 361 may receive the static files, data values, and any other data from the view controllers 357, web services 358, or WebSockets 359 of mobile server 178. The data services module 361 may also communicate data to the WebSockets 359. The data services 361 may communicate within the data client unit 360 to generate or provide data to GUIs of the remote computing device. To present the data to the user, the data client unit 360 may bind components 364 with templates 365 based upon directives 366, including directive from the user. Classes 362 and interfaces 363 may be used in communication between the data services 361 that receive the data as provided by the mobile server 178 and the components 364 of the user interface. The illustrate web client implementation is exemplary only, and additional, alternative, or fewer elements may be included in other embodiments of web client implementations.

GUI Generation

Figure 3A:
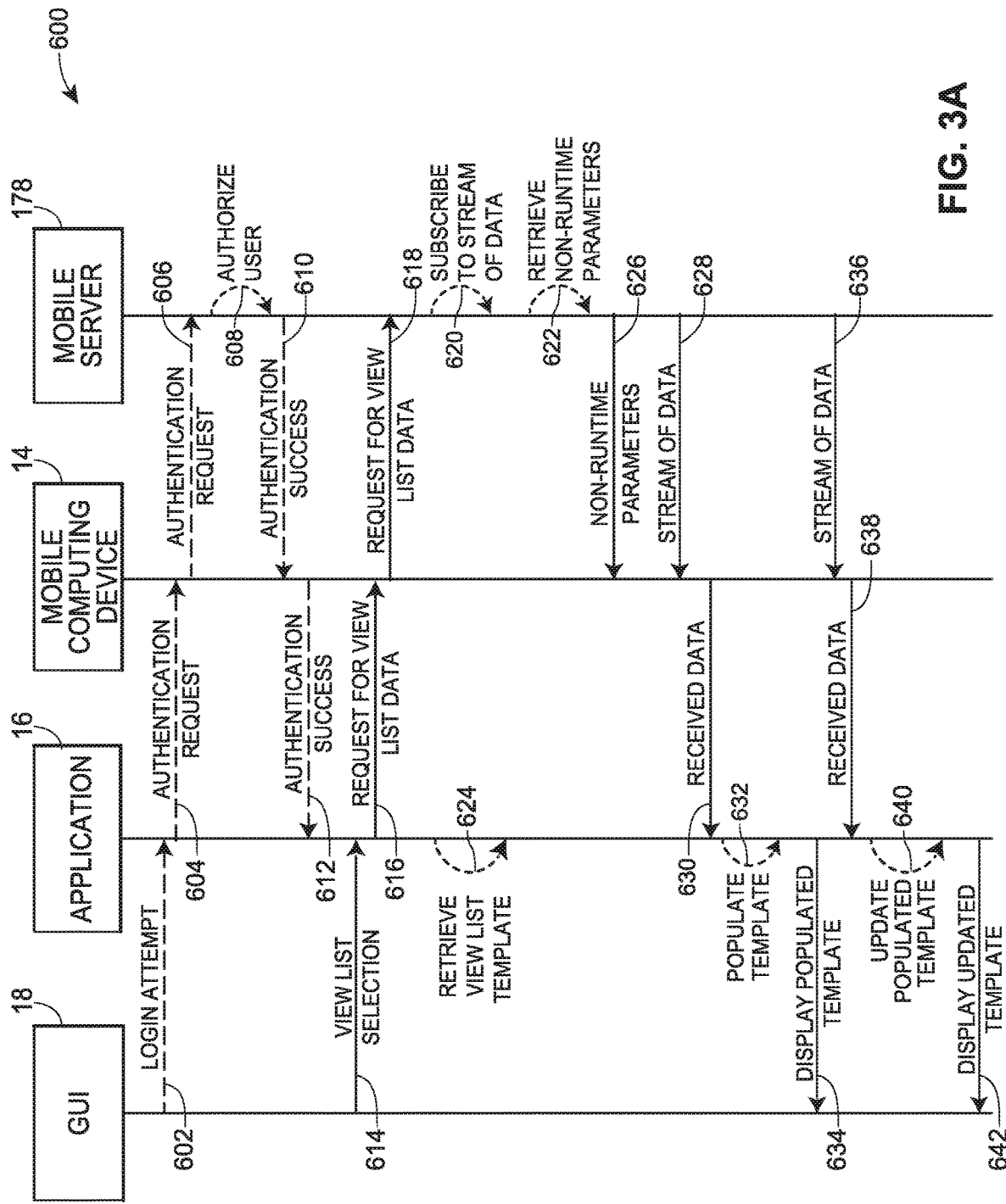
FIG. 3A is a signal diagram of an example GUI generation sequence executing on a mobile computing device.

As described above, an application executing on a mobile computing device is used to enable users to remotely view process data and alarms of a process control system. In particular, the application is configured to present various Graphical User Interfaces (GUIs) representative of the process data and/or alarms generated by the process control system. FIG. 3A illustrates a signal diagram detailing the interactions between the mobile server 178, the mobile computing device 14, an application 16 executing on the mobile computing device 14, and a GUI 18 presented on a display of the mobile computing device 14. Generally speaking, the application 16 and the mobile computing device 14 interact via one or more APIs of the mobile computing device 14 to generate and display the GUI 18. In addition to the APIs of the mobile computing device 14, the mobile server 178 may also include one or more APIs to control communications between the mobile server 178 and the mobile computing device 14, as well as to control access to the process data and/or alarms generated by the process control system.

In an aspect, the process illustrated in the signal diagram begins when a user interacts with the GUI 18 to log into (602) the application 16. As is generally known, the login process includes the user providing a user name and password. In one embodiment, the application 16 is a browser application executing on the mobile computing device 14. In this embodiment, the user may log into a web portal that facilitates the functionality described herein. In another embodiment, the application 16 is an application dedicated to interfacing with process control systems. In this embodiment, the login process may occur when the user launches the dedicated application. The application 16 receives the login information and generates an authentication request in accordance with an API of the mobile server 178. The authentication request may include an indication of an identity of the user and/or an indication of an identity of the mobile computing device 14. Next, the application 16 forwards (604) the authentication request to the mobile computing device 14 for transmission (606) to the mobile server 178 via a communication network. In the illustrated process, the mobile server 178 processes the authentication request and authorizes (608) the user to access process data and/or alarms generated by the process control system. In an embodiment, the access is limited to a set of process data and/or alarms specifically permitted in a user profile corresponding to the user. In some embodiments, the user may be authorized to access process data and/or alarms from a plurality of different process control systems. After granting access, the mobile server 178 transmits (610), to the mobile computing device 14, an acknowledgement that the user was successfully authenticated. The mobile computing device 14 then informs (612) the application 16 that the user was successfully authenticated.

After the user is authenticated to access the process data and/or alarms generated by the process control system, the user interacts with the GUI 18 to select (614) a view list of process data and/or alarms. The view list may be an alarm list, a watch list, a batch list, or a list of lists (i.e., a list of alarm lists, watch lists, batch lists, and/or other lists). For example, upon logging into the application 16, the application 16 may generate an interface that presents a plurality of view lists to which the user has access. In this example, the selection may be a click, a tap, or other user interaction with the GUI 18 that indicates a particular view list from the plurality of view lists. Of course, the GUI 18 may be configured to detect the selection through other known user interface techniques, including the use of verbal commands and/or gestures. Next, the application 16 generates a request for data corresponding to the selected view list. In an aspect, the application 16 formats the request for data to include an indication of the view list, in accordance with an API of the mobile server 178. The application 16 then forwards (616) the request for data to the mobile computing device 14 for transmission (618) to the mobile server 178 via the communication network.

According to aspects described elsewhere herein, when the mobile server 178 receives the request for data, the mobile server 178 queries a view list database (not depicted) to determine a plurality of parameters included in the indicated view list. In an embodiment, the mobile server 178 also determines a plurality of parameters associated with each item within the indicated view list. For example, if the indicated view list is an alarm list, the mobile server 178 determines a plurality of parameters associated with each alarm item within the alarm list. As another example, if the indicated view list is a list of lists, the mobile server 178 determines a plurality of parameters associated with each list within the list of lists (and a plurality of parameters associated with the items therein).

The plurality of parameters are divided into two general classifications: runtime parameters and non-runtime parameters. Runtime parameters include parameters that are generated by the field devices 44 and/or the control modules 70 indicative of a current state of operation. To this end, the runtime parameters may represent a "real time" or current view at status of the field devices 44 and/or the control modules 70. As an example, the runtime parameters may include a process value, a limit value, an output value, or an alarm record. On the other hand, non-runtime parameters tend to represent generally static characteristics of the field devices 44 and/or the control modules 70. As an example, the non-runtime parameters may include a name of a field device or control module, a tag of a field device or control module, a role of an item, a unit associated with a runtime parameter, and so on. It should be appreciated that although the non-runtime parameters are generally static, the non-runtime parameters may still change from time to time (e.g., when a new field device is added to the process control system).

Based on these different characteristics of runtime and non-runtime parameters, the mobile server 178 processes the request to retrieve data differently for runtime and non-runtime parameters. To this end, the mobile server 178 queries (622) configuration data (e.g., a FHX file) to retrieve the non-runtime parameters. The mobile server 178 then transmits (626) the retrieved non-runtime parameters to the mobile computing device 14. Conversely, for the runtime parameters, the mobile server 178 may subscribe (620) the mobile computing device 14 to a stream of data that includes the parameters. In an embodiment, to subscribe the mobile computing device to the stream of data, the mobile server 178 follows the steps of the data subscription method 220 illustrated in FIG. 2C. It should be appreciated that because the stream of data may, in some embodiments, be hierarchically organized, the stream of data may also include a reference to several non-runtime parameters (e.g., a name or tag of control module or field device). As another example, some view lists may include a graphical representation of a historic trend for a parameter. In this example, the stream of data may include a plurality of historical values (e.g., a value corresponding to every minute for the last 12 hours) for the parameter. Unlike the runtime parameters, these historical values are retrieved from a data historian (not depicted) interconnected with the mobile server 178. After the mobile computing device 14 is subscribed to the stream of data, the mobile server 178 may periodically transmit (628) the stream of data to the mobile computing device 14. In some embodiments, the stream of data may actually be an aggregated stream of data including a plurality of different streams of data from a plurality of different process control systems.

Additionally, according to aspects, the application 16 retrieves (624) a template (e.g., a view model) within a template database (not depicted) corresponding to the selected view list. The template includes locations on the GUI 18 where parameter values of the view list are displayed. As an example, if the template includes a title bar, the template may indicate a location on the title bar for a friendlyName parameter for the selected view list. In one scenario, the template is a default template for view lists of a particular type. In another scenario, the template for the selected view list may be a customized template. For example, the user may customize whether the GUI 18 corresponding to the selected view list includes a visualization of various parameters. To this end, the user may be able to customize which parameters (e.g., process values, set points, limits, and so on) are displayed in a graph presented on the GUI 18, whether the graph includes a scale, whether the graph includes a line chart or a bar chart, or even whether a graph is displayed on the GUI 18 at all.

After the mobile computing device 14 receives the retrieved non-runtime parameters and a stream of data including runtime parameters, the mobile computing device 14 provides the received data to the application 16. The application 16 then populates (632) the retrieved template with the data provided by the mobile computing device 14. To this end, the parameters included in the template and the parameters provided by the mobile computing device 14 may correspond to one another (e.g., both parameters have the same name). Next, the application 16 generates a set of instructions that causes the mobile computing device 14 to display (634) the populated template on the GUI 18. In an aspect, the set of instructions is formatted in accordance with an API of the mobile computing device. For example, an operating system of the mobile computing device 14 may include a plurality of APIs related to presenting a GUI on a display of the mobile computing device 14.

In an aspect, as described above, the mobile server 178 may transmit to the mobile computing device 14 parameters associated with each item within the selected view list. However, the template for the selected view list may not include a location for each parameter associated with each item therein. Accordingly, the parameters not included in the template are not displayed on the GUI 18. That said, the user may be capable of interacting with the GUI 18 to view another view list that corresponds to the item within the selected view list. To improve the speed at which a template corresponding to the other view list may be populated, the application 16 may cache the data provided by the mobile computing device. As a result, the template corresponding to the other view list may be populated without further communication between the mobile computing device 14 and the mobile server 178.

Further, as described above, when the mobile computing device 14 is subscribed to the stream of data, the mobile server 178 periodically transmits (636) data to the mobile computing device 14. The mobile computing device 14 then provides (638) the received data to the application 16. In some scenarios, the stream of data may include updated data values for one or more of the parameters included in the view list displayed on the GUI 18. Accordingly, the application 16 updates (640) the template to include the updated data values included in the stream of data. Next, the application 16 generates a set of instructions that causes the mobile computing device 14 to display (642) the updated template on the GUI 18.

At some point in time, the user may navigate away from the GUI 18 and/or otherwise interact with the mobile computing device 14 such that the application 16 no longer presents the GUI 18. In one scenario, the user has logged out of the application 16. Accordingly, the application 16 may detect the log out event and generate an unsubscribe message. The application 16 then forwards the unsubscribe message to the mobile computing device 14 for transmission to the mobile server 178. In response, the mobile server 178 unsubscribes the mobile computing device 14 from the stream of data. In another scenario, the user may select a new view list to display on the GUI 18. Accordingly, the application 16 may a selection of the new view list. The application 16 then generates an unsubscribe message for the current view list and also a request to receive data corresponding to the new view list. Next, the application 16 forwards the unsubscribe message and the request to receive data to the mobile computing device 14 for transmission to the mobile server 178. In response, the mobile server 178 unsubscribes the mobile computing device 14 and modifies the stream of data to reflect parameters corresponding to the new view list.

Figure 3D:
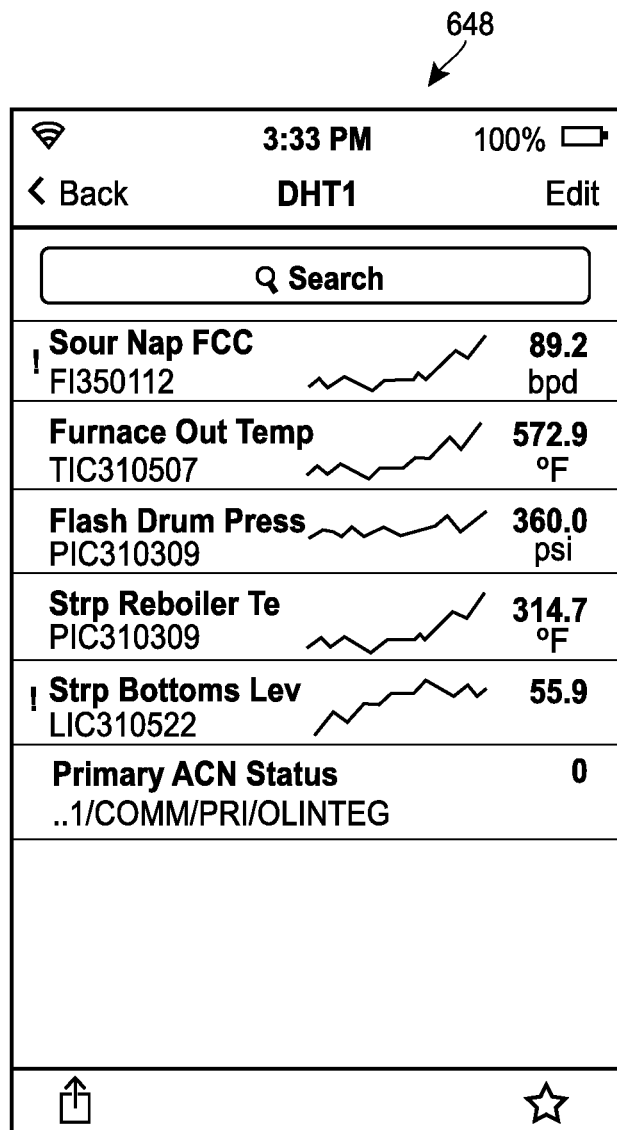
FIG. 3D is an example representation of a watch list GUI executing on a mobile computing device.
Figure 3F:
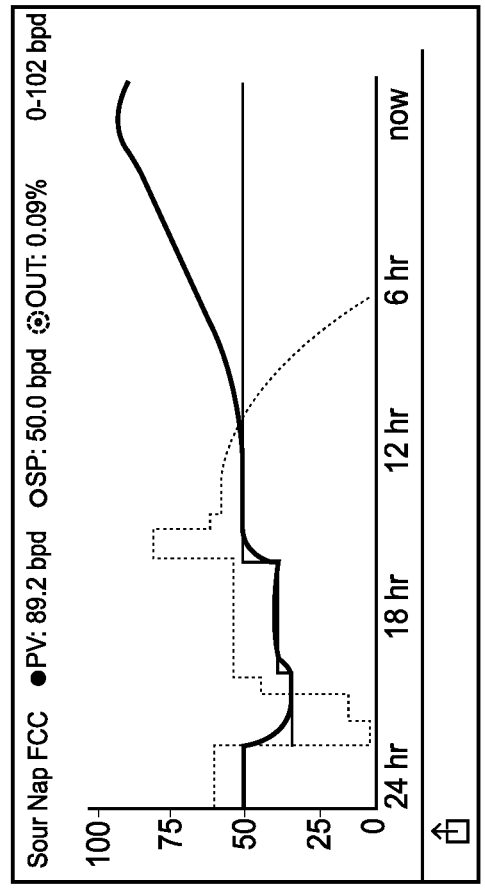
FIG. 3F is an example representation of a watch list item GUI executing on a mobile computing device.
Figure 3E:
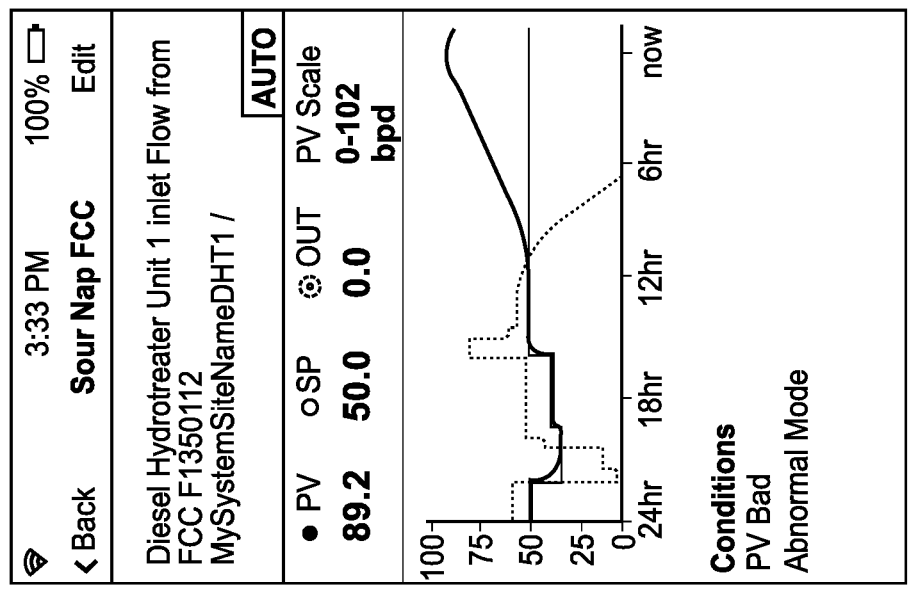
FIG. 3E is an example representation of a watch list item GUI executing on a mobile computing device.

Turning now to FIGS. 3B-3H, illustrated are example GUIs corresponding to different view list types: FIGS. 3B and 3C illustrate a GUI corresponding to a list of lists view list; FIG. 3D illustrate a GUI corresponding to a watch list view list; FIGS. 3E and 3F illustrate a GUI corresponding to a watch list item view list; FIG. 3G illustrates a GUI corresponding to an alarm list view list; and FIG. 3H illustrates a GUI corresponding to an alarm item view list. Each of the illustrated GUIs may be presented by the GUI 18 within the application 16 executing on the mobile computing device 14. As described above, the arrangement of the various GUI elements is governed by a template (e.g., a view model) corresponding to the particular view list. The template may include a location on the GUI 18 where a plurality of parameter values are to be displayed. To populate the template, the application 16 may be configured to generally follow the process described in the signal diagram 600. In particular, the interfaces illustrated in FIGS. 3B-3H may be presented by the GUI 18 in response to the user selecting a respective view list at step 614 of the signal diagram 600. Additionally, the interfaces illustrated in FIGS. 3B-3H may be presented in response to the application 16 populating a respective template for the respective view list and sending a set of instructions to the mobile computing device 14 to present the interfaces on the GUI 18 at steps 632 and 634 of the signal diagram 600, respectively.

With particular reference to FIGS. 3B and 3C, the GUI 18 is presenting a list of lists view list interface 644 and 646, respectively. The interfaces 644 and 646 include a display region to display a visual representation of individual lists within the list of lists. In the example illustrated on the interface 644, the individual lists are the DHT Area Alarms list, the DHT1 watch list, the Utilities Alarms list, the DHT2 watch list, and the Safety Alarms list. Each of the visual representations of a list may include a summary of the list. In particular, if the list is a watch list, the summary may include a number of watch list items within the watch list and a number of those watch list items having an abnormal state. On the other hand, if the list is an alarm list, the summary may include a number of active unacknowledged alarms within the alarm list, a number of inactive unacknowledged alarms within the alarm list, and a number of suppressed alarms within the alarm list. The visual representations of the lists within the list of lists may also include a friendly name of the list (e.g., DHT Area Alarms), a tag of a module monitored by the list (e.g., FIC350112), and/or a particular alarm of the module (e.g., HI_HI). Further, the visual representation of lists within the watch list include an icon that indicates a type of list (e.g., watch list vs. alarm list) and a status of the list. In particular, for an alarm list the status indicator corresponds to a highest priority unacknowledged or suppressed alarm within the alarm list, and for a watch list, the status indicator corresponds to whether or not the watch list includes a watch list item in an abnormal state.

The interfaces 644 and 646 also include a tab selection interface enabling the user of the mobile computing device 14 to select a tab of information to display on the GUI 18. As illustrated on the interfaces 644 and 646, the tab selection interface includes selection elements corresponding to a watch list tab of information, an alarm list tab of information, or an all lists tab of information. Although not depicted on the interface 644 or 646, the tab selection interface may also include a batch list tab of information. Selecting a selection element of the tab selection interface applies a filter (or removes a filter) to the lists displayed in display region. For example, if the watch lists selection element is selected, only watch lists are displayed in the display region. In the scenario illustrated on the interface 644, if the watch lists selection element is selected, the display region is filtered to only include the DHT1 watch list and the DHT2 watch list.

Additionally, the interfaces 644 and 646 include a search interface enabling the search for particular items included within a list of the list of lists. The search interface may be configured to receive user input indicative of a search term. For example, the user input may be text entered via a virtual or physical keyboard, speech captured by a microphone of the mobile computing device, or other known techniques for receiving user input indicative of a search term. The results of the search are displayed within the display region of the interface 644 and 646. According to aspects, the search may be performed on the set of cached data received by the mobile computing device 14 from the mobile server 178. As a result, the search may be carried out by the application 16 without communicating with the mobile server 178, reducing the time required to complete the search.

Further, the interfaces 644 and 646 include a shared list toggle element. To this end, each list within the list of lists may be classified as either a personal list (e.g., a list where the user alone may modify or configure the list) or a shared list (e.g., a list where multiple users may modify or configure the list). As illustrated on the interface 646, when the shared list toggle element is active, the display region includes both a list of personal lists and a list of shared lists. Conversely, as illustrated on the interface 644, when the shared list toggle is inactive, the display region only includes the list of personal lists.

Now with particular reference to FIG. 3D, the GUI 18 is presenting a watch list view list interface 648. In one scenario, the interface 648 is presented in response to the user selecting the DHT1 watch list when the GUI 18 is presenting one of the interface 644 or 646. The interface 648 includes a display region to display a visual representation of individual watch list items within the watch list. In the example illustrated on the interface 648, the individual watch list items are Sour Nap FCC, Furnace Out Temp, Flash Drum Press, Strp Reboiler Te[mp], Strp Bottoms Lev[el] and Primary ACN Status. Each of the visual representations of a watch list item may include a friendly name of the watch list item (e.g., Sour Nap FCC), a tag of a module monitored by the watch list item (e.g., FIC350112), and/or a hierarchical location of a module monitored by the watch list item (e.g., . . . 1/COMM/PRI/OLINTEG). Additionally, the visual representations may include a parameter value for a primary role of the watch list item (e.g., 89.2) as well as a unit thereof (e.g., bpd). For example, the Furnace Out Temp watch list item, the primary role is to monitor a process value corresponding to a temperature of a furnace. As another example, for the Primary ACN Status watch list item, the primary role is to monitor the status of the Primary ACN.

Further, the visual representation of the watch list item may also include a chart depicting a trend (e.g., the past 20 minutes of values) of parameters values corresponding to the primary role of the watch list item. According to aspects, the chart may include a set point, or other reference point, superimposed on the chart. The visual representation of watch list items may also include a status region that indicates a status of the watch list item. For example, in the scenario illustrated on the interface 648, the Sour Nap FCC watch list item has an abnormal status. Accordingly, the status region for the Sour Nap FCC watch list item includes an indicator of an abnormal status (e.g., the exclamation point). Conversely, the Furnace Out Temp watch list item has a normal status. Accordingly, on the illustrated interface 646, the status region for the Furnace Out Temp watch list item is blank.

Additionally, the interface 648 includes a search interface enabling the search for particular items included within a watch list. The search interface may be configured to receive user input indicative of a search term. For example, the user input may be text entered via a virtual or physical keyboard, speech captured by a microphone of the mobile computing device, or other known techniques for receiving user input indicative of a search term. The results of the search are displayed within the display region of the interface 648. According to aspects, the search may be performed on the set of cached data received by the mobile computing device 14 from the mobile server 178. As a result, the search may be carried out by the application 16 without communicating with the mobile server 178, reducing the time required to complete the search.

Particularly referring to FIGS. 3E and 3F, the GUI 18 is presenting watch list item view list interface 650 and 652, respectively. In one scenario, the interfaces 650 and 652 are presented in response to the user selecting the Sour Nap FCC watch list item when the GUI 18 is presenting interface 648. The interfaces 650 and 652 include a current parameter value display region to display a visual representation of a current parameter value for one or more parameters monitored by the watch list item. As illustrated on the interfaces 650 and 652, the current parameter display region includes a parameter value corresponding to a process value (89.2), a set point value (50), and an output value (0.0). Of course, other interfaces may include additional, fewer, or alternative parameter values. The interfaces 650 and 652 also include a historical parameter value display region for displaying a graphical depiction of historical values of the one or more parameters monitored by the watch list item. As illustrated on the interfaces 650 and 652, the graphical depiction includes a graph showing historical values for each of the process value, the set point value, and the output value.

In an aspect, the watch list item interfaces 650 and 652 correspond to different template. In particular, interface 650 corresponds to a portrait-mode template and the interface 652 to a landscape-mode template. Accordingly, the application 16 is configured to detect an orientation of the mobile computing device 14. The application 16 populates the portrait-mode template to present the interface 650 on the GUI 18 when the mobile computing device 14 is in a portrait-mode orientation. Similarly, the application 16 populates the landscape-mode template to present the interface 652 on the GUI 18 when the mobile computing device 14 is in a landscape-mode orientation. As illustrated by the interfaces 650 and 652, the landscape-mode template includes a larger historical parameter value display region and a smaller current parameter value display region than the portrait-mode template.

Additionally, the portrait-mode template presented on the interface 650 includes an identification display region and an condition status display region. As illustrated on the interface 650, the identification display region includes an indication of a name of the watch list item (e.g., Sour Nap FCC), a description of the watch list item (e.g., "Diesel Hydrotreater Unit 1 Inlet Flow from FCC"), a tag (e.g., F1350112), and a path indicating a hierarchical location of a field device 44 and/or control module 70 (e.g., MySystemSiteName:DHT_AREA/DHT1/). As illustrated on the interface 650, the condition status display region includes an indication of one or more conditions of the watch list item (e.g., "PV Bad" and "Abnormal Mode").

Turning to FIG. 3G, the GUI 18 is presenting an alarm list view list interface 654. In one scenario, the interface 654 is presented in response to the user selecting the DHT Area Alarms alarm list when the GUI 18 is presenting one of the interface 644 or 646. The interface 654 includes a display region to display a visual representation of individual alarm items within the alarm list. In the example illustrated on the interface 654, the individual alarms items are the HI_HI Sour Nap FCC alarm, LO Furnace Out Temp alarm, HI Flash Drum Press alarm, Bypass Sour Nap FCC alarm, and the Interlock DHT1 XFR Pump alarm. Each of the visual representations of an alarm item may include a friendly name of the alarm item (e.g., Sour Nap FCC), a tag of a module monitored by the watch list item (e.g., FIC350112), and a particular alarm of the module corresponding to the alarm item (e.g., HI_HI). Additionally, the display region may include a status icon (e.g., a red circle) for alarm items within the alarm list. The status icon may correspond to a priority and/or state of the alarm item.

The interface 654 also include a tab selection interface enabling the user of the mobile computing device 14 to select a tab of information to display on the GUI 18. As illustrated on the interface 654, the tab selection interface includes selection elements corresponding to an annunciated alarms tab of information and an suppressed alarms tab of information. Selecting a selection element of the tab selection interface applies a filter (or removes a filter) to the lists displayed in display region. For example, if the annunciated alarms selection element is selected, only annunciated alarms are displayed in the display region. In this example, the visual representation of the alarm item includes an amount of time since the alarm item was announced. On the other hand, if the suppressed alarms selection element is selected, only suppressed alarms are displayed in the display region. Accordingly, the visual representation of the alarm item includes an amount of time since the alarm item was suppressed.

Additionally, the interface 654 includes a search interface enabling the search for particular alarm items included within the alarm list. The search interface may be configured to receive user input indicative of a search term. For example, the user input may be text entered via a virtual or physical keyboard, speech captured by a microphone of the mobile computing device, or other known techniques for receiving user input indicative of a search term. The results of the search are displayed within the display region of the interface 654. According to aspects, the search may be performed on the set of cached data received by the mobile computing device 14 from the mobile server 178. As a result, the search may be carried out by the application 16 without communicating with the mobile server 178, reducing the time required to complete the search.

Referring to FIG. 3H, the GUI 18 is presenting an alarm item view list interface 656. In one scenario, the interface 656 is presented in response to the user selecting the Sour Nap FCC HI_HI alarm when the GUI 18 is presenting one of the interface 654. The interface 656 includes an identification display region to display information identifying the alarm item. As illustrated ion the interface 656, the identification display region may include an indication of a name of the alarm item (e.g., Sour Nap FCC), a module corresponding to the alarm item (e.g., FIC350112), a description of the alarm item (e.g., DHT feed rate critically high), and a functional classification of a module corresponding to the alarm item (e.g., environmental protection). The identification display region may include a status icon (e.g., a red circle) indicating a priority and/or state of the alarm item.

As illustrated on the interface 656, the interface 656 includes an alarm timer display region. The alarm timer display region displays an alarm timer corresponding to the alarm item. When the alarm item is an annunciated alarm, the alarm timer display region indicates a time at which the alarm item was annunciated and a time since the alarm was annunciated. When the alarm item is a suppressed alarm, the alarm timer display region indicates a time at which the alarm item was suppressed and a time since the alarm was suppressed.

Additionally, the interface 656 also includes a response display region. The response display region includes an indication of a consequence of inaction (e.g., "Economic-Major: $100 k to $500 k potential loss) and a recommend action to respond to the alarm item (e.g., "Crosscheck reading from L1-UT11 . . . "). When the alarm item is an annunciated alarm, the response display region includes a time to respond to alarm item (e.g., less than 15 minutes) and a timer that represents a difference between the time the alarm item was annunciated and the time to respond (e.g., 00:13:24). When the alarm item is a suppressed alarm, the response display region includes a reason why the alarm item was suppressed (e.g., chattering or fleeting behavior) and a timer that represents a total amount of time the alarm has been suppressed (e.g., 11:16:36).

The interface 656 also includes a historical parameter value display region for displaying a graphical depiction of historical values of a parameter corresponding to the alarm item. The graphical depiction includes an identification of the parameter monitored by the alarm item (e.g., FIC350112/PV). According to aspects, the graphical depiction also includes an alarm limit line corresponding to a limit that triggered the alarm item.

It should be appreciated that the user of the mobile computing device 14 may customize the interfaces 644-656. For example, the user may be able to zoom or rescale a graphical depiction or chart, rearrange the order items are displayed within a list, and/or modify a set of displayed parameters. One particular customization of a watch list, such as the watch list included on the interface 648, includes the ability to reconfigure the watch list to create a combined watch list item that includes a combined graphical representation of a parameter value for one or more watch list items. This customization is shown through a series of watch list view list interfaces 658-666 illustrated in FIGS. 3I-3M, respectively. The series of interfaces 658-666 is generated within the application 16 executing on the mobile computing device 14.

Figure 3I:
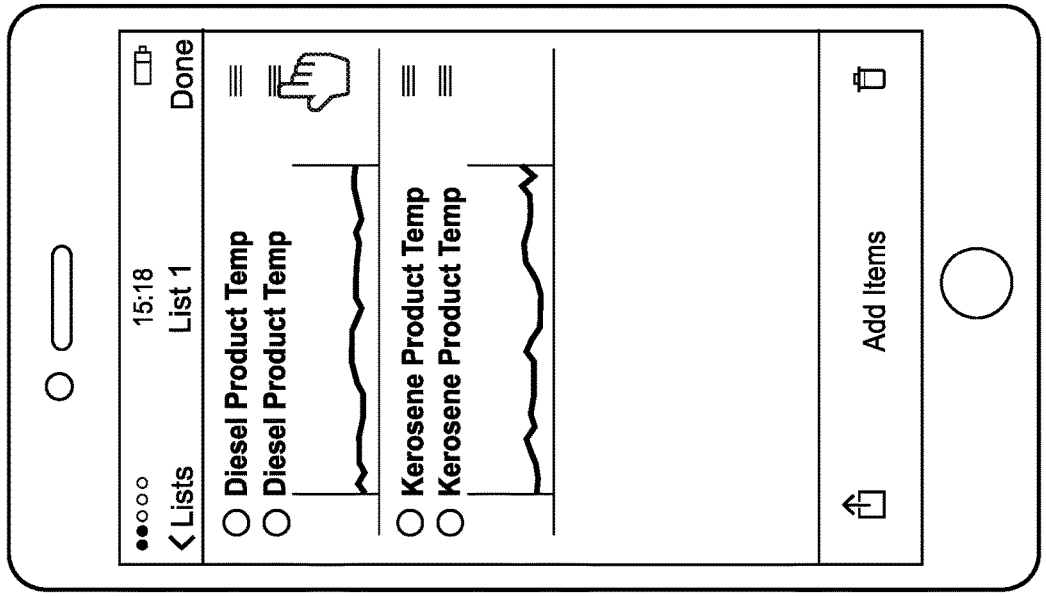
FIG. 3I is an example representation of a step in a process of combining watch list items via a watch list GUI executing on a mobile computing device.
Figure 3J:
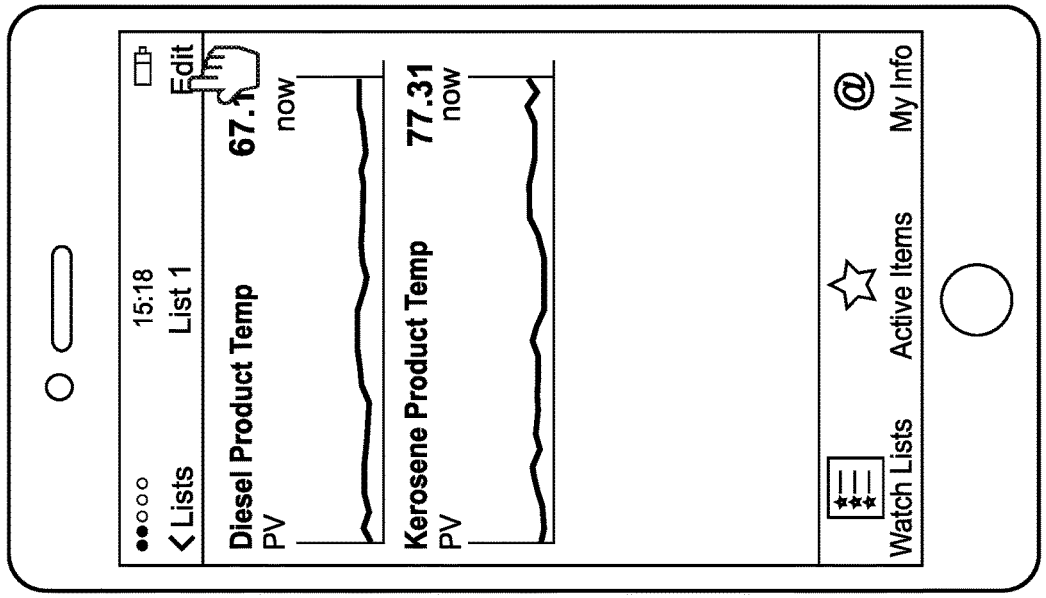
FIG. 3J is an example representation of a step in a process of combining watch list items via a watch list GUI executing on a mobile computing device.
Figure 3M:
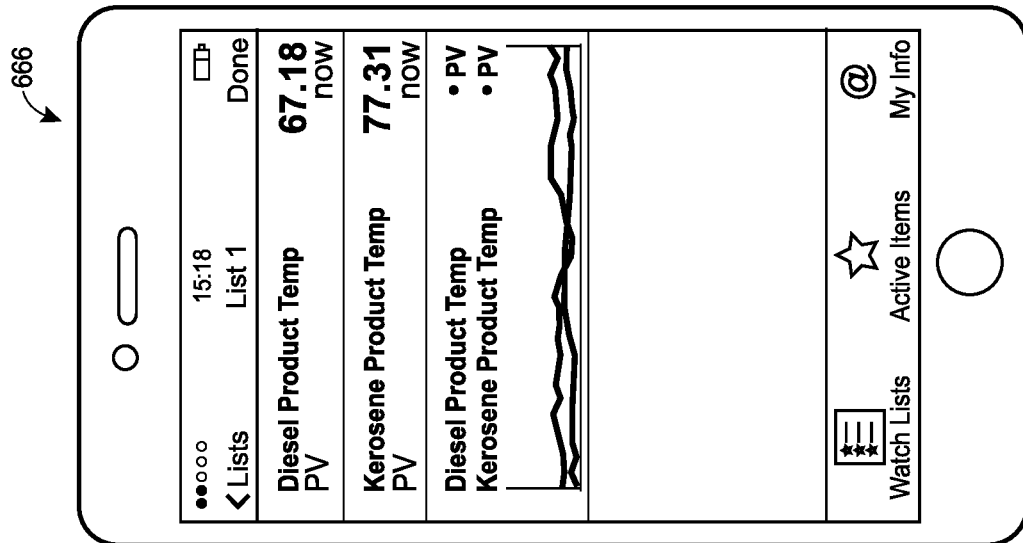
FIG. 3M is an example representation of a step in a process of combining watch list items via a watch list GUI executing on a mobile computing device.

The combined watch list item process begins with the interface 658 illustrated in FIG. 3I, which depicts the user selecting an edit button the interface 658. In response, as illustrated on the interface 660 of FIG. 3J, the application 16 presents a watch list editing interface on the GUI 18. According to aspects, for each watch list item, the watch list editing interface enables the user to edit a location of a corresponding current parameter value and a corresponding graphical depiction of historical values separately. As illustrated on the interface 660, each watch list item includes an upper slider element correspond to a location of the current parameter value and a lower slider element corresponding to the graphical depiction of historical values. The scenario illustrated in 3J depicts the user beginning to drag the slider element corresponding to the graphical depiction of historical values for the Diesel Product Temp watch list item. The drag of the slider elements ends in the scenario depicted on the interface 662, as illustrated in FIG. 3K. More particularly, the interface 662 depicts the user dragging the slider element to the bottom of the watch list. As illustrated on the interface 662, the dragging of the slider element separated the current parameter value location and the graphical depiction of historical values location for the Diesel Product Temp watch list item within the watch list.

Figure 3L:
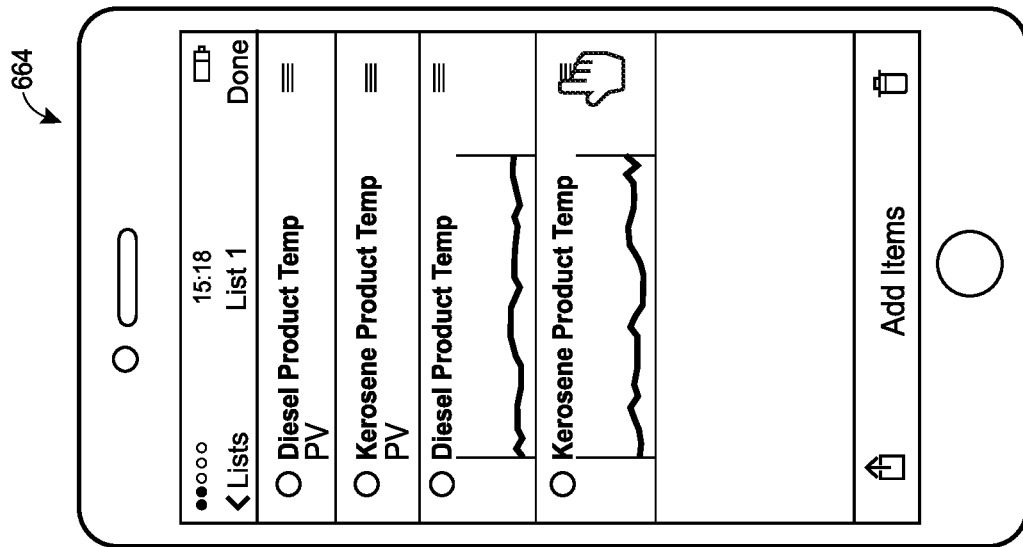
FIG. 3L is an example representation of a step in a process of combining watch list items via a watch list GUI executing on a mobile computing device.
Figure 3K:
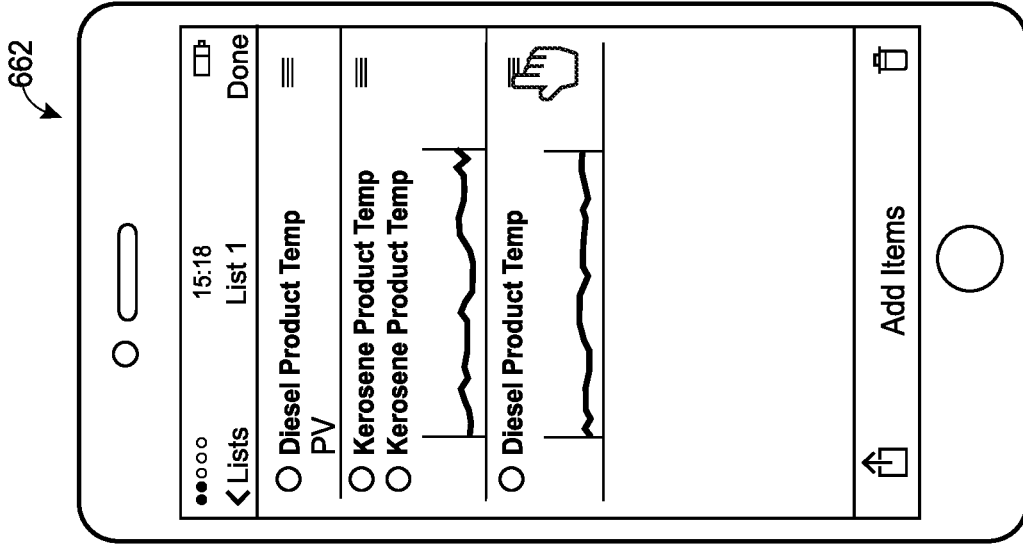
FIG. 3K is an example representation of a step in a process of combining watch list items via a watch list GUI executing on a mobile computing device.

As depicted on the interface 664 of FIG. 3L, the combination process continues when the user of the mobile computing device 14 drags the slider corresponding the graphical depiction of historical values for the Kerosene Product Temp watch list item to the bottom of the watch list. As illustrated on the interface 662, the dragging of the slider element similarly separated the current parameter value location and the graphical depiction of historical values location for the Kerosene Product Temp watch list item within the watch list. To confirm combining the graphical depictions of historical values for the Diesel Product Temp and the Kerosene Product Temp watch list items, the user selects the "Done" element of the interface 664. As FIG. 3M illustrates on the interface 666, the application 16 then combines the graphical depictions of historical values for the Diesel Product Temp and the Kerosene Product Temp watch list items into a single graphical depiction. It should be appreciated that any customizations to a view list, including combining two watch list items, modifies the template corresponding to the view list accordingly. As a result, any customizations to the view list are stored on the mobile computing device 14 and can be readily accessed by application 16 at a later time.

As another example, many users may have become accustomed to viewing process values on interfaces generated at the workstations 30 or 32. Generally speaking, these interfaces were not designed with mobile computing devices in mind. As a result, the interfaces generated by the mobile computing device 14 and the workstations 30 or 32 may vary in several aspects. This may lead to user confusion or a lack of uptake to using the application 16. Accordingly, view lists may include a view mode toggle element to use a view list template that approximates a view that would be generated at the workstations 30 or 32. In an embodiment, this view list template is generated based upon an data originated by an L1 display module, such as the one illustrated in FIG. 1F.

List Configuration

Figure 3N:
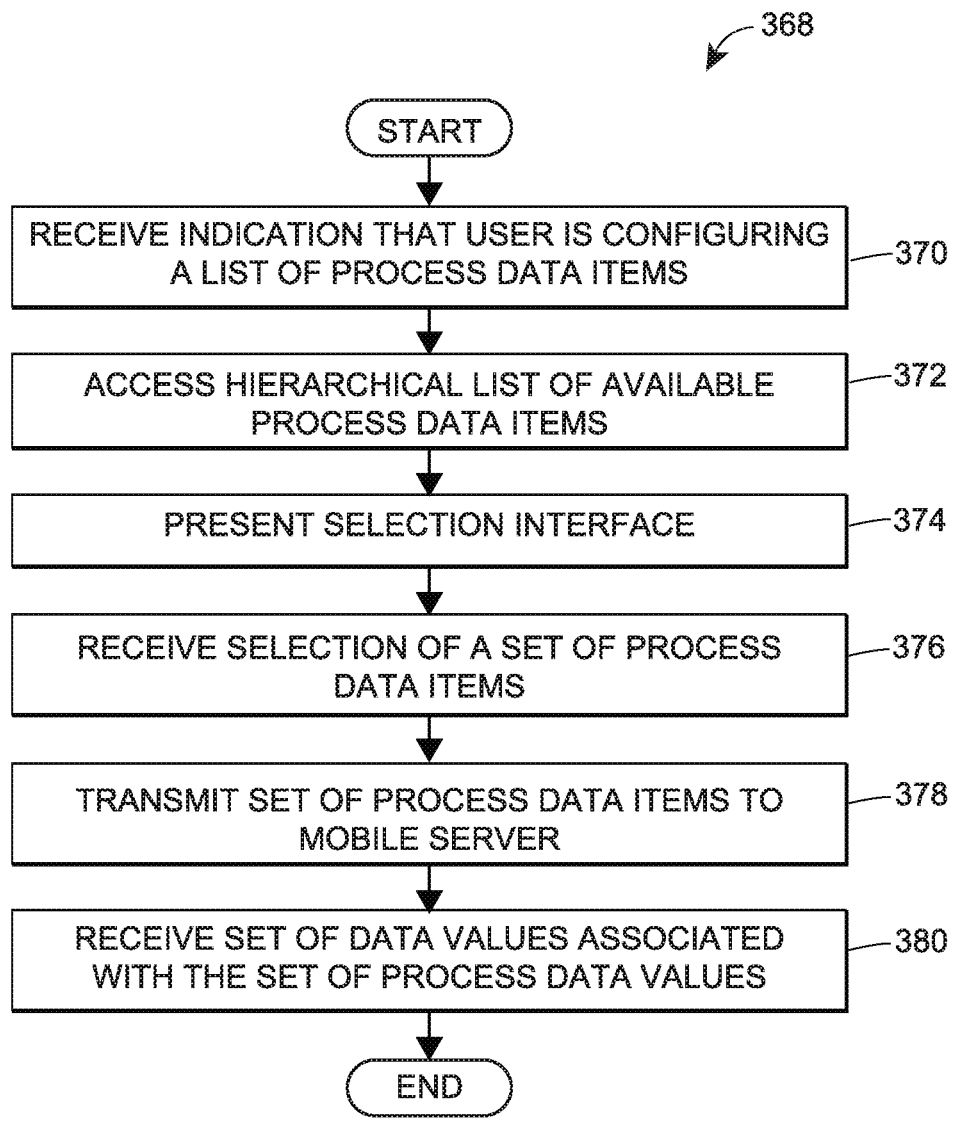
FIG. 3N is a flow diagram of an example list configuration method implemented by a mobile computing device.

FIG. 3N illustrates an example list configuration method 368 for configuring a list of process data items via an application, such as the application 16, executing a mobile computing device, such as the mobile computing device 14. The list configuration method 368 may be implemented at a plurality of mobile computing devices in communication with the mobile server 178. The list configuration method 368 may be implemented may also be implemented in conjunction with one or more of the other methods described herein.

The method 368 begins with block 370 where the mobile computing device 14 receives an indication that a user of the mobile computing device 14 is configuring a list of process data items. In one embodiment, the application 16 includes a list configuration interface that enables the user to configure one or more lists associated with the user. The list configuration interface may be presented by the mobile computing device 14, for example, in response to the user selecting an edit button on the watch list interface 348 or the alarm list interface 354. Accordingly, the indication that the user is configuring a list of process data items may be an indication to present the list configuration interface.

At block 372, the mobile computing device 14 accesses a hierarchical list of available process data items. As described above, the hierarchical list of process data items may include a first hierarchical level indicating an area in a process plant, a second hierarchical level indicating a process unit within areas in the process plant, a third hierarchical level indicating modules within process units, and/or a fourth hierarchical level indicating a particular process control system from a plurality of process control systems. In one scenario, the mobile computing device 14 accesses a local copy of the hierarchical list of available process data items stored at the mobile computing device 14. In another scenario, the mobile computing device 14 transmits a request to the mobile server 178 that the mobile server 178 retrieves and sends the hierarchical list of available process data items, or a portion thereof in response to a query or search term, to the mobile computing device 14. In this scenario, the request the mobile computing device 14 may also include a user credential corresponding to the user of the mobile computing device 14. Based on the user credential, the mobile server 178 filters a hierarchical list of all available process data items for one or more process control systems to include only the available process data items to which the has permission to access.

According to aspects, the hierarchical list of available process data items may include a set of preexisting selections corresponding to the list. To this end, the list may have been previously created and stored at a list database interconnected with the mobile server 178. Accordingly, the set of preexisting selections includes one or more a selection of process data items that the list is currently configured to monitor. To receive the set of preexisting selections, the mobile computing device 14 transmits an indication of the list to the mobile server 178. In response, the mobile server 178 accesses the list at the list database and sends the set of preexisting selections to the mobile computing device 14. It should be appreciated that in embodiments in which the list is shared list, a portion of the preexisting selections may be a selected by a user other than the user of the mobile computing device 14. Of course, if the user is configuring a new list, then there are no preexisting selections corresponding to the list.

Figure 3P:
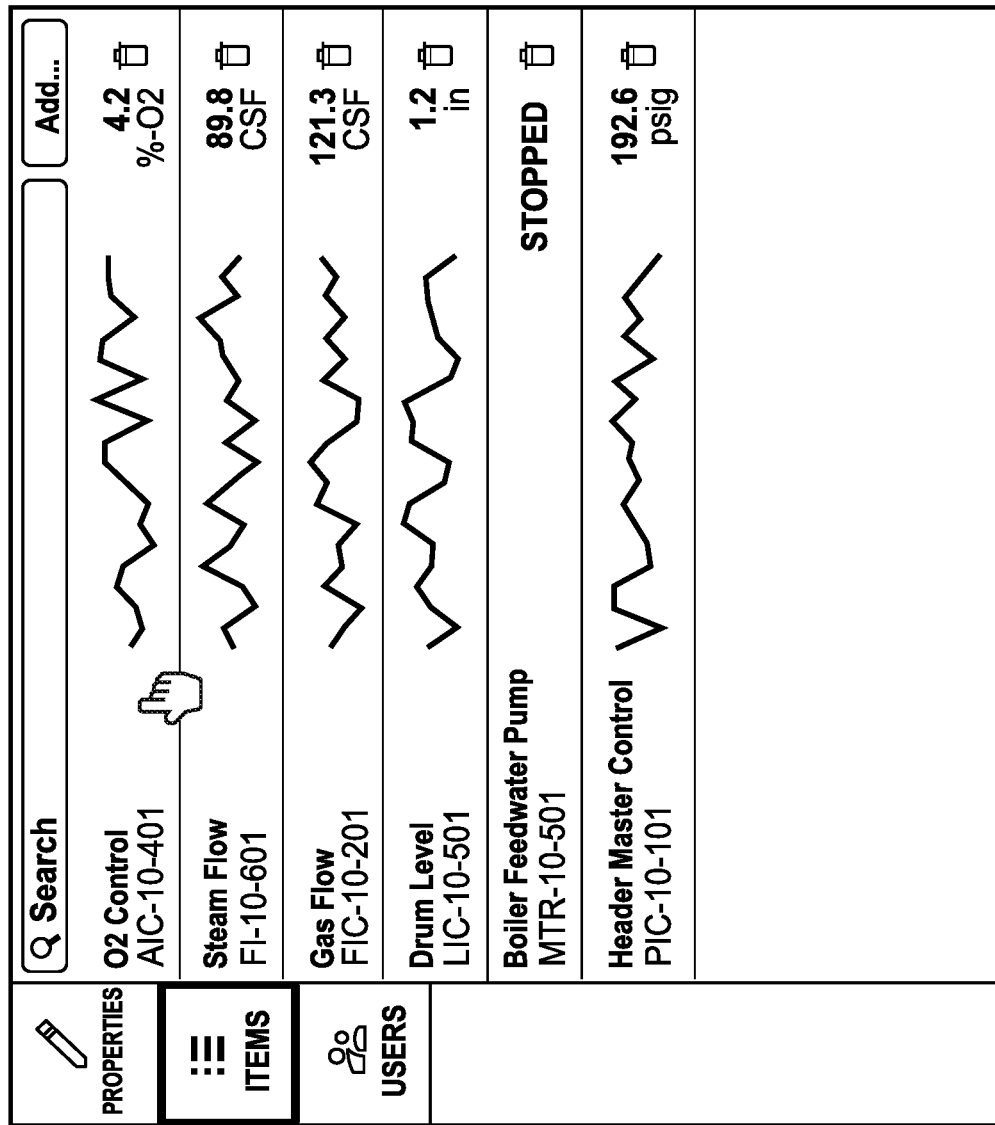
FIG. 3P is an example representation of an selection interface executing on a mobile computing device.

At block 374, the mobile computing device presents a selection interface, for selecting process data items from the hierarchical list of available process data items. With concurrent reference to FIG. 3P, the interface 382 is an example selection interface presented by the mobile computing device 14. To present the selection interface, the application 16 prepopulates the hierarchical list of available process data items with the preexisting selections such that the selection interface indicates the preexisting selections are included within the list. In the scenario illustrated on the interface 382, a watch list is prepopulated with watch list items corresponding to the 02 control, Stream Flow, Gas Flow, and so on. The selection interface also enables the user to dynamically rearrange an order of items within the list, such as by dragging an item to a new location in the list. In an embodiment, one or more of the items displayed in the selection interface include a visualization of a current process value and/or a trend of prior process values.

Figure 3Q:
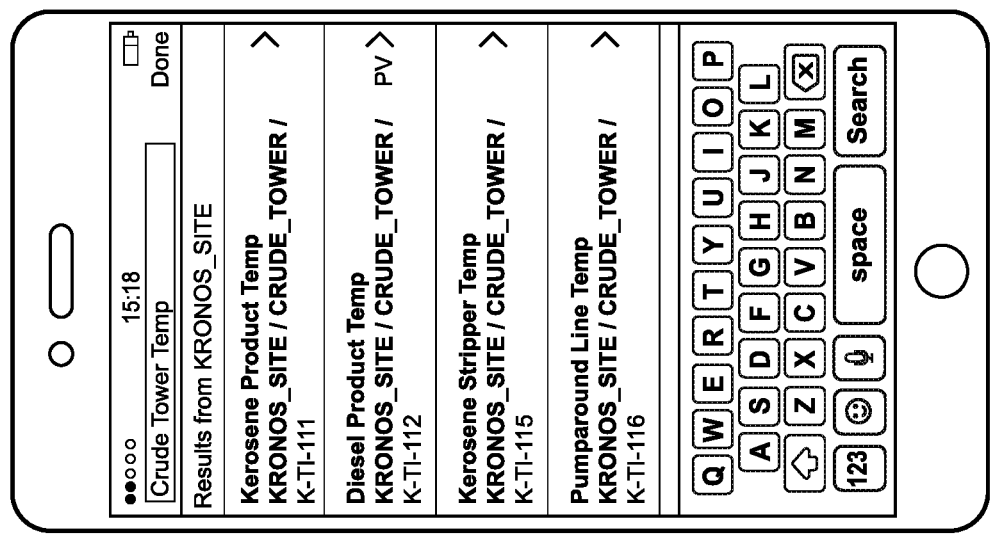
FIG. 3Q is an example representation of a search interface executing on a mobile computing device.

According to aspects, the selection interface may also include a search interface to filter the hierarchical list of available process data items based upon a search term. As illustrated on the interface 382, the search interface may include a search box configured to receive the search term. With concurrent reference to FIG. 3Q, the interface 384 is an example search interface displaying search results. The interface 384 may be presented to the user entering "Crude Tower Temp" into the search box presented on the interface 382. Because the list illustrated on the selection interface 382 is a watch list, the search results include modules that match the search term (in this case, modules that are located in the Crude Tower process unit and include a temp parameter). In one embodiment, selecting a module from the search results interface 384 enables the user to select a watch list item corresponding to a module parameter (e.g., a process value, a set point value, or an output value) included in the hierarchical list of available process data items. In embodiments in which the list is an alarm list, the search results interface 384 enables the user to select an alarm associated with the module. In any event, selecting the process data item associated with the module includes the process data in the selection of a set of process data items.

Figure 3R:
FIG. 3R is an example representation of a filter interface executing on a mobile computing device.

In another aspect, the selection interface may also include a filter interface for filtering the hierarchical list of available process data items by an entry included in a hierarchical level of the hierarchical list. With concurrent reference to FIG. 3R, the interface 386 is an example filter interface displaying a filtered hierarchical list of available process data items. The interface 386 may be presented in response to the user selecting an add button on the interface 382, or by selecting a filters button on an alternative selection interface. As illustrated on the interface 386, the filter interface enables filtering at a site hierarchical level (e.g., Site1), an area hierarchical level (e.g., boiler area), a process unit level (e.g., Air), or a module hierarchical level (e.g., PIC-11-401). In addition to hierarchical level, the filter interface may enable filtering the hierarchical list of available process data items by functional classification (e.g., product quality or safety), priority (e.g., critical or advisory), and/or class (e.g., process or device) of the process data item. In an embodiment, the hierarchical list of available process data items may also be filtered based on access rights associated with the process data item (e.g., filter based on a location of users having access, role of users having access, or shift worked by users having access). On the illustrated interface 386, each process data item corresponds to a check box. Any selection (including the preexisting selections) of a process data item included in the list may include a check mark to indicate that the list includes the process data item. The user may indicate a selection by checking a check box corresponding to an entry at a hierarchical level. Accordingly, the checked process data item and/or all process data items hierarchically stemming from the checked entry are included in the selection of the set of process data items.

At block 376, the application 16 receives the selection of the set of process data items, e.g., the process data items selected via the search interface and/or the filter interface. Then, at block 378, the mobile computing device 14 transmits the set of process data items to the mobile server 178. In an embodiment, the mobile computing device 14 transmits the set of process data items as each selection is made. In another embodiment, the mobile computing device 14 transmits the set of process data items after the user indicates that the user has finished configuring the list of process data items (e.g., clicking a done button). In response, the mobile server 178 updates the list database to include the process data items included in the set of process data items transmitted by the mobile computing device 14.

At block 380, the mobile computing device 14 receives, from the mobile server 178, a set of data values associated with the set of process data items. As explained elsewhere herein, when the mobile server 178 updates the list as stored in the list database, the mobile server 178 subscribes the mobile computing device 14 to a data stream of process values associated with process data items in the set of process data items. Accordingly, a portion of the set of data values received at the mobile computing device are received as part of the data stream of process values.

In a scenario, the selection of the set of process data items received at block 376 includes an indication that the user deselected a particular process data item included within the set of preexisting selections. To this end, the user may have unchecked a box of the filter interface 386 and/or selected a delete button corresponding to a process data item displayed on the selection interface 382. Accordingly, in response to the mobile computing device 14 transmitting the indication of the deselection to the mobile server 178 at block 378, the mobile server 178 unsubscribes the mobile computing device 14 from the data stream associated with the deselected process data item. As a result, the set of data values received from the mobile server 178 at block 380 does not include data values associated with the deselected process data item.

In an aspect, the selection interface includes a comment interface. The comment interface enables the user of the mobile computing device 14 to enter comments corresponding to the list and/or process data items included list. For example, the comment interface may enable to include a comment at the list level the user believes a boiler is overheating, then a comment at a process data item level of a process data item corresponding to a boiler temperature that indicates the particular reasoning why the user believes the boiler is overheating. In this example, the list level comment was entered into the comment interface while viewing a list view, and the process data item level comment was entered into the comment interface while viewing the process data item. It should be appreciated that because these comments are associated with the list, the comments are viewable to any user who views the list (assuming, as described below, the user has appropriate access rights).

According to aspects, the list corresponds to a set of access rights that control the ability of others to interact with the list. For example, the access rights may include a right to view the list, a right to modify the list, a right to share the list, a right to view comments, and so on. These access right may vary between and among various users. Accordingly, in addition to configuring the process data items included in the list, the selection interface may also include a user access interface to configure access to the list.

Figure 3S:
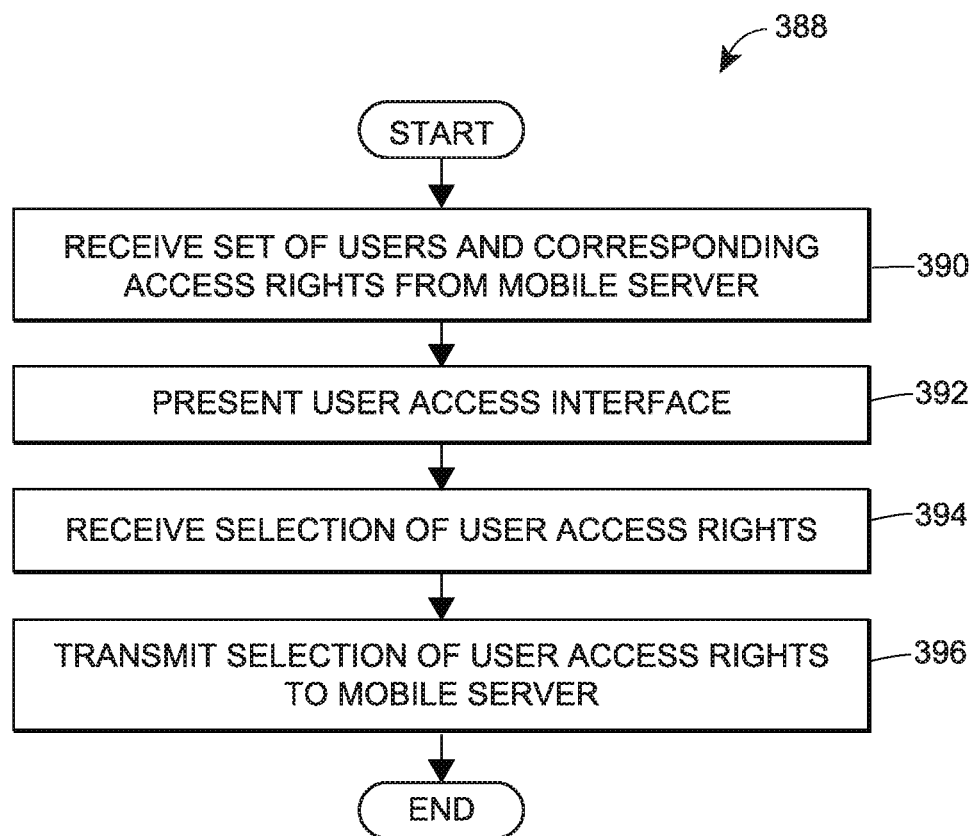
FIG. 3S is a flow diagram of an example user access configuration method implemented by a mobile computing device.

FIG. 3S illustrates an example user access configuration method 388 for configuring access rights to a list via an application, such as the application 16, executing a mobile computing device, such as the mobile computing device 14. The user access configuration 388 may be implemented at a plurality of mobile computing devices in communication with the mobile server 178. The list configuration method 368 may be implemented may also be implemented in conjunction with one or more of the other methods described herein.

The method 388 begins at block 390 where the mobile computing device 14 receives a set of users and corresponding access rights from the mobile server 178. The corresponding access rights indicate a type of access to the list for the corresponding user. Accordingly, the set of users may include a set of users having each type of access, for example a set of users having viewing access rights and/or a set of users having modification access rights. To receive the set of users and corresponding access rights, the mobile computing device 14 may transmit an indication of the list, for example, the indication transmitted to receive the set of preexisting selections as described with respect to the method 368.

Figure 3T:
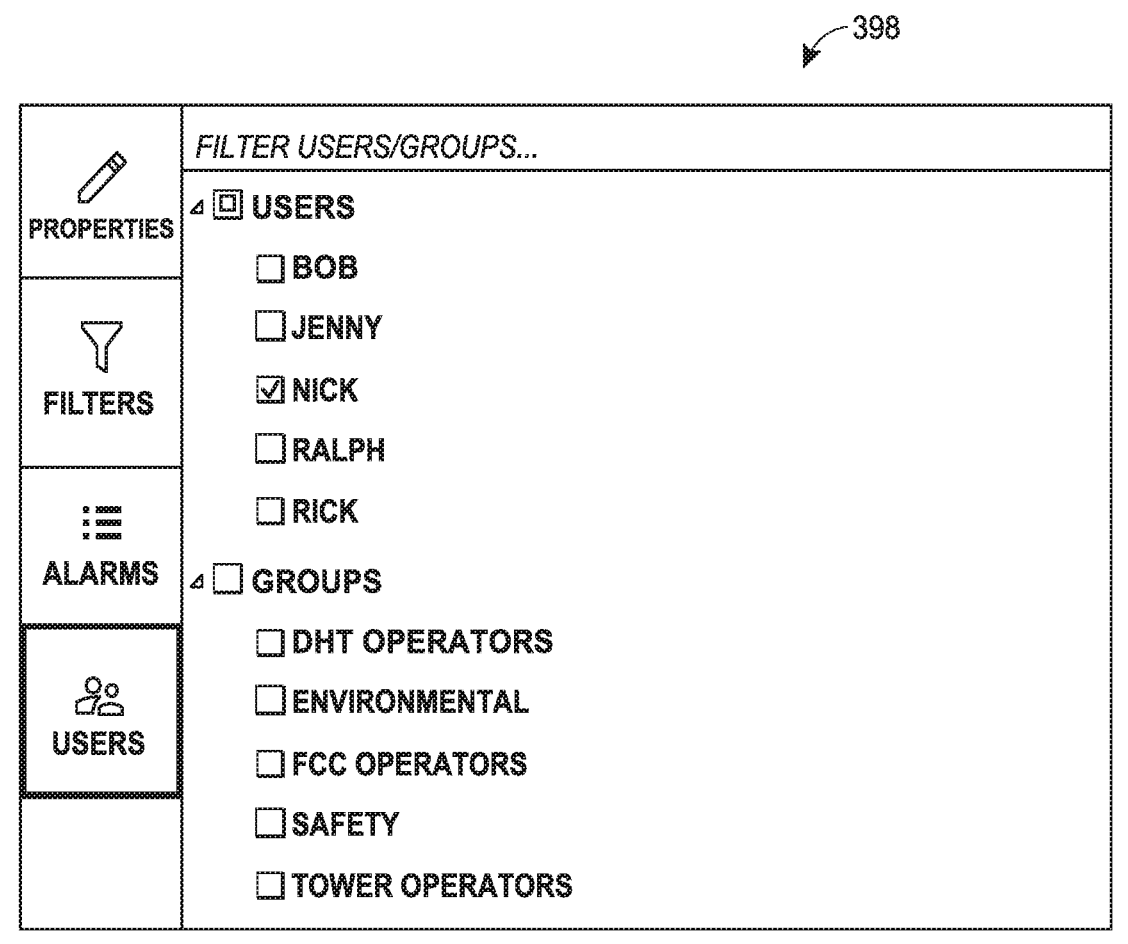

At block 392, the mobile computing device 14 presents a user access interface on the GUI 18 of the mobile computing device 14. The user access interface may be presented in response to the user selecting the users button illustrated on the interfaces 382 or 386. With concurrent reference to FIG. 3T, the interface 398 is an example user access interface displaying the set of users. As illustrated on the interface 398, the user access interface enables the user of the mobile computing device 14 to configure access rights for individual users (e.g., Bob or Jenny) or for groups of individuals (e.g., DHT Operators or Environmental). Although the interface 398 only depicts functional classification groups, the user access interface may also include groups arranged by a location of users within the group, a shift worked by users in the group, and/or a role of users within the group.

On the illustrated interface 398, each user or group of users corresponds to a check box. Any selection (including preexisting selections) of a user may include a check mark to indicate that the list provides an access right to the user. Accordingly, the user may indicate a selection f an access right by checking a check box corresponding to a particular user or group of users. Although not illustrated on the interface 398, the user access interface may enable the user to set access rights for the different types of access separately. To this end, the user access interface may include an access right selection interface to enable the user to switch between the various access rights being configured. In one scenario, a particular user has access rights to view a list, but not access rights to modify the list. In an aspect, the user access interface includes a search interface configured to filter the set of users based upon a search term.

At block 396, the mobile computing device 14 receives a selection of a set of user access rights. More particularly, the mobile computing device 14 receives a set of user access rights selections that the user made while interacting with the user access interface.

At block 396, the mobile computing device 14 transmits the set of user access rights to the mobile server 178. In response, the mobile server 178 updates the record corresponding to the list in the list database in accordance with the set of user access rights. As a result, when the set of user access rights includes a new access right for a particular user, the mobile server 178 transmits a set of data values associated with a set of process data items included in the list to a mobile computing device of the particular user. Additionally or alternatively, the mobile server 178 may transmit a notification to the mobile computing device of the particular user to inform the user as to the new access right. In one embodiment, the application 16 enables the user to send the notification from the mobile computing device 14, for example, via a SMS message or a messaging service supported by the application 16. In an aspect, the user access interface includes an interface to receive a note (such as text and/or speech recordings) to include in the notification. As a result, regardless of how the notification is transmitted to the mobile computing device of the particular user, the notification includes the note.

The following list of aspects reflects a variety of the embodiments explicitly contemplated by the present application. Those of ordinary skill in the art will readily appreciate that the aspects below are neither limiting of the embodiments disclosed herein, nor exhaustive of all of the embodiments conceivable from the disclosure above, but are instead meant to be exemplary in nature.

1. A system for securely disseminating information relating to a process control plant, the system comprising: a process control node comprising a plurality of process control devices, operable to control a process in the process plant, and a controller, coupled to the plurality of process control devices, the process control node further comprising a communicator module operable to transmit, via a first network, information of the process plant received from the controller; a data services module operable to receive from the communicator module, via the first network, the information of the process plant and to transmit some or all of that information via a second network; and a mobile server, coupled to the second network, and operable to receive data from the data services module, the mobile server coupled to a third network and operable to: communicate with a plurality of mobile computing devices via the third network; receive from each of the mobile computing devices a selection of one or more alarms, one or more process control parameters, and/or one or more notifications to be transmitted to the respective mobile computing device from the mobile server; and transmit to each of the mobile computing devices data of the selected notifications, alarms, and/or process control parameters according to the selection received from the respective mobile computing device.

2. A system according to aspect 1, further comprising a communication firewall disposed between the communicator module and the data services module.

3. A system according to either aspect 1 or aspect 2, further comprising a communication firewall disposed between the first network and the second network.

4. A system according to any one of aspects 1 to 3, further comprising a communication firewall disposed between the second network and the third network.

5. A system according to any one of aspects 1 to 4, wherein the mobile server is operable to receive a list of selected parameters to be transmitted to one or more of the mobile computing devices, and to transmit to the one or more mobile computing devices, a data stream including the selected parameters.

6. A system according to any one of aspects 1 to 5, wherein the mobile server is operable to receive a list of selected alarms to be transmitted to one or more of the mobile computing devices, and to transmit to the one or more mobile computing devices, a data stream including the selected alarms.

7. A system according to aspect 6, wherein the selected alarms, when each occurs, are each transmitted to the one or more mobile computing devices via a notification service.

8. A system according to any one of aspects 5 to 7, wherein the mobile server is configured to receive a list of selected parameters or alarms via a web page interface.

9. A system according to any one of aspects 1 to 7, wherein the third network comprises a mobile telephony network.

10. A system according to any one of aspects 1 to 8, wherein the third network comprises the Internet.

11. A system according to any one of aspects 1 to 10, wherein the mobile server is configured to send system-level notifications to all of the plurality of mobile computing devices, and user-level notifications to specific ones of the mobile computer devices according to user preferences associated with each of the specific ones of the mobile computer devices.

12. A system according to any one of aspects 1 to 11, wherein the process control node further comprises a file interface module configured to transport configuration information from the process control node to the data services module, the configuration information comprising information specifying the configuration of the process plant.

13. A system according to aspect 12, wherein the configuration information is in a configuration file provided to the controller.

14. A system according to either aspect 12 or aspect 13, wherein the configuration information comprises data specifying the physical and logical relationships between the process entities in the process plant.

15. A system according to any one of aspects 12 to 14, further comprising an indexing routine operating in the data services module, the indexing routine performing indexing operations on the configuration information to produce a searchable index to support searching operations performed by the mobile server.

16. A system according to aspect 15, wherein the mobile server is configured to receive search queries from individual ones of the mobile computing devices, and to identify and retrieve information related to notifications, alarms, devices, control modules, and/or process control parameters according to the search queries using the searchable index.

17. A system according to any one of aspects 1 to 16, wherein the mobile server receives runtime values from the communicator module, and is configured to forward the specific ones of the received runtime values to specific ones of the mobile computing devices subscribed to the specific ones of the received runtime values.

18. A system according to any one of aspects 1 to 17, wherein the information of the process plant includes historized data.

19. A system according to any one of aspects 1 to 18, wherein the information of the process plant includes real-time data.

20. A system according to any one of aspects 1 to 19, wherein: the information of the process plant includes display components configured for display on one or more workstations in the process control plant, the display components are communicated to the mobile server, and the mobile server communicates the display components to mobile computing devices with corresponding data of selected notifications, alarms, and/or process control parameters.

21. A system according to any one of aspects 1 to 20, wherein the mobile server maintains a plurality of lists, each list corresponding to a set of items to which at least one of the mobile computing devices is subscribed, and each list including one or more of: a set of processes, a set of equipment, a set of alarms, a set of process values, a set of key performance indicators, and/or a set of batches.

22. A system according to aspect 21, wherein the mobile server is configured to receive, from the mobile computing devices, customized lists to be added to the plurality of lists.

23. A system according to either aspect 21 or aspect 22, wherein the mobile server is configured to receive, via a web page interface, customized lists to be added to the plurality of lists.

24. A mobile server, coupled to a first network and receiving from the first network information about a process control system, and to a second network coupled to a plurality of mobile computing devices, the mobile server operable to receive data from a data services module, the mobile server operable to: communicate with a plurality of mobile computing devices; receive from each of the mobile computing devices a selection of one or more alarms, one or more process control parameters, and/or one or more notifications to be transmitted to the respective mobile computing device from the mobile server; and transmit to each of the mobile computing devices data of the selected notifications, alarms, and/or process control parameters according to the selection received from the respective mobile computing device.

25. A mobile server according to aspect 24, wherein the mobile server is operable to receive a list of selected parameters to be transmitted to one or more of the mobile computing devices, and to transmit to the one or more mobile computing devices, a data stream including the selected parameters.

26. A mobile server according to either aspect 25 or aspect 26, wherein the mobile server is operable to receive a list of selected alarms to be transmitted to one or more of the mobile computing devices, and to transmit to the one or more mobile computing devices, a data stream including the selected alarms.

27. A mobile server according to aspect 26, wherein the selected alarms, when each occurs, are each transmitted to the one or more mobile computing devices via a notification service.

28. A mobile server according to any one of aspects 25 to 27, wherein the mobile server is configured to receive a list of selected parameters or alarms via a web page interface.

29. A mobile server according to any one of aspects 24 to 28, wherein the second network comprises a mobile telephony network.

30. A mobile server according to any one of aspects 24 to 29, wherein the second network comprises the Internet.

31. A mobile server according to any one of aspects 24 to 30, wherein the mobile server is configured to send system-level notifications to all of the plurality of mobile computing devices, and user-level notifications to specific ones of the mobile computer devices according to user preferences associated with each of the specific ones of the mobile computer devices.

32. A mobile server according to any one of aspects 24 to 31, wherein the mobile server receives runtime values from a communicator module, and is configured to forward the specific ones of the received runtime values to specific ones of the mobile computing devices subscribed to the specific ones of the received runtime values.

33. A mobile server according to any one of aspects 24 to 32, wherein information of the process plant includes historized data.

34. A mobile server according to any one of aspects 24 to 33, wherein information of the process plant includes real-time data.

35. A mobile server according to any one of aspects 24 to 34, wherein: information of the process plant includes display components configured for display on one or more workstations in a process control plant, the display components are communicated to the mobile server, and the mobile server communicates the display components to mobile computing devices with corresponding data of selected notifications, alarms, and/or process control parameters.

36. A mobile server according to any one of aspects 24 to 35, wherein the mobile server maintains a plurality of lists, each list corresponding to a set of items to which at least one of the mobile computing devices is subscribed, and each list including one or more of: a set of processes, a set of equipment, a set of alarms, a set of process values, a set of key performance indicators, and/or a set of batches.

37. A mobile server according to aspect 36, wherein the mobile server is configured to receive, from the mobile computing devices, customized lists to be added to the plurality of lists.

38. A mobile server according to either aspect 36 or aspect 37, wherein the mobile server is configured to receive, via a web page interface, customized lists to be added to the plurality of lists.

39. A tangible, non-transitory computer readable medium storing machine readable instructions optimized for a microprocessor on a mobile computing device that, when executed by the microprocessor, cause the microprocessor to: display a graphical user interface (GUI); receive, via the GUI, a selection of one or more items to view, each of the one or more items related to a process control system; transmit to a mobile server, via either the Internet or a mobile telephony data connection, the selection of the one or more items; receive from the mobile server, via either the Internet or the mobile telephony data connection, a plurality of real-time values corresponding to the selected one or more items; display the plurality of real-time values on the GUI.

40. A tangible, non-transitory computer readable medium according to aspect 39, wherein each of the one or more items corresponds to a process entity in the process control system.

41. A tangible, non-transitory computer readable medium according to aspect 40, wherein the process entity is one of a field device, a process module, or a function block.

42. A tangible, non-transitory computer readable medium according to any one of aspects 39 to 41, wherein at least a subset of the plurality of real-time values is one of a parameter value, a status, and an alarm.

43. A tangible, non-transitory computer readable medium according to any one of aspects 39 to 42, wherein receiving a selection of one or more items to view comprises: displaying a list of pre-compiled lists of items; and receiving a selection of one of the pre-compiled lists of items.

44. A tangible, non-transitory computer readable medium according to any one of aspects 39 to 43, wherein receiving a selection of one or more items to view comprises: displaying a search field; receiving a search query; transmitting the search query to the mobile server; receiving from the mobile server a list of items responsive to the search query; displaying on the GUI the list of items responsive to the search query; and receiving a selection of one or more of the items from the list of items.

45. A tangible, non-transitory computer readable medium according to any one of aspects 39 to 44, where in the machine readable instructions further cause the microprocessor to: receive, with the plurality of real-time values, a plurality of historical values.

46. A tangible, non-transitory computer readable medium according to any one of aspects 39 to 45, wherein displaying the plurality of real-time values on the GUI comprises: displaying, in a list view, each of the selected items in association with a real-time value for the selected item.

47. A tangible, non-transitory computer readable medium according to any one of aspects 39 to 46, wherein displaying the plurality of real-time values on the GUI comprises: displaying, in a list view, each of the selected items in association with a trend graph for the selected item.

48. A tangible, non-transitory computer readable medium according to any one of aspects 39 to 47, wherein displaying the plurality of real-time values on the GUI comprises: displaying, for a one of the selected one or more items a trend graph for the one of the selected one or more items and a real-time value of the one of the selected one or more items.

49. A tangible, non-transitory computer readable medium according to aspect 48, wherein displaying the plurality of real-time values on the GUI further comprises: displaying, for the one of the selected one or more items, a set point.

50. A tangible, non-transitory computer readable medium according to either aspect 10 or aspect 49, wherein displaying the plurality of real-time values on the GUI further comprises: displaying, for the one of the selected one or more items, a scale value.

51. A tangible, non-transitory computer readable medium according to any one of aspects 48 to 50, wherein displaying the plurality of real-time values on the GUI further comprises: displaying, for the one of the selected one or more items, an indication on the trend graph of current and historical parameter values, and an indication on the trend graph of current and historical set points.

52. A tangible, non-transitory computer readable medium according to any one of aspects 48 to 51, wherein displaying the plurality of real-time values on the GUI further comprises: displaying, for the one of the selected one or more items, a status indication.

53. A tangible, non-transitory computer readable medium according to any one of aspects 48 to 52, wherein displaying the plurality of real-time values on the GUI further comprises: displaying, for the one of the selected one or more items, a path designating the one of the selected one or more items.

54. A tangible, non-transitory computer readable medium according to any one of aspects 48 to 53, wherein displaying the plurality of real-time values on the GUI further comprises: displaying, for the one of the selected one or more items, one or more alarms.

55. A tangible, non-transitory computer readable medium according to any one of aspects 39 to 54, wherein displaying the plurality of real-time values on the GUI comprises: displaying a list of alarms and alarm statuses.

56. A tangible, non-transitory computer readable medium according to aspect 55, wherein displaying the plurality of real-time values on the GUI comprises: receiving a selection of an alarm from the list of alarms; displaying detailed information about the selected alarm.

57. A tangible, non-transitory computer readable medium according to aspect 56, wherein displaying detailed information about the selected alarm comprises: displaying one or more of an alarm type, a time to respond, a consequence of inaction, a recommended action, a time at which the alarm became active, and a time elapsed since the alarm became active.

58. A tangible, non-transitory computer readable medium according to any one of aspects 39 to 57, wherein the machine readable instructions further cause the microprocessor to: receive and display one or more notifications transmitted to the mobile computing device from the mobile server.

59. A tangible, non-transitory computer readable medium according to any one of aspects 39 to 58, wherein the machine readable instructions further cause the microprocessor to: receiving a customized selection of items to place on a new list; transmit the new list to the mobile server; and retrieve the new list from the mobile server at a later time.

60. A tangible, non-transitory computer readable medium according to aspect 59, wherein the machine readable instructions further cause the microprocessor to: transmit a request to the mobile server the share the new list with a user of another mobile computing device.

61. A tangible, non-transitory computer readable medium according to any one of aspects 39 to 60, wherein the machine readable instructions further cause the microprocessor to: receive a list of items, each item corresponding to information that can be received and displayed; and filter the list of items according to plant hierarchy.

62. A tangible, non-transitory computer readable medium according to any one of aspects 39 to 61, wherein the machine readable instructions further cause the microprocessor to: receive a list of items, each item corresponding to information that can be received and displayed; and filter the list of items according to span of control.

63. A tangible, non-transitory computer readable medium according to either aspect 61 or aspect 62, wherein the list of items is a list of lists.

64. A method of providing process data from a process control system of a process plant to a remote computing device, comprising: receiving, at a computing device from one or more components within the process control system via a first network, configuration data describing a configuration of at least part of the process control system, wherein the configuration data includes information associated with a plurality of entities within the process control system, and wherein the information regarding each entity includes at least one tag associated with a level in a hierarchy of the process control system; identifying, by one or more processors of the computing device, a plurality of levels within the process control system based upon the tags, including at least a first-level identifier and a plurality of second-level identifiers associated with the first-level identifier; identifying, by the one or more processors of the computing device, a plurality of control modules associated with the entities based upon the configuration data, wherein each control module is further associated with a second-level identifier; generating, by the one or more processors of the computing device, a hierarchical list of available process data, having a plurality of entries including at least the following entries: first-level entries including the first level identifier, second-level entries including the second-level identifiers, and control module entries including the identified control modules; communicating, from the computing device to the remote computing device via a second network, a plurality of entries from the hierarchical list; receiving, at the computing device from the remote computing device via the second network, a selection of a set of entries from the hierarchical list; receiving, at the computing device from a data server via the first network, a set of data values including data values associated with the set of entries; and communicating, from the computing device to the remote computing device via the second network, the data values associated with the set of entries.

65. The method of aspect 64, wherein the remote computing device is one of the following mobile devices: a smartphone or a tablet computer.

66. The method of aspect 64 or aspect 65, wherein the set of data values is received by the computing device as a data stream of process data values from the data server.

67. The method of any one of aspects 64 to 66, wherein the process data values are generated by a plurality of devices within the process control system, and wherein each process data value is received in real-time from the data server when the respective process data value is generated.

68. The method of any one of aspects 64 to 67, wherein the configuration data is received as one or more configuration files used by controllers within the process control system to control the process plant.

69. The method of any one of aspects 64 to 68, wherein the at least one tag of each entity includes a first-level tag specifying the first-level identifier and a second-level tag specifying the second-level identifier.

70. The method of aspect 69, wherein the first-level tag specifies an area identifier indicating an area of the process plant, and the second-level tag specifies a unit identifier indicating a process unit within the process plant.

71. The method of aspect 70, wherein the process unit includes one or more equipment units.

72. The method of any one of aspects 64 to 71, wherein the configuration data is received from the data server periodically without a request from the computing device.

73. The method of any one of aspects 64 to 72, wherein the plurality of control modules include function blocks that are implemented by process controllers within the process control system to control parts of the process plant.

74. The method of any one of aspects 64 to 73, wherein the entries of the hierarchical list further include parameter entries associated with the plurality of entities or the plurality of control modules.

75. The method of aspect 74, wherein the parameter entries include measured values of conditions within the process plant.

76. The method of any one of aspects 64 to 75, wherein the hierarchical list further includes additional data associated with the process plant, including one or more of: key performance indicators (KPIs), batch information, maintenance information, efficiency information, knowledge base information regarding equipment or conditions within the process plant, decision support information, or schedule information.

77. The method of any one of aspects 64 to 76, wherein the hierarchical list is a set of nested lists containing all the available process data of the process control system.

78. The method of any one of aspects 64 to 77, wherein the plurality of entries from the hierarchical list contains only the available process data the remote computing device is authorized to access.

79. The method of aspect 78, wherein the available process data the remote computing device is authorized to access is determined based upon a user credential associated with the remote computing device.

80. The method of aspect 78, wherein the available process data the remote computing device is authorized to access is determined using data stored in a white list of authorized devices.

81. The method of any one of aspects 64 to 80, further comprising selecting, by the computing device, the data values associated with the set of entries based upon the received selection of the set of entries.

82. The method of any one of aspects 64 to 81, wherein: the selection of the set of entries of the hierarchical list includes a selection of at least one first-level entry or second-level entry; and selecting the data values associated with the set of entries includes selecting the data values associated with all control module entries associated with the selected at least one first-level entry or second-level entry.

83. The method of any one of aspects 64 to 82, further comprising: receiving, at the computing device from a data server via the first network, a polling request for a list of process data to be communicated from the data server to the computing device; and communicating, from the computing device to the data server via the first network, the list only in response to the polling request, and wherein the set of data values received from the data server is based upon the list.

84. The method of aspect 83, wherein the list includes entries from a plurality of selections of sets of entries received from a plurality of remote computing devices.

85. The method of any one of aspects 64 to 84, wherein the selection of the set of entries is an indication of a predetermined view list stored on a memory of the computing device.

86. The method of any one of aspects 64 to 85, wherein the selection of the set of entries is automatically sent from the remote computing device to the computing device via the second network when a user of the remote computing device interacts with a graphical user interface (GUI) of the remote computing device.

87. The method of any one of aspects 64 to 86, wherein the available process control data includes alarms associated with the plurality of entities within the process control system.

88. The method of any one of aspects 64 to 87, wherein: the configuration data is received via a plurality of separate communications; and at least some of the plurality of separate communications include only new or changed information associated with the plurality of entities.

89. The method of any one of aspects 64 to 88, wherein at least a part of the second network includes a part of the Internet.

90. The method of any one of aspects 64 to 89, wherein the set of data values contains only L1 Data of the process control system.

91. A tangible, non-transitory computer readable medium storing instructions for providing process data from a process control system to a remote computing device that, when executed by one or more processors of the computing device, cause the computing device to: receive configuration data describing a configuration of at least part of the process control system from one or more components within the process control system via a first network, wherein the configuration data includes information associated with a plurality of entities within the process control system, and wherein the information associated with each entity includes at least one tag; receive a query from the remote computing device via a second network, the query including one or more search parameters associated with the tags of the entities; identify one or more entities based upon the one or more search parameters and the tags associated with the one or more entities; generate a list of entries including entries associated with the identified one or more entities; communicate the list to the remote computing device via the second network; receive a selection of a set of entries from the list via the second network from the remote computing device; receive a set of data values including data values associated with the set of entries via the first network from a data server; and communicate the data values associated with the set of entries to the remote computing device via the second network.

92. The tangible, non-transitory computer readable medium of aspect 91, wherein the set of data values is received as a data stream of process data values from the data server.

93. The tangible, non-transitory computer readable medium of aspect 92, wherein the process data values are generated by a plurality of devices within the process control system, and wherein each process data value is received in real-time from the data server when the respective process data value is generated.

94. The tangible, non-transitory computer readable medium of any one of aspects 91 to 93, wherein the configuration data is received as one or more configuration files used by controllers within the process control system to control the process plant.

95. The tangible, non-transitory computer readable medium of any one of aspects 91 to 94, wherein the configuration data is received from the data server periodically without a request from the computing device.

96. The tangible, non-transitory computer readable medium of any one of aspects 91 to 95, further storing instructions that cause the computer system to select the data values associated with the set of entries from the received set of data values based upon the received selection of the set of entries.

97. The tangible, non-transitory computer readable medium of any one of aspects 91 to 96, further storing instructions that cause the computer system to: receive a polling request for a list of data to be received from the data server via the first network; generate the list of data based upon the received selection of the set of entries; and communicate the list to the data server via the first network only in response to the polling request, and wherein the set of data values received from the data server is based upon the list.

98. The tangible, non-transitory computer readable medium of any one of aspects 91 to 97, wherein the list of data is generated based upon additional entries associated with the set of entries.

99. The tangible, non-transitory computer readable medium of any one of aspects 91 to 98, wherein the list of data is generated based upon additional entries requested by additional remote computing devices.

100. The tangible, non-transitory computer readable medium of any one of aspects 91 to 99, wherein the selection of the set of entries is an indication of a predetermined view list stored in the tangible, non-transitory computer readable medium.

101. The tangible, non-transitory computer readable medium of any one of aspects 91 to 100, further storing instructions that cause the computer system to: identify one or more additional entities associated with the selected set of entries; and communicate additional data values associated with the additional entities, and wherein the received set of data values further includes the additional data values associated with the additional entities.

102. The tangible, non-transitory computer readable medium of any one of aspects 91 to 101, wherein at least one of the one or more entities or at least one of the one or more additional entities is an area of a process plant, the area including a plurality of equipment units controlled by the process control system.

103. The tangible, non-transitory computer readable medium of any one of aspects 91 to 102, wherein the one or more additional entities are control modules implemented by process controllers within the process control system.

104. The tangible, non-transitory computer readable medium of any one of aspects 91 to 103, wherein the one or more additional entities are identified based upon the configuration data associated with the selected set of entities.

105. The tangible, non-transitory computer readable medium of any one of aspects 91 to 104, wherein at least one of the one or more entities is a control module operating within the process control system to control a device in a process plant.

106. The tangible, non-transitory computer readable medium of any one of aspects 91 to 105, further storing instructions that cause the computer system to: identify one or more additional entities associated with the identified one or more entities, and wherein the list of entries further includes the one or more additional entities.

107. The tangible, non-transitory computer readable medium of any one of aspects 91 to 106, wherein the configuration data includes hierarchy information for a plurality of devices within the process plant.

108. The tangible, non-transitory computer readable medium of any one of aspects 91 to 107, wherein the query includes one or more additional search parameters associated with process data values.

109. The tangible, non-transitory computer readable medium of any one of aspects 91 to 108, wherein the one or more additional search parameters indicate at least one of the following: a time frame, a level of an alarm, a type of a condition within the process plant, or a level of an environmental parameter within the process plant.

110. The tangible, non-transitory computer readable medium of any one of aspects 91 to 109, wherein the one or more search parameters are associated with an alarm associated with at least one entity within the process control system.

111. The tangible, non-transitory computer readable medium of any one of aspects 91 to 110, wherein: the configuration data is received via a plurality of separate communications; and at least some of the plurality of separate communications include only new or changed information associated with the plurality of entities.

112. The tangible, non-transitory computer readable medium of any one of aspects 91 to 111, wherein the configuration data includes information associated with a plurality of process parameters associated with entities within the process control system.

113. The tangible, non-transitory computer readable medium of any one of aspects 91 to 112, wherein the set of data values contains only L1 Data of the process control system.

114. A method of providing process data from a process control system of a process plant to a remote computing device, comprising: receiving, at a computing device from one or more components within the process control system via a first network, configuration data describing a configuration of at least part of the process control system, wherein the configuration data includes information associated with a plurality of entities within the process control system, and wherein the information regarding each entity includes at least one tag associated with a level in a hierarchy of the process control system; identifying, by one or more processors of the computing device, a plurality of levels within the process control system based upon the tags, including at least a first-level identifier and a plurality of second-level identifiers associated with the first-level identifier; identifying, by the one or more processors of the computing device, a plurality of control modules associated with the entities based upon the configuration data, wherein each control module is further associated with a second-level identifier; generating, by the one or more processors of the computing device, a hierarchical list of available process data; selecting from the hierarchical list of available process data a default set of information to include on a watch list or an alarm list, the default set of information determined according to a feature of the configuration data.

115. The method according to aspect 114, wherein selecting from the hierarchical list of available process data a default set of information to include on a watch list or an alarm list comprises selecting from the hierarchical list of available process data a default set of information to include on a watch list, and wherein the feature of the configuration data comprises an overview display module in the configuration data.

116. The method according to either aspect 114 or aspect 115, wherein selecting from the hierarchical list of available process data a default set of information to include on a watch list or an alarm list comprises selecting from the hierarchical list of available process data a default set of information to include on a watch list, wherein the feature of the configuration data comprises an area, unit, or cell in the process plant, and wherein the default set of information comprises all modules in the area, unit, or cell.

117. The method according to any one of aspects 114 to 116, wherein selecting from the hierarchical list of available process data a default set of information to include on a watch list or an alarm list comprises selecting from the hierarchical list of available process data a default set of information to include on an alarm list, wherein the feature of the configuration data comprises an operator station alarm configuration, and wherein the default set of information includes a set of alarms associated with the operator station alarm configuration.

118. The method according to aspect 117, wherein the default set of information further includes a set of predefined filter criteria including alarm priority, alarm function, and/or alarm notification settings.

119. The method according to any one of aspects 114 to 118 further comprising: receiving, at the computing device from the one or more components within the process control system via the first network, updated configuration data describing an updated configuration of at least part of the process control system, wherein the updated configuration data includes updated information associated with the plurality of entities within the process control system; and selecting from the hierarchical list of available process data an updated default set of information to include on a watch list or an alarm list, the updated default set of information determined according to a feature of the updated configuration data.

120. A method of securely subscribing a remote computing device to obtain process data from a process control system of a process plant, comprising: receiving, at a mobile server via a first network from a data server, configuration data indicating a configuration of the process control system; establishing, by the mobile server, a communication connection with the remote computing device via a second network; receiving, at the mobile server via the second network from the remote computing device, an indication of a view list requesting process data associated with the process control system, wherein the process data corresponds to available data indicated by the configuration data; receiving, at the mobile server via the first network from the data server, a polling request for a list of data to be sent from the data server to the mobile server; determining, by the mobile server, the list of data based at least in part upon the view list; sending, from the mobile server to the data server via the first network, the list of data in response to the polling request; receiving, at the mobile server via the first network from the data server, a plurality of data values associated with the list of data; and sending, from the mobile server to the remote computing device via the second network, a view set containing at least some of the plurality of data values corresponding to the view list associated with the remote computing device.

121. The method of aspect 120, wherein the configuration data is received as one or more configuration files used by one or more process controllers to control operation of the process plant.

122. The method of aspect 121, wherein the one or more configuration files include information regarding a hierarchy of equipment and control modules within the process control system.

123. The method of aspect 121, wherein the one or more configuration files include a plurality of alarms associated with the equipment and control modules.

124. The method of any one of aspects 120 to 123, further comprising: receiving, at the mobile server via a first network from a data server, additional data associated with the process plant, and wherein the view list further includes at least part of the additional data.

125. The method of aspect 124, wherein the additional data includes one or more of the following: key performance indicators (KPIs), batch information, maintenance information, efficiency information, knowledge base information regarding equipment or conditions within the process plant, decision support information, or schedule information.

126. The method of any one of aspects 120 to 125, further comprising: generating, by the mobile server, a hierarchical list of the available data based upon the received configuration data; and sending, from the mobile server to the remote computing device via the second network, a plurality of entries associated with entities within the hierarchical list of the available data for selection of the requested process data of the view list by a user of the remote computing device.

127. The method of any one of aspects 120 to 126, wherein establishing the communication connection with the remote computing device includes authenticating the remote computing device or a user of the remote computing device and further includes determining an authorization level of the remote computing device or user, the authorization level indicating a set of the process data the remote computing device or user is authorized to receive.

128. The method of any one of aspects 120 to 127, further comprising: receiving, at the mobile server via the second network from additional remote computing devices, additional indications of additional view lists requesting additional process data associated with the process control system, wherein at least part of the additional process data requested in the additional view lists is distinct from the process data requested in the view list, and wherein the list of data is determined based at least in part upon the view list and the additional view lists.

129. The method of aspect 128, wherein determining the list of data includes combining the view list with the additional view lists and removing redundant entries.

130. The method of any one of aspects 120 to 129, wherein the polling request from the data server is received periodically.

131. The method of any one of aspects 120 to 130, wherein the mobile server only sends information to the data server in response to the polling request from the data server.

132. The method of any one of aspects 120 to 131, wherein determining the list of data includes identifying one or more related data items associated with requested data items included in the view list.

133. The method of aspect 132, wherein the one or more related data items include historical data associated with the requested data items.

134. The method of any one of aspects 120 to 133, wherein the indication of the view list is an indication of a predetermined view list stored on a memory of the mobile server.

135. The method of any one of aspects 120 to 134, further comprising: receiving, at the data server via the first network from the mobile server, the list of data in response to the polling request; receiving, at the data server via a third network from a plurality of data sources within the process control system, a plurality of data signals associated with the process plant; identifying, by the data server, the plurality of data values from the plurality of data signals based upon the received list of data; transmitting, from the data server via the second network to the mobile server, the plurality of data values.

136. The method of aspect 135, wherein the plurality of data sources includes a plurality of process controllers within the process control system.

127. The method of aspect 135, wherein the plurality of data sources includes at least one data historian storing historical process data from the process control system, and further comprising: sending, from the data server via the third network to the data historian, a request for one or more historical data values from the historical process data, and wherein the plurality of data signals include the one or more requested historical data values.

138. The method of aspect 135, wherein the plurality of data signals includes a plurality of data streams of process data values generated within a plurality of components of the process control system.

139. The method of aspect 138, wherein the data server receives the process data values of the data streams in real-time as each process data value is generated within the process control system.

140. The method of any one of aspects 120 to 139, further comprising: receiving, at the mobile server via the second network from additional remote computing devices, additional indications of additional view lists requesting additional process data associated with the process control system; generating, by the mobile server, an indicator of a data subscription for each of the remote computing device and the additional remote computing devices, wherein the indicator of the data subscription indicates the data to be communicated to each of the respective remote computing device or the respective additional remote computing device; and selecting, by the mobile server, the plurality of data values associated with the list of data for the remote computing device based upon the indicator of the data subscription associated with the remote computing device.

141. The method of any one of aspects 120 to 140, further comprising: presenting, by a graphical user interface of the remote computing device, at least a part of the view set to a user of the remote computing device.

142. The method of any one of aspects 120 to 141, wherein the communication connection is established via an application program interface (API) configured to facilitate communication with remote devices via the second network.

143. The method of any one of aspects 120 to 142, wherein the mobile server further includes summary information not included in the configuration data, and the view list further includes one or more summary information data items corresponding to at least part of the summary information.

144. The method of any one of aspects 120 to 143, further comprising: receiving, at the mobile server via the second network from the remote computing device, an indication of a second view list, wherein the second view list requests less data than the view list; receiving, at the mobile server via the first network from the data server, a second polling request for a second list of data to be sent from the data server to the mobile server; determining, by the mobile server, the second list of data based at least in part upon the second view list; sending, from the mobile server to the data server via the first network, an indication of the second list of data in response to the second polling request; receiving, at the mobile server via the first network from the data server, a second plurality of data values associated with the second list of data; and determining, by the mobile server, a subset of the second plurality of data values to send to the remote computing device.

145. The method of aspect 144, wherein the subset of the second plurality of data values is empty.

146. The method of aspect 144, wherein the indication of the second list of data includes only indications of changes from the list of data.

147. The method of any one of aspects 120 to 146, wherein: the view list includes a first set of process data parameters; the list of data includes a second set of process data parameters, including at least the first set of process data parameters; the plurality of data values includes a plurality of process data parameter values associated with the second set of process data parameters; and the view set includes at least some of the plurality of process data parameters values, the at least some of the plurality of process data parameter values being associated with the first set of process data parameters.

148. The method of any one of aspects 120 to 147, wherein the plurality of data values associated with the list of data includes only data values associated with new or updated data values.

149. The method of any one of aspects 120 to 148, wherein at least a part of the second network includes an external network not associated with the process control system.

150. The method of any one of aspects 120 to 149, wherein the plurality of data values are only L1 Data from the process control system.

151. A computer system for communicating process data from a process control system of a process plant to a remote computing device, comprising: one or more processors; one or more communication units configured to send and receive data via a first network and a second network; a memory storing executable instructions that, when executed by the one or more processors, cause the computer system to implement a plurality of modules, including: one or more scanners that interface with the one or more communication units to enable communication with a data server via the first network by: receiving data from the data server, identifying polling requests in the data received from the data server, and transmitting request lists to the data server in response to the polling requests; a data stream processor that determines a set of process data values in the data received from the data server, the set of process data values corresponding to view list data to be communicated to the remote computing device; and an application program interface (API) that interfaces with the one or more communication units to enable communication with the remote computing device via the second network by transmitting the set of process data values to the remote computing device.

152. The computer system of aspect 151, wherein the data received by the one or more scanners includes configuration data and process data.

153. The computer system of aspect 152, wherein the configuration data is received as one or more configuration files used by one or more process controllers to control operation of the process plant.

154. The computer system of aspect 34153 wherein the one or more configuration files include information regarding a hierarchy of equipment and control modules within the process control system.

155. The computer system of aspect 153, wherein the one or more configuration files include a plurality of alarms associated with the equipment and control modules.

156. The computer system of aspect 152, wherein the configuration data is received periodically and at least part of the process data is received aperiodically.

157. The computer system of claim 152, wherein the data received by the one or more scanners further includes additional data associated with the process plant, the additional data including one or more of the following: key performance indicators (KPIs), batch information, maintenance information, efficiency information, knowledge base information regarding equipment or conditions within the process plant, decision support information, or schedule information.

158. The computer system of aspect 152, wherein: the process data is received as one or more data streams of process data values generated within a plurality of components of the process control system; and the process data values are received by the one or more scanners in real-time as each process data value is generated within the process control system.

159. The computer system of any one of aspects 151 to 158, wherein the polling requests are received periodically.

160. The computer system of any one of aspects 151 to 159, wherein: the request lists are transmitted only in response to the polling requests; and the computer system only transmits request lists to the data server.

161. The computer system of any one of aspects 151 to 160, wherein: the data stream processor further determines a plurality of additional sets of process data values in the data received from the data server, each additional set of process data values being associated with one or more of a plurality of additional remote computing devices; and the API further transmits each additional set of process data values to the respective one or more of the additional remote computing devices.

162. The computer system of any one of aspects 151 to 161, wherein: the data stream processor further identifies in the data an alarm to transmit to the remote computing device, and the API further transmits the identified alarm to the remote computing device.

163. The computer system of aspect 162, wherein the API transmits the identified alarm to the remote computing device via a notification service that causes the alarm to be displayed at the remote computing device regardless of whether the remote computing device has requested any process data.

164. The computer system of any one of aspects 151 to 163, wherein the API further enables communication by: transmitting a list of available data to the remote computing device based upon configuration data included in the data received from the data server; and receiving an indication of a view list associated with the view list data from the remote computing device.

165. The computer system of aspect 164, wherein the indication of the view list is an indication of a predetermined view list stored in the memory.

166. The computer system of any one of aspects 151 to 165, wherein: the view list data includes a first set of process data parameters; the request list includes a second set of process data parameters, including at least the first set of process data parameters; the data received from the data server includes a plurality of process data parameter values associated with the second set of process data parameters; and the set of process data values corresponding to the view list data includes at least some of the plurality of process data parameters values, the at least some of the plurality of process data parameter values being associated with the first set of process data parameters.

167. The computer system of any one of aspects 151 to 166, wherein the memory further stores executable instructions that cause the computer system to implement an authentication module that determines an identity of the remote computing device, and wherein the data stream processor determines the set of process data values based upon the determined identity of the remote computing device.

168. The computer system of any one of aspects 151 to 167, wherein the remote computing device identity is determined as a user account in response to receiving, via the second network, an indication of a user logging in to an application executing on the remote computing device.

169. The computer system of any one of aspects 151 to 168, wherein at least a part of the second network includes an external network not associated with the process control system.

170. The computer system of any one of aspects 151 to 169, wherein the set of process data values contains only L1 Data from the process control system.

171. A method of securely providing data from a process control system of a process plant to remote computing devices, comprising: obtaining, at a data server via a first network from a mobile server, one or more lists including indications of requested process data parameters indicating process data to be communicated from the mobile server to the remote computing devices via a second network; receiving, from a plurality of process controllers within the process control system via a third network, a stream of process data parameter values associated with process data parameters included in one or more configuration files, the one or more configuration files describing a configuration of the process control system; identifying, by one or more processors of the data server, a subset of the received process data parameter values corresponding to the requested process data parameters of the one or more lists; and communicating, from the data server to the mobile server via the first network, the identified subset of process data parameter values.

172. The method of aspect 171, further comprising: obtaining, at the data server via the third network from one or more components within the process plant, the one or more configuration files; and communicating, from the data server to the mobile server via the first network, at least part of the one or more configuration files.

173. The method of aspect 172, wherein: the one or more components within the process plant are the plurality of process controllers; and the one or more configuration files are used by the plurality of process controllers to control operation of the process plant.

174. The method of aspect 172, further comprising: receiving, at the mobile server via the first network from the data server, the one or more configuration files; determining, by one or more processors of the mobile server, the one or more lists based upon the received one or more configuration files and information associated with the remote computing devices; and communicating, from the mobile server via the first network to the data server, the one or more lists.

175. The method of any one of aspects 171 to 174, wherein the one or more configuration files include information regarding a hierarchy of equipment and control modules within the process control system.

176. The method of aspect 175, wherein the process data parameters of the one or more configuration files include a plurality of alarms associated with the equipment and control modules.

177. The method of any one of aspects 171 to 176, wherein the data server receives the stream of process data parameter values in real-time as each of the process data parameter values are generated by or received by one of the plurality of process controllers.

178. The method of aspect 177, wherein each process data parameter value of the identified subset of process data parameter values is communicated from the data server to the mobile server in real-time as the respective process data parameter value is received by the data server.

179. The method of any one of aspects 171 to 178, wherein the subset of the identified process data parameter values is determined based upon a comparison of one or more data tags indicated by the requested process data parameters with one or more data tags associated with the received process data parameter values.

180. The method of any one of aspects 171 to 179, wherein obtaining the one or more lists includes: transmitting, to the mobile server via the first network from the data server, a polling request for the one or more lists; receiving, at the data server via a first network from the mobile server, the one or more lists in response to the polling request.

181. The method of aspect 180, wherein the data server only accepts the one or more lists in response to the polling request.

182. The method of aspect 181, wherein the data server only accepts the one or more lists for a predetermined interval of time following the polling request.

183. The method of aspect 180, wherein the data server transmits the polling request periodically with a period longer than a period associated with process data parameter value generation for at least some of the process data parameters.

184. The method of aspect 180, wherein the mobile server only communicates the one or more lists in response to the polling request.

185. The method of aspect 180, wherein: the mobile server executes a mobile server scanner module to receive the polling request; and the data server executes a data server scanner module to receive the one or more lists.

186. The method of any one of aspects 171 to 185, wherein the one or more lists include indications of additional requested data associated with the process plant, and further comprising: receiving, at the data server via the third network from an additional component in the process control system, additional data values associated with the additional requested data; and communicating, from the data server to the mobile server via the first network, the additional data values.

187. The method of aspect 186, wherein the additional requested data includes one or more of the following: key performance indicators (KPIs), batch information, maintenance information, efficiency information, knowledge base information regarding equipment or conditions within the process plant, decision support information, or schedule information.

188. The method of aspect 186, wherein the additional component is a data historian storing historical process data from the process control system.

189. The method of aspect 188, further comprising: sending, from the data server via the third network to the data historian, a request for one or more historical data values from the historical process data, and wherein the additional data values include the one or more requested historical data values.

190. The method of any one of aspects 171 to 189, wherein at least one of the one or more lists includes indications only of changes to the requested process data parameters.

191. The method of any one of aspects 171 to 190, wherein the stream of process data parameter values includes only L1 Data.

192. A computer system for communicating process data from a process control system of a process plant to remote computing devices, comprising: one or more processors; one or more communication units configured to send and receive data via a process control network and a remote access network; a memory storing instructions that, when executed by the one or more processors, cause the computer system to: receive one or more configuration files describing a configuration of the process control system via the process control network by the one or more communication units; obtain one or more lists including indications of requested process data parameters requested by a mobile server via the remote access network by the one or more communication units for further communication to the remote computing devices, the requested process data parameters indicating process data parameters associated with the one or more configuration files; receive a stream of process parameter data values from a plurality of process controllers within the process plant via the process control network by the one or more communication units; select a subset of the process parameter data values from the stream of process parameter data values to send to the mobile server based upon the requested process data parameters of the one or more lists; and send the subset of the process parameter data values to the mobile server via the remote access network by the one or more communication units.

193. The computer system of aspect 192, wherein the one or more configuration files include information regarding a hierarchy of equipment and control modules within the process control system.

194. The computer system of aspect 193, wherein the process data parameters of the one or more configuration files include a plurality of alarms associated with the equipment and control modules.

195. The computer system of any one of aspects 192 to 194, wherein: the one or more configuration files are received from the plurality of process controllers; and the one or more configuration files are used by the plurality of process controllers to control operation of the process plant.

196. The computer system of any one of aspects 192 to 195, wherein the memory further stores instructions that cause the computer system to: send at least part of the one or more configuration files to the mobile server via the remote access network by the one or more communication units.

197. The computer system of aspect 196, wherein the at least part of the one or more configuration files are sent to the mobile server periodically.

198. The computer system of any one of aspects 192 to 197, wherein obtaining the one or more lists includes: transmitting a polling request for the one or more lists to the mobile server; and receiving the one or more lists from the mobile server in response to the polling request.

199. The computer system of aspect 198, wherein the instructions that cause the computer system to obtain the one or more lists further cause the computer system to accept the one or more lists only in response to the polling request and only within a predetermined interval of time following the polling request.

200. The computer system of aspect 198, wherein the polling request is transmitted periodically with a period longer than a period associated with process data parameter value generation for at least some of the process data parameters.

201. The computer system of any one of aspects 192 to 200, wherein each of the process data parameter values in the stream of process data parameter values is received in real-time as the respective process data parameter value is generated by one of the plurality of process controllers.

202. The computer system of aspect 201, wherein each process data parameter value of the selected subset of process data parameter values is sent to the mobile server in real-time as the respective process data parameter value is received.

203. The computer system of any one of aspects 192 to 202, wherein the instructions that cause the computer system to obtain the one or more lists further cause the computer system to execute a scanner module to identify communications received by the one or more communication units from the mobile server.

204. The computer system of any one of aspects 192 to 203, wherein: the one or more lists include indications of additional requested data associated with the process plant; and the memory further stores instructions that cause the computer system to: receive additional data values associated with the additional requested data from an additional component in the process control system; and send the additional data values to the mobile server via the remote access network by the one or more communication units.

205. The computer system of aspect 204, wherein the additional requested data includes one or more of the following: key performance indicators (KPIs), batch information, maintenance information, efficiency information, knowledge base information regarding equipment or conditions within the process plant, decision support information, or schedule information.

206. The computer system of aspect 204, wherein the additional component is a data historian storing historical process data from the process control system.

207. The computer system of any one of aspects 192 to 206, wherein at least one of the one or more lists includes indications only of changes to the requested process data parameters.

208. The computer system of any one of aspects 192 to 207, wherein the stream of process data parameter values includes only L1 Data.

209. A method of alerting a user of a mobile computing device to a condition within a process plant, comprising: receiving, at a mobile server via a first network from a data server, configuration data identifying a plurality of devices, modules, and parameters of the process plant; sending, from the mobile server to the data server via the first network, a list of requested data from the configuration data; receiving, at the mobile server from the data server via the first network, a set of process data corresponding to the list of requested data, wherein the set of process data includes an indication of an alarm associated with the condition within the process plant; identifying, by the mobile server, one or more mobile computing devices monitoring information associated with the condition based upon one or more device lists stored at the mobile server; communicating, from the mobile server to the one or more mobile computing devices via a second network, a notification of the alarm associated with the condition.

210. The method of aspect 209, further comprising: communicating, from the mobile server to a plurality of mobile computing devices including the one or more computing devices via the second network, at least part of the configuration data; receiving, at the mobile server from the plurality of mobile computing devices via the second network, indications of a plurality of device lists including the one or more device lists, wherein each device list indicates process data requested by each respective mobile computing device; and generating, by the mobile server, the list of the requested data from the plurality of device lists.

211. The method of aspect 210, wherein the list of the requested data is a combined list generated by combining the plurality of device lists and removing duplicate entries.

212. The method of aspect 210, wherein the configuration data is communicated to each of the plurality of mobile computing devices upon receiving a request from the respective mobile computing device, and wherein the configuration data is communicated to at least two of the plurality of mobile computing devices at distinct times.

213. The method of aspect 210, wherein at least one of the indications of the plurality of device lists is a selection of a predefined device list stored on a memory of the mobile server.

214. The method of aspect 210, wherein at least one of the indications of the plurality of device lists is an indication of a change to the respective device list.

215. The method of any one of aspects 209 to 214, wherein sending the list of requested data includes: receiving, at the mobile server, a polling request from the data server for the list of requested data; transmitting, from the mobile server, the list of requested data only in response to receiving the polling request from the data server.

216. The method of aspect 215, wherein the data server is configured to accept the list of requested data from the mobile server only in response to the polling request.

217. The method of aspect 216, wherein the data server sends the polling request to the mobile server periodically.

218. The method of any one of aspects 209 to 217, wherein the configuration data is communicated as one or more configuration files used by one or more controllers to control operation of the process plant.

219. The method of aspect 218, wherein the one or more configuration files include a hierarchy of equipment and control modules within the process plant.

220. The method of aspect 219, wherein the one or more configuration files include a plurality of alarms associated with the equipment and control modules.

221. The method of aspect 220, wherein the indication of the alarm included in the set of process data is an alarm value indicating a status of the alarm based upon a predefined set of alarm statuses.

222. The method of any one of aspects 209 to 221, wherein one or more process data values associated with the alarm are included in the set of process data and are communicated to the one or more mobile computing devices with the notification of the alarm.

223. The method of aspect 222, wherein the one or more process data values are associated with the condition within the process plant and are indicative of data associated with sensors or equipment associated with the condition.

224. The method of aspect 223, wherein the one or more process data values indicate input or output process parameters associated with the condition.

225. The method of aspect 224, wherein the condition is one of: a state of a processed material within a portion of the process plant, an environmental condition within a portion of the process plant, or a status of a device within the process plant.

226. The method of any one of aspects 209 to 225, wherein the notification of the alarm is communicated to the mobile computing device via a third-party notification service.

227. The method of aspect 226, wherein the third-party notification service pushes the notification to be presented on the mobile computing device without a user action.

228. The method of any one of aspects 209 to 227, further comprising:
communicating, from the mobile server to the one or more mobile computing devices via the second network, additional information associated with the alarm.

229. The method of aspect 228, wherein the additional information includes at least one of the following: a recommendation regarding addressing the condition, a time in which to address the condition, or a note regarding the condition.

230. The method of any one of aspects 209 to 229, wherein the set of process data is received on an ongoing basis as values of the process data are generated within the process plant.

231. The method of aspect 230, wherein: the set of process data includes a plurality of subsets of process data; each of the subsets of process data is associated with an update schedule corresponding to times when new values of the process data associated with the respective subset are available; process data values for each of the subsets of process data are received at the mobile server when such process data values are generated according to the update schedule associated with the respective subset, regardless of the update schedules corresponding to the other subsets of process data; and at least two of the update schedules are distinct.

232. The method of aspect 231, wherein the at least two distinct update schedules are associated with distinct rates of periodic updates of the process data values.

233. The method of any one of aspects 209 to 232, wherein: the indication of the alarm includes an alarm status; and the notification of the alarm includes the alarm status.

234. The method of any one of aspects 209 to 233, wherein the list of requested data includes only changes in the requested data.

235. The method of any one of aspects 209 to 234, wherein the second network includes an external network not associated with the process plant.

236. The method of any one of aspects 209 to 235, wherein the indication of the alarm is included in the set of process data as an L1 Data value.

237. A tangible, non-transitory computer readable medium storing instructions for alerting a user of the remote computing device to a condition within a process plant that, when executed by one or more processors of a computing device, cause the computing device to: receive a set of process data from a data server via a first network, wherein the set of process data includes an indication of an alarm associated with the condition within the process plant; communicate a notification of the alarm associated with the condition to the remote computing device via a second network; receive a request for additional information regarding the alarm from the user of the remote computing device via the second network; identify additional process data associated with the condition from the set of process data, wherein the additional process data is determined based upon the alarm and configuration data received from the data server via the first network; and communicate the additional process data to the remote computing device via the second network for presentation to the user.

238. The tangible, non-transitory computer readable medium of aspect 237, wherein: the indication of the alarm includes an alarm status; and the notification of the alarm includes the alarm status.

239. The tangible, non-transitory computer readable medium of either aspect 237 or aspect 238, wherein the remote computing device is one of the following mobile devices: a smartphone or a tablet computer.

240. The tangible, non-transitory computer readable medium of any one of aspects 237 to 239, further storing instructions that cause the computing device to: receive configuration data identifying a plurality of devices, modules, and parameters of the process plant from a data server via the first network; determine a list of requested data to receive from the data server and to communicate to the remote computing device; receive a polling request from the data server for the list of requested data via the first network; and transmit an indication of the list of requested data to the data server only in response to receiving the polling request from the data server.

241. The tangible, non-transitory computer readable medium of aspect 240, wherein the polling request is received from the data server periodically.

242. The tangible, non-transitory computer readable medium of any one of aspects 237 to 241, wherein the configuration data is communicated as one or more configuration files used by one or more controllers to control operation of the process plant.

243. The tangible, non-transitory computer readable medium of aspect 242, wherein the one or more configuration files include a hierarchy of equipment and control modules within the process plant, and wherein the one or more configuration files include a plurality of alarms associated with the equipment and control modules.

244. The tangible, non-transitory computer readable medium of any one of aspects 237 to 243, wherein the notification of the alarm is communicated to the mobile computing device via a third-party notification service.

245. The tangible, non-transitory computer readable medium of any one of aspects 237 to 244, wherein the request for additional information does not indicate a type of additional information.

246. The tangible, non-transitory computer readable medium of any one of aspects 237 to 245, wherein the additional process data is identified based upon the configuration data associated with an entity within the process plant, the entity being associated with the alarm in the configuration data.

247. The tangible, non-transitory computer readable medium of any one of aspects 237 to 246, wherein the additional process data includes a recommendation to address the condition, the recommendation being included in the configuration data.

248. The tangible, non-transitory computer readable medium of any one of aspects 237 to 247, wherein the additional process data includes one or more process data values indicate input or output process parameters associated with the condition.

249. The tangible, non-transitory computer readable medium of any one of aspects 237 to 248, wherein the additional process data includes one or more process data values are associated with the condition within the process plant and are indicative of data associated with sensors or equipment associated with the condition.

250. The tangible, non-transitory computer readable medium of any one of aspects 237 to 250, wherein the condition is one of: a state of a processed material within a portion of the process plant, an environmental condition within a portion of the process plant, or a status of a device within the process plant.

251. The tangible, non-transitory computer readable medium of any one of aspects 237 to 250, wherein the second network includes an external network not associated with the process plant.

252. The tangible, non-transitory computer readable medium of any one of aspects 237 to 251, wherein the indication of the alarm is included in the set of process data as an L1 Data value.

253. A method for configuring a list via an application executing on a mobile computing device, wherein the mobile computing device includes one or more processors, and a memory coupled to the one or more processors, the method comprising: receiving, via a user interface of the mobile computing device, an indication that a user of the mobile computing device is configuring a list of process data items; causing the one or more processors to access a hierarchical list of available process data items; presenting, via the user interface of the mobile computing device, a selection interface for selecting process data items from the hierarchical list of available process data items; receiving, via the selection interface of the user interface of the mobile computing device, a selection of a set of process data items from the hierarchical list; causing the one or more processors to transmit, from the mobile computing device to a mobile server, the set of process data items from the hierarchical list; and receiving, at the mobile computing device from the mobile server, a set of data values associated with the set of process data items.

254. The method of aspect 253, further comprising: causing the one or more processors to transmit, from the mobile computing device to the mobile server, an indication of the list.

255. The method of aspect 254, further comprising: receiving, at the mobile computing device from the mobile server, a set of preexisting selections corresponding to the list.

256. The method of aspect 255, wherein the set of preexisting selections is stored at a list database interconnected with the mobile server.

257. The method of aspect 255, wherein presenting the selection interface further comprises: causing the one or more processors to prepopulate the hierarchical list of available process data items such that the selection interface indicates that the set of preexisting selections is included within the list.

258. The method of aspect 255, wherein the set of process data items transmitted to the mobile server only includes process data items within the hierarchical list that are not included in the set of preexisting process data items.

259. The method of aspect 255, wherein a portion of the set of data values associated with the set of process data items is received as part of a data stream of process data values.

260. The method of aspect 259, further comprising: receiving, via the selection interface of the user interface of the mobile computing device, an indication that deselects a particular process data item included within the set of preexisting selections.

261. The method of aspect 260, further comprising: causing the one or more processors to transmit, from the mobile computing device to the mobile server, an indication of the particular process data item; and receiving, at the mobile computing device from the mobile server, the set of data values associated with the set of process data items, wherein the set of data values does not include data values associated with the particular process data item.

262. The method of aspect 255, wherein a portion of the set of preexisting selections was selected by another user.

262. The method of aspect 253, wherein the hierarchical list includes a first hierarchical level indicating an area in a process plant, a second hierarchical level indicating a process unit within areas in the process plant, and a third hierarchical level indicating modules within process units.

264. The method of aspect 263, wherein the hierarchical list includes a fourth hierarchical level indicating a particular process control system from a plurality of process control systems.

265. The method of aspect 263, wherein: the list is a watch list; and receiving the selection of the set of process data items from the hierarchical list includes receiving a selection of a set of watch list items corresponding to one or modules.

266. The method of aspect 265, wherein receiving the selection of the set of watch list items further comprises: receiving, via the selection interface of the user interface of the mobile computing device, a selection of a parameter associated with a module.

267. The method of aspect 266, wherein the parameter is one of a process value, a set point value, or an output value.

268. The method of aspect 263, wherein: the list is an alarm list; and receiving the selection of a set of process data items from the hierarchical list includes receiving a selection of alarm items corresponding to one or more modules.

269. The method of aspect 268, receiving the selection of the set of alarm items further comprises: receiving, via the selection interface of the user interface of the mobile computing device, a selection of a particular alarm associated with a module.

270. The method of aspect 263, wherein presenting the selection interface including the hierarchical list further comprises: presenting, via the selection interface of the user interface of the mobile computing device, a search interface configured to filter the hierarchical list based upon a search term.

271. The method of aspect 263, wherein presenting the selection interface including the hierarchical list further comprises: presenting, via the selection interface of the user interface of the mobile computing device, a filter interface configured to filter the hierarchical list by an entry included in a hierarchical level of the hierarchical list.

272. The method of aspect 271, wherein the filter interface includes filters based on at least one of: a location associated with users having access to process data items within the list, a shift associated with users having access to process data items within the list, or a role of with users having access to process data items within the list.

273. The method of aspect 254, wherein the indication of the list includes an indication of a list stored at the mobile server or an indication of a list created at the mobile computing device.

274. The method of aspect 254, further comprising: receiving, at the mobile computing device from the mobile server, a set of users and corresponding access rights to the list.

275. The method of aspect 274, wherein the access rights include at least one of (i) a set of users who have access to view the list, or (ii) a set of users who have access to modify the list.

276. The method of aspect 273, wherein presenting the selection interface including the hierarchical list further comprises: presenting, via the selection interface of the user interface of the mobile computing device, a user access interface configured to enable the user of the mobile computing device to configure access to the list for the received set of users.

277. The method of aspect 276, wherein the set of users includes groupings of users arranged by at least one of: a location associated users in the group, a shift associated with users in the group, or a role of users in the group.

278. The method of aspect 277, wherein the user access interface includes a filter interface configured to filter the set of users based upon one or more groupings.

279. The method of aspect 276, wherein the user access interface includes a search interface configured to filter the set of users based upon a search term.

280. The method of aspect 276, wherein the user selection interface is further configured to enable the user of the mobile computing device to configure viewing access to the list for the received set of users.

281. The method of aspect 276, wherein the user selection interface is further configured to enable the user of the mobile computing device to configure modification access to the list for the received set of users.

282. The method of aspect 276, further comprising: receiving, via the user selection interface of the user interface of the mobile computing device, a selection of a set of user access rights for the received set of users.

283. The method of aspect 282, further comprising: causing the one or more processors to transmit, from the mobile computing device to the mobile server, the set of user access rights, wherein transmitting the set of user access rights causes the mobile server to update a record in a list database in accordance with the set of user access rights.

284. The method of aspect 283, wherein when the user of the mobile computing device includes a new access right in the set of access rights for a particular user, transmitting the set of user access rights causes the mobile server to generate a notification to a mobile computing device of the particular user.

285. The method of aspect 283, wherein when the user of the mobile computing device includes a new access right in the set of access rights for a particular user, transmitting the set of user access rights causes the mobile server to transmit the set of data values associated with the set of process data items to a mobile computing device of the particular user.

286. The method of aspect 283 further comprising: causing the one or more process to transmit, from the mobile computing device to second mobile computing device corresponding to a second user, a message indicating that the user of the mobile computing has provided an access right to the second user.

287. The method of aspect 253, wherein the selection interface is further configured to include a comments interface wherein users with access to view the list may view comments entered into the comment interface.

288. The method of aspect 253, further comprising: causing the one or more processors to transmit, from the mobile computing device to the mobile server, a user credential corresponding to the user of the mobile computing device.

289. The method of aspect 253, wherein the hierarchical list of available process data items only includes process data items to which the user credential indicates that the user has permission to view.

290. A graphical user interface (GUI), presented within an application executing on a mobile computing device, wherein to present the GUI, the application causes the mobile electronic device to subscribe to a stream of data indicative of field devices or control modules within a process control system, the GUI comprising: a tab selection interface, wherein the tab selection interface provides a selection element that enables a user of the mobile computing device to select a tab of information for display on the GUI; a display region for displaying a list or lists corresponding to the selected tab of information, wherein to populate the list of lists that is displayed in the display region, the application is configured to: send, to a processor of the mobile computing device, a request to generate the GUI, the request including an indication of the list of lists, receive, from the processor of the mobile computing device, a plurality of parameter values wherein a portion of the plurality of parameter values are received at the mobile communication device via the stream of data, and generate a visual representation of lists within the list of lists in the display region, wherein the visual representation of each list within the list of lists includes a summary of a state of the field devices or control modules monitored by the list.

291. The GUI of aspect 290, wherein: the selection element of the tab selection interface is further configured to include an element representative of a watch list tab of information.

292. The GUI of aspect 291, wherein: when the element representative of the watch list tab of information is selected, each of the lists within the list of lists is a watch list.

293. The GUI of aspect 292, wherein: the summary of each watch list within the list of lists includes a number of watch list items within the watch list.

294. The GUI of aspect 292, wherein: the summary of each watch list within the list of lists includes a number of watch list items associated with an abnormal process value for a corresponding process-level parameter.

295. The GUI of aspect 294, further comprising: the visual representation of each watch list in the list of lists including an icon indicative that the list is a watch list; and, when a watch list in the list of lists includes at least one watch list item associated with an abnormal process value for a corresponding process-level parameter, the icon corresponding to the watch list includes a warning indicator.

296. The GUI of aspect 292, wherein when the element representative of the watch list tab of information is selected, the GUI is further configured to: detect a user input on a visual representation of a particular watch list within the displayed list of lists; cause the application to present a watch list GUI representative of the particular watch list.

297. The GUI of aspect 290, wherein: the selection element of the tab selection interface is further configured to include an element representative of an alarm list tab of information.

298. The GUI of aspect 297, wherein: when the element representative of the alarm list tab of information is selected, each of the lists within the list of lists is an alarm list.

299. The GUI of aspect 298, wherein: the visual representation of each alarm list within the list of lists includes an indicator of a particular control module of the process control system monitored by an alarm item of the alarm list.

300. The GUI of aspect 298, wherein: the visual representation of each alarm list within the list of lists further includes an indicator of a highest priority alarm of a particular control module of the process control system monitored by an alarm item of the alarm list.

301. The GUI of aspect 298, wherein: the summary of each alarm list within the list of lists includes a number of alarm items within the alarm list having an active unacknowledged alarm state.

302. The GUI of claim 12, further comprising: the visual representation of each alarm list in the list of lists including an icon indicative that the list is an alarm list; and when an alarm list in the list of lists includes at least one alarm item that has an active alarm state, the icon corresponding to the alarm list includes a priority indicator indicating a priority of the alarm item having the highest priority active alarm.

303. The GUI of aspect 298, wherein: the summary of each alarm list within the list of lists includes a number of alarm items within the alarm list having an inactive unacknowledged alarm state.

304. The GUI of aspect 298, wherein: the summary each alarm list within the list of lists includes a number of alarm items within the alarm list having a suppressed alarm state.

305. The GUI of aspect 297, wherein when the element representative of the alarm list tab of information is selected, the GUI is further configured to: detect a user input on a visual representation of a particular alarm list within the displayed list of lists; cause the application to present an alarm list GUI representative of the particular alarm list.

306. The GUI of aspect 290, wherein: the selection element of the tab selection interface is further configured to include an element representative of an all lists tab of information.

307. The GUI of aspect 306, wherein: when the element representative of the all lists tab of information is selected, the displayed list of lists includes all lists to which a user of the mobile computing device is subscribed.

308. The GUI of aspect 290, wherein each list within the list of lists is classified as either a personal list or a shared list, the GUI further comprising: a shared list toggle element configured such that: when the shared list toggle element is active, the display region includes both a list of personal lists and a list of shared lists, and when the shared list toggle element is inactive, the display region includes only a list of personal lists.

309. The GUI of aspect 290, further comprising: a search interface capable of receiving a search term, wherein, in response to receiving the search term, the list of lists in the display region includes search results found within the configuration data or the stream of data.

310. The GUI of aspect 290, wherein: the selection element of the tab selection interface is further configured to include an element representative of a batch list tab of information.

311. The GUI of aspect 290, wherein: when the element representative of the batch list tab of information is selected, each of the lists within the list of lists is a batch list.

312. The GUI of aspect 290, wherein to generate the GUI, the application is configured to: retrieve a list of lists template file stored in a memory at the mobile computing device; and arrange elements of the GUI in accordance with a layout set forth in the list of lists template file.

313. The GUI of aspect 312, wherein the list of lists template file includes a plurality of parameters to display on the GUI and corresponding locations at which each parameter is located on the GUI.

314. The GUI of aspect 313, wherein: the plurality of parameter values received from the processor of the mobile computing device correspond to the plurality of parameters to display on the GUI; and to generate the GUI, the application sends, to the process of the mobile computing device, a set of instructions that, when executed, cause the mobile computing device to present the plurality of parameter values at the location for the corresponding parameter included in the list of lists template file.

315. A graphical user interface (GUI), presented within an application executing on a mobile computing device, wherein to present the GUI, the application causes the mobile electronic device to subscribe to a stream of data indicative of field devices or control modules within a process control system, the GUI comprising: a display region for displaying a watch list, wherein to populate the watch list that is displayed in the display region, the application is configured to: send, to a processor of the mobile computing device, a request to generate the GUI, the request including an indication of the watch list, receive, from the processor of the mobile computing device, a plurality of parameter values wherein a portion of the plurality of parameter values are received at the mobile communication device via the stream of data, and generate a visual representation of watch list items within the watch list in the display region, wherein the visual representation of each watch list item within the watch list includes an indication of a parameter value monitored by the watch list item.

316. The GUI of aspect 315, wherein to generate the GUI, the application is configured to: retrieve a watch list template file stored in a memory at the mobile computing device; and arrange elements of the GUI in accordance with a template set forth in the watch list template file.

317. The GUI of aspect 316, wherein the template includes a plurality of parameters to display on the GUI and corresponding locations at which each parameter is located on the GUI.

318. The GUI of aspect 317, wherein: the plurality of parameter values received from the processor of the mobile computing device correspond to the plurality of parameters to display on the GUI; and to generate the GUI, the application is configured to: populate the template with the corresponding plurality of parameter values received from the processor of the mobile computing device, and send, to the processor of the mobile computing device, a set of instructions that, when executed, cause the mobile computing device to present the populated template on the GUI.

319. The GUI of aspect 318, wherein to generate a visual representation of each watch list item, the application is configured to: retrieve, from the plurality of parameter values received from the processor of the mobile computing device, a parameter value corresponding to a unit of the parameter value monitored by the watch list; and populate the template with the retrieved parameter value corresponding to a unit of the parameter value monitored by the watch list.

320. The GUI of aspect 318, wherein to generate a visual representation of each watch list item, the application is configured to: retrieve, from the plurality of parameter values received from the processor of the mobile computing device, a parameter value corresponding to a tag of the watch list item; and populate the template with the retrieved parameter value corresponding to the tag of the watch list item.

321. The GUI of aspect 318, wherein to generate a visual representation of each watch list item, the application is configured to: retrieve, from the plurality of parameter values received from the processor of the mobile computing device, a parameter value corresponding to a name of the watch list item; and populate the template with the retrieved parameter value corresponding to the name of the watch list item.

322. The GUI of aspect 318, wherein: the visual representation of each watch list item includes a chart indicating a trend of the parameter value monitored by the watch list item.

323. The GUI of aspect 322, wherein to generate the chart, the application is configure to: retrieve, from the plurality of parameter values received from the processor of the mobile computing device, a set of prior parameter values of the parameter value monitored by the watch list item; and populate the template with the retrieved set of prior parameter values, wherein the template converts the populated set of prior parameter values into the chart.

324. The GUI of aspect 322, wherein: the chart indicating the trend of the parameter value monitored by the watch list item includes a reference line.

325. The GUI of aspect 324, wherein: the reference line is indicative of one of an alarm limit, a set point, an average value of the trend of process values, or a user-defined value.

326. The GUI of aspect 325, wherein to generate the chart, the application is configured to: retrieve, from the plurality of parameter values received from the processor of the mobile computing device, a parameter value corresponding to a reference parameter; and populate the template with the retrieved parameter value corresponding to the reference parameter, wherein the template converts the retrieved parameter value into the reference line.

327. The GUI of aspect 322, wherein: the chart indicating the trend of the parameter value monitored by the watch list item is dynamically updated in response to the mobile computing device receiving additional data within the stream of data.

328. The GUI of aspect 327, wherein to dynamically update the chart, the application is configured to: retrieve, from the additional data, an updated set of prior parameter values of the parameter value monitored by the watch list item; and populate the template with the retrieved updated set of prior parameter values, wherein the template updates the chart to reflect the updated set of prior parameter values.

329. The GUI of aspect 318, wherein: the visual representation of each watch list item includes a status region, the status region including a status icon indicative of a status value associated with the parameter value monitored by the watch list item.

330. The GUI of aspect 329, wherein to generate the status icon for each watch list item, the application is configured to: retrieve, from the plurality of parameter values received from the processor of the mobile computing device, a parameter value corresponding to the status value of the watch list item; and populate the template with the retrieved parameter value corresponding to the status value of the watch list item, wherein the template converts the status value into the status icon.

331. The GUI of aspect 318, wherein: the parameter value monitored by the watch list item is dynamically updated in response to the mobile computing device receiving additional data within the stream of data.

332. The GUI of aspect 331, wherein to dynamically update the parameter, the application is configured to: retrieve, from the additional data, an updated parameter values for the parameter value monitored by the watch list item; and populate the template with the retrieved updated parameter values.

333. The GUI of aspect 318, wherein responsive to the mobile computing device receiving additional data within the stream of data, the application is configured to send, to the processor of the mobile computing device, a set of instructions that, when executed, cause the mobile computing device to present an updated template on the GUI.

334. The GUI of aspect 315, wherein the GUI is further configured to: detect a user input on a visual representation of a particular watch list item; cause the application to present a watch list item detail GUI representative of the particular watch list item.

335. The GUI of aspect 315, further comprising: a search interface capable of receiving a search term, wherein, in response to receiving the search term, the display region includes watch list item search results that include a parameter value that matches the search term.

336. The GUI of aspect 335, wherein the application only searches data stored at the mobile computing device.

337. The GUI of aspect 335, wherein: the search term is indicative of at least one of an index number, a name, or a tag.

338. The GUI of aspect 315, wherein the parameter value monitored by the watch list item is one of a process value, a set point value, or an output value.

339. A graphical user interface (GUI), presented within an application executing on a mobile computing device, wherein to present the GUI, the application causes the mobile electronic device to subscribe to a stream of data indicative of field devices or control modules within a process control system, the GUI comprising: a tab selection interface, wherein the tab selection interface provides a selection element that enables a user of the mobile computing device to select a tab of information for display on the GUI; and a display region for displaying a watch list, wherein to populate the watch list that is displayed in the display region, the application is configured to: send, to a processor of the mobile computing device, a request to generate the GUI, the request including an indication of the watch list, receive, from the processor of the mobile computing device, a plurality of parameter values wherein a portion of the plurality of parameter values are received at the mobile communication device via the stream of data, and generate a visual representation of alarm items within the alarm list in the display region, wherein the visual representation of each alarm item within the alarm list includes an indication of an alarm timer.

340. The GUI of aspect 339, wherein to generate the GUI, the application is configured to: retrieve an alarm list template file stored in a memory at the mobile computing device; and arrange elements of the GUI in accordance with a template set forth in the alarm list template file.

341. The GUI of aspect 340, wherein the template includes a plurality of parameters to display on the GUI and corresponding locations at which each parameter is located on the GUI.

342. The GUI of aspect 341, wherein: the plurality of parameter values received from the processor of the mobile computing device correspond to the plurality of parameters to display on the GUI; and to generate the GUI, the application is configured to: populate the template with the corresponding plurality of parameter values received from the processor of the mobile computing device, and send, to the processor of the mobile computing device, a set of instructions that, when executed, cause the mobile computing device to present the populated template on the GUI.

343. The GUI of aspect 342, wherein to generate a visual representation of each alarm item, the application is configured to: retrieve, from the plurality of parameter values received from the processor of the mobile computing device, a parameter value corresponding to a name of a module monitored by the alarm item; and populate the template with the retrieved parameter value corresponding to the name of the module monitored by the alarm item.

344. The GUI of aspect 342, wherein to generate a visual representation of each alarm item, the application is configured to: retrieve, from the plurality of parameter values received from the processor of the mobile computing device, a parameter value corresponding to a tag of a module monitored by the alarm item; and populate the template with the retrieved parameter value corresponding to the tag of the module monitored by the alarm item.

345. The GUI of aspect 342, wherein: the visual representation of each alarm item includes a priority indicator region, the priority indicator region including a priority icon indicative of a priority value associated with the corresponding alarm item.

346. The GUI of aspect 345, wherein to generate the priority icon for each alarm item, the application is configured to: retrieve, from the plurality of parameter values received from the processor of the mobile computing device, a parameter value corresponding to the priority value of the alarm item; and populate the template with the retrieved parameter value corresponding to the priority value of the watch list item, wherein the template converts the priority value into the priority icon.

347. The GUI of aspect 339, wherein to generate a visual representation of each alarm item, the application is configured to: retrieve, from the plurality of parameter values received from the processor of the mobile computing device, a parameter value corresponding to an alarm type of a module monitored by the alarm item; and populate the template with the retrieved parameter value corresponding to the tag of the module monitored by the alarm item.

348. The GUI of aspect 342, wherein: the selection element of the tab selection interface is further configured to include an element representative of an annunciated alarms tab of information.

349. The GUI of aspect 348, wherein when the element representative of the annunciated alarms tab of information is selected, the application is configured to only generate visual representations of alarm items that have been annunciated.

350. The GUI of aspect 349, wherein to generate the alarm timer within the visual representation of each alarm item, the application is configured to: retrieve, from the plurality of parameter values received from the processor of the mobile computing device, a parameter value corresponding to an amount of time since the alarm item was annunciated; and populate the template with the retrieved parameter value corresponding to the amount of time since the alarm item was annunciated.

351. The GUI of aspect 349, further comprising: an alarm list summary including at least one of an indication of a number of active unacknowledged alarms within the alarm list or an indication of a number of inactive unacknowledged alarms within the alarm list.

352. The GUI of aspect 342, wherein: the selection element of the tab selection interface is further configured to include an element representative of a suppressed alarms tab of information.

353. The GUI of aspect 352, wherein when the element representative of the suppressed alarms tab of information is selected, the application is configured to only generate visual representations of alarm items that have been suppressed.

354. The GUI of aspect 353, wherein to generate the alarm timer within the visual representation of each alarm item, the application is configured to: retrieve, from the plurality of parameter values received from the processor of the mobile computing device, a parameter value corresponding to an amount of time since the alarm item was suppressed; and populate the template with the retrieved parameter value corresponding to the amount of time since the alarm item was suppressed.

355. The GUI of aspect 353, further comprising: an alarm list summary including at least one of an indication of a number of suppressed alarms within the alarm list or an indication of a number of out-of-service (OOS) alarms within the alarm list 356. The GUI of aspect 342, wherein: the visual representation of each alarm item is dynamically updated in response to the mobile computing device receiving additional data within the stream of data.

357. The GUI of aspect 356, wherein to dynamically update the visual representation of each alarm item, the application is configured to: retrieve, from the additional data, an updated parameter values corresponding to the alarm item; and populate the template with the retrieved updated parameter values.

358. The GUI of aspect 342, wherein responsive to the mobile computing device receiving additional data within the stream of data, the application is configured to send, to the processor of the mobile computing device, a set of instructions that, when executed, cause the mobile computing device to present an updated template on the GUI.

359. The GUI of aspect 339, wherein the GUI is further configured to: detect a user input on a visual representation of a particular alarm item; cause the application to present an alarm item detail GUI representative of the particular alarm item.

360. The GUI of aspect 339, further comprising: a search interface capable of receiving a search term, wherein, in response to receiving the search term, the display region includes alarm item search results that include a parameter value that matches the search term.

361. The GUI of aspect 360, wherein the application only searches data stored at the mobile computing device.

362. The GUI of aspect 360, wherein: the search term is indicative of at least one of an index number, a name, or a tag.

363. A graphical user interface (GUI), presented within an application executing on a mobile computing device, wherein to present the GUI, the application causes the mobile electronic device to subscribe to a stream of data indicative of field devices or control modules within a process control system, the GUI comprising: an identification display region configured to display information identifying a watch list item; a current parameter value display region, configured to display one or more parameter values corresponding to one or more parameters monitored by the watch list item; a historical parameter value display region, configured to display a graphical depiction of historical values for the one or more parameters; and wherein to populate the display regions, the application is configured to: send, to a processor of the mobile computing device, a request to generate the GUI, the request including an indication of the watch list item, and receive, from the processor of the mobile computing device, a plurality of parameter values wherein a portion of the plurality of parameter values are received at the mobile communication device via the stream of data.

364. The GUI of aspect 363, wherein to generate the GUI, the application is configured to: retrieve a watch list item template file stored in a memory at the mobile computing device; and arrange elements of the GUI in accordance with a template set forth in the watch list item template file.

365. The GUI of aspect 364, wherein the template includes a plurality of parameters to display on the GUI and corresponding locations at which each parameter is located on the GUI.

366. The GUI of aspect 365, wherein: the plurality of parameter values received from the processor of the mobile computing device correspond to the plurality of parameters to display on the GUI; and to generate the GUI, the application is configured to: populate the template with the corresponding plurality of parameter values received from the processor of the mobile computing device, and send, to the processor of the mobile computing device, a set of instructions that, when executed, cause the mobile computing device to present the populated template on the GUI.

367. The GUI of aspect 366, wherein to generate the identification display region, the application is configured to: retrieve, from the plurality of parameter values received from the processor of the mobile computing device, a parameter value corresponding to a name of the watch list item; and populate the template with the retrieved parameter value corresponding to the name of the watch list item.

368. The GUI of aspect 366, wherein to generate the identification display region, the application is configured to: retrieve, from the plurality of parameter values received from the processor of the mobile computing device, a parameter value corresponding to a tag of the watch list item; and populate the template with the retrieved parameter value corresponding to the tag of the watch list item.

369. The GUI of aspect 366, wherein to generate the identification display region, the application is configured to: retrieve, from the plurality of parameter values received from the processor of the mobile computing device, a parameter value corresponding to a path within a control hierarchy at which runtime data monitored by the watch list is maintained; and populate the template with the retrieved path within a control hierarchy at which runtime data monitored by the watch list is maintained.

370. The GUI of aspect 366, wherein: the one or more values displayed in the current parameter value display region includes a process value for the watch list item.

371. The GUI of aspect 370, wherein to generate the current parameter value display region, the application is configured to: retrieve, from the plurality of parameter values received from the processor of the mobile computing device, a parameter value corresponding to the process value for the watch list item; and populate the template with the retrieved parameter value corresponding to the process value for the watch list item.

372. The GUI of aspect 366, wherein: the one or more values displayed in the current parameter value display region includes an output value for the watch list item.

373. The GUI of aspect 372, wherein to generate the current parameter value display region, the application is configured to: retrieve, from the plurality of parameter values received from the processor of the mobile computing device, a parameter value corresponding to the output value for the watch list item; and populate the template with the retrieved parameter value corresponding to the output value for the watch list item.

374. The GUI of aspect 366, wherein: the one or more values displayed in the current parameter value display region includes a set point value for the watch list item.

375. The GUI of aspect 374, wherein to generate the current parameter value display region, the application is configured to: retrieve, from the plurality of parameter values received from the processor of the mobile computing device, a parameter value corresponding to the set point value for the watch list item; and populate the template with the retrieved parameter value corresponding to the set point value for the watch list item.

376. The GUI of aspect 366, wherein to generate the current value display region, the application is configured to: retrieve, from the plurality of parameter values received from the processor of the mobile computing device, a parameter value corresponding to a scale for the graphical depiction of historical values for the watch list item; and populate the template with the retrieved scale for the graphical depiction of historical values for the watch list item.

377. The GUI of aspect 366, wherein to generate the historical parameter value display region, the application is configured to: retrieve, from the plurality of parameter values received from the processor of the mobile computing device, a set of historical process parameter values for a process value monitored by the watch list item; and populate the template with the retrieved set of historical process parameter values, wherein the template includes the populated set of historical process parameter values in the graphical depiction of historical values.

378. The GUI of aspect 366, wherein to generate the historical parameter value display region, the application is configured to: retrieve, from the plurality of parameter values received from the processor of the mobile computing device, a set of historical output parameter values for an output value monitored by the watch list item; and populate the template with the retrieved set of historical output parameter values, wherein the template includes the populated set of historical output parameter values in the graphical depiction of historical values.

379. The GUI of aspect 366, wherein to generate the historical parameter value display region, the application is configured to: retrieve, from the plurality of parameter values received from the processor of the mobile computing device, a set of historical set point parameter values for an set point value monitored by the watch list item; and populate the template with the retrieved set of historical set point parameter values, wherein the template includes the populated set of historical set point parameter values in the graphical depiction of historical values.

380. The GUI of aspect 366, further comprising: a condition status display region configured to display indications identifying a condition associated with the watch list item.

381. The GUI of aspect 380, wherein to generate the condition status display region, the application is configured to: retrieve, from the plurality of parameter values received from the processor of the mobile computing device, a parameter value corresponding to a status value of the watch list item; and populate the template with the retrieved parameter value corresponding to the status value of the watch list item.

382. The GUI of aspect 363, wherein: the one or more values displayed in the current parameter value display region are dynamically updated in response to the mobile computing device receiving additional process-level data within the stream of process-level data.

383. The GUI of aspect 366, wherein responsive to the mobile computing device receiving additional data within the stream of data, the application is configured to send, to the processor of the mobile computing device, a set of instructions that, when executed, cause the mobile computing device to present an updated template on the GUI.

384. The GUI of aspect 383, wherein the updated template is populated with updated parameter values for parameters displayed in at least one of current parameter value display region or the historical parameter value display region.

385. The GUI of aspect 366, wherein the application is further configured to detect an orientation of the mobile communication device.

386. The GUI of aspect 385, wherein: the populated template is selected from a choice of templates including a portrait mode template and a landscape mode template; the application selects the portrait mode template when the application detects that the mobile communication device is in a portrait mode orientation; and the application selects the landscape mode template when the application detects that the mobile communication device is in a landscape mode orientation 387. The GUI of aspect 386, wherein the landscape mode template does not include the identification display region.

388. The GUI of aspect 386, wherein the landscape mode template includes a larger historical parameter value display region than the portrait mode template.

389. The GUI of aspect 364, wherein the landscape mode template includes a smaller current parameter value display region than the portrait mode template.

390. A graphical user interface (GUI), presented within an application executing on a mobile computing device, wherein to present the GUI, the application causes the mobile electronic device to subscribe to a stream of data indicative of field devices or control modules within a process control system, the GUI comprising: an identification display region configured to display information identifying an alert item; an alarm timer display region configured to display an alarm timer; a historical parameter value display region, configured to display a graphical depiction of historical values for a process value corresponding to the alarm item; a response display region configured to display information relating to a response to the alarm item; and wherein to populate the display regions, the application is configured to: send, to a processor of the mobile computing device, a request to generate the GUI, the request including an indication of the alarm item, and receive, from the processor of the mobile computing device, a plurality of parameter values wherein a portion of the plurality of parameter values are received at the mobile communication device via the stream of data.

391. The GUI of aspect 390, wherein to generate the GUI, the application is configured to: retrieve an alarm item template file stored in a memory at the mobile computing device; and arrange elements of the GUI in accordance with a template set forth in the alarm item template file.

392. The GUI of aspect 391, wherein the template includes a plurality of parameters to display on the GUI and corresponding locations at which each parameter is located on the GUI.

393. The GUI of aspect 392, wherein: the plurality of parameter values received from the processor of the mobile computing device correspond to the plurality of parameters to display on the GUI; and to generate the GUI, the application is configured to: populate the template with the corresponding plurality of parameter values received from the processor of the mobile computing device, and send, to the processor of the mobile computing device, a set of instructions that, when executed, cause the mobile computing device to present the populated template on the GUI.

394. The GUI of aspect 393, wherein to generate the identification display region, the application is configured to: retrieve, from the plurality of parameter values received from the processor of the mobile computing device, a parameter value corresponding to a name of the alarm item; and populate the template with the retrieved parameter value corresponding to the name of the alarm item.

395. The GUI of aspect 393, wherein to generate the identification display region, the application is configured to: retrieve, from the plurality of parameter values received from the processor of the mobile computing device, a parameter value corresponding to a tag of the alarm item; and populate the template with the retrieved parameter value corresponding to the tag of the alarm item.

396. The GUI of aspect 393, wherein to generate the identification display region, the application is configured to: retrieve, from the plurality of parameter values received from the processor of the mobile computing device, a parameter value corresponding to a description of the alarm item; and populate the template with the retrieved parameter value corresponding to the description of the alarm item.

397. The GUI of aspect 393, wherein to generate the identification display region, the application is configured to: retrieve, from the plurality of parameter values received from the processor of the mobile computing device, a parameter value corresponding to a functional classification of the alarm item; and populate the template with the retrieved parameter value corresponding to the functional classification of the alarm item.

398. The GUI of aspect 393, wherein to generate the identification display region, the application is configured to: retrieve, from the plurality of parameter values received from the processor of the mobile computing device, a parameter value corresponding to a priority value of the alarm item; and populate the template with the retrieved parameter value corresponding to the priority value of the watch list item, wherein the template converts the priority value into a priority icon.

399. The GUI of aspect 393, wherein to generate the historical parameter value display region, the application is configured to: retrieve, from the plurality of parameter values received from the processor of the mobile computing device, a parameter value corresponding to an alarm limit of the alarm item; and populate the template with the retrieved parameter value corresponding to the alarm limit, wherein the template includes the alarm limit in the graphical depiction of historical values.

400. The GUI of aspect 393, wherein to generate the historical parameter value display region, the application is configured to: retrieve, from the plurality of parameter values received from the processor of the mobile computing device, a set of historical process values for a process value corresponding to the alarm item; and populate the template with the retrieved set of historical process values, wherein the template includes the populated set of historical process values in the graphical depiction of historical values.

401. The GUI of aspect 393, wherein to generate the response display region, the application is configured to: retrieve, from the plurality of parameter values received from the processor of the mobile computing device, a parameter value corresponding to a consequence of inaction for failing to respond to the alarm item; and populate the template with the retrieved parameter value corresponding to the consequence of inaction for failing to respond to the alarm item.

402. The GUI of aspect 393, wherein to generate the response display region, the application is configured to: retrieve, from the plurality of parameter values received from the processor of the mobile computing device, a parameter value corresponding to a recommended action to respond to the alarm item; and populate the template with the retrieved parameter value corresponding to the recommended action to respond to the alarm item.

403. The GUI of aspect 393, wherein the application is configured to identify that the alarm item is an annunciated alarm or a suppressed alarm.

404. The GUI of aspect 403, wherein when the alarm item is identified as an annunciated alarm, to generate the alarm timer display region, the application is configured to: retrieve, from the plurality of parameter values received from the processor of the mobile computing device, a parameter value corresponding to a time when the alarm item was annunciated; and populate the template with the retrieved parameter value corresponding to the time when the alarm item was annunciated.

405. The GUI of aspect 403, wherein when the alarm item is identified as an annunciated alarm, to generate the alarm timer display region, the application is configured to: retrieve, from the plurality of parameter values received from the processor of the mobile computing device, a parameter value corresponding to a time since the alarm item was annunciated; and populate the template with the retrieved parameter value corresponding to the time since the alarm item was annunciated.

406. The GUI of aspect 403, wherein when the alarm item is identified as a suppressed alarm, to generate the alarm timer display region, the application is configured to: retrieve, from the plurality of parameter values received from the processor of the mobile computing device, a parameter value corresponding to a time when the alarm item was suppressed; and populate the template with the retrieved parameter value corresponding to the time when the alarm item was suppressed.

407. The GUI of aspect 403, wherein when the alarm item is identified as a suppressed alarm, to generate the alarm timer display region, the application is configured to: retrieve, from the plurality of parameter values received from the processor of the mobile computing device, a parameter value corresponding to a time since the alarm item was suppressed; and populate the template with the retrieved parameter value corresponding to the time since the alarm item was suppressed.

408. The GUI of aspect 403, wherein when the alarm item is identified as an annunciated alarm, to generate the response display region, the application is configured to: retrieve, from the plurality of parameter values received from the processor of the mobile computing device, a parameter value corresponding to a time frame to respond to the alarm item; and populate the template with the retrieved parameter value corresponding to the time frame to respond to the alarm item.

409. The GUI of aspect 408, wherein the response display region includes a timer that represents a difference between a time that the alarm item was announced and the retrieved time frame to respond to the alarm item.

410. The GUI of aspect 403, wherein when the alarm item is identified as a suppressed alarm, to generate the response display region, the application is configured to: retrieve, from the plurality of parameter values received from the processor of the mobile computing device, a parameter value corresponding to a reason why the alarm item was suppressed; and populate the template with the retrieved parameter value corresponding to the reason why the alarm item was suppressed.

411 The GUI of aspect 410, wherein the response display region includes a timer that represents an amount of time that has elapsed since a time that the alarm item has been suppressed.

412. A method of generating a GUI, presented within an application executing on a mobile computing device, for displaying a view list related to a process control system of a process plant, the method comprising: receiving, from the application, a request to generate a GUI corresponding to the view list, the request indicating the view list, wherein the view list corresponds to a view list template including runtime parameters and non-runtime parameters; sending, from the mobile computing device to a mobile server via a communication network, a request to retrieve data maintained at the mobile server that corresponds to the view list, wherein the request subscribes the mobile computing device to a stream of view list data values including runtime parameters values corresponding to the runtime parameters within the view list template; receiving, at the mobile computing device from the mobile server via the communication network, a plurality of non-runtime parameter values corresponding to the non-runtime parameters within the view list template; receiving, at the mobile computing device from the mobile server via the communication network, the stream of view list data values; providing, to the application and by one or more processors, (i) the runtime parameter values received in the stream of view list data values, and (ii) the received non-runtime parameters values for display by the GUI.

413. The method of aspect 412, wherein providing parameter values to the application causes the application to generate the GUI such that the parameter values are displayed at a location indicated in the view list template.

414. The method of aspect 413, wherein generating the GUI further comprises: receiving, from the application, a set of instructions that, when executed by the one or more processors, cause the GUI to be presented by the mobile computing device.

415. The method of aspect 412, wherein receiving the stream of view list data values further comprises: periodically receiving, at the mobile computing device from the mobile server via the communication network, updated runtime parameter values within the stream of view list data values.

416. The method of aspect 415, further comprising: responsive to receiving the updated runtime parameter values, providing, to the application, the updated runtime parameters for display by the GUI.

417. The method of aspect 412, wherein receiving the stream of view list data values further comprises: aperiodically receiving, at the mobile computing device from the mobile server via the communication network, updated non-runtime parameter values within the stream of view list data values.

418. The method of aspect 417, further comprising: responsive to receiving the updated non-runtime parameter values, providing, to the application, the updated non-runtime parameters for display by the GUI.

419. The method of aspect 412, wherein sending the request to retrieve data maintained at the mobile server further comprises: formatting, by the one or more processors, the request to request to retrieve data maintained at the mobile server in accordance with an application program interface (API) of the mobile server.

420. The method of aspect 412, wherein the stream of view list data values includes a plurality of data values that are not historical data values.

421. The method of aspect 412, wherein the stream of view list data values includes a plurality of historical values for a particular view list parameter.

422. The method of aspect 421, wherein the plurality of historical values are maintained by a data historian interconnected with the mobile server.

423. The method of aspect 412, wherein the view list is at least one of the following: a watch list, an alarm list, a batch list, or a list of lists.

424. The method of aspect 423, wherein when the view list is a list of lists, sending the request to retrieve data maintained at the mobile server that corresponds to the view list further comprises: sending, from the mobile computing device to a mobile server via the communication network, a request to retrieve data maintained at the mobile server that corresponds to each list within the list of lists.

425. The method of aspect 424, further comprising: caching, by the one or more processors, a portion of the runtime parameter values and the non-runtime parameter values received from the mobile server.

426. The method of aspect 425, further comprising: receiving, from the application, an indication that a user has selected the particular list from the list of lists; retrieving, by the one or more processors, a view list template corresponding to the particular list; and providing, to the application and from the cached portion of the runtime parameter values and the non-runtime parameter values, parameter values corresponding to the view list template corresponding to the particular list.

427. The method of aspect 412, further comprising: receiving, from the application, an indication that a user has attempted to log into the application.

428. The method of aspect 427, further comprising: sending, from the mobile computing device to the mobile server via the communication network, an authentication message requesting that the mobile server authorizes the mobile device to receive process data corresponding to the process control system.

429. The method of aspect 412, further comprising: receiving, from the application, an indication that the application is no longer presenting the GUI.

430. The method of aspect 429, further comprising: sending, from the mobile computing device to the mobile server via the communication network, an unsubscribe message requesting that the mobile server unsubscribes that mobile device from the stream of view list data values.

431. The method of aspect 429, wherein the indication that the application is no longer presenting the GUI includes a request to generate a second GUI corresponding to a second view list.

432. The method of aspect 431, further comprising: sending, from the mobile computing device to a mobile server via a communication network, a request to retrieve data maintained at the mobile server that corresponds to the second view list.

433. A non-transitory computer-readable storage medium storing instructions operable, when executed by a processor in a mobile computing device, to cause the mobile computing device to execute a method, the method comprising: receiving, from the application, a request to generate a GUI corresponding to the view list, the request indicating the view list, wherein the view list corresponds to a view list template including runtime parameters and non-runtime parameters; sending, from the mobile computing device to a mobile server via a communication network, a request to retrieve data maintained at the mobile server that corresponds to the view list, wherein the request subscribes the mobile computing device to a stream of view list data values including runtime parameters values corresponding to the runtime parameters within the view list template; receiving, at the mobile computing device from the mobile server via the communication network, a plurality of non-runtime parameter values corresponding to the non-runtime parameters within the view list template; receiving, at the mobile computing device from the mobile server via the communication network, the stream of view list data values; providing, to the application and by one or more processors, (i) the runtime parameter values received in the stream of view list data values, and (ii) the received non-runtime parameters values for display by the GUI.

434. The computer-readable storage medium of aspect 433, wherein providing parameter values to the application causes the application to generate the GUI such that the parameter values are displayed at a location indicated in the view list template.

435. The computer-readable storage medium of aspect 434, wherein to generate the GUI, the method executed by the processor further comprises: receiving, from the application, a set of instructions that, when executed by the one or more processors, cause the GUI to be presented by the mobile computing device.

436. The computer-readable storage medium of aspect 433, wherein to receive the stream of view list data values, the method executed by the processor further comprises: periodically receiving, at the mobile computing device from the mobile server via the communication network, updated runtime parameter values within the stream of view list data values.

437. The computer-readable storage medium of aspect 436, wherein the method executed by the processor further comprises: responsive to receiving the updated runtime parameter values, providing, to the application, the updated runtime parameters for display by the GUI.

438. The computer-readable storage medium of aspect 433, wherein to receive the stream of view list data values, the method executed by the processor further comprises: aperiodically receiving, at the mobile computing device from the mobile server via the communication network, updated non-runtime parameter values within the stream of view list data values.

439. The computer-readable storage medium of aspect 438, wherein the method executed by the processor further comprises: responsive to receiving the updated non-runtime parameter values, providing, to the application, the updated non-runtime parameters for display by the GUI.

440. The computer-readable storage medium of aspect 433, wherein to send the request to retrieve data maintained at the mobile server, the method executed by the processor further comprises: formatting, by the one or more processors, the request to request to retrieve data maintained at the mobile server in accordance with an application program interface (API) of the mobile server.

441. The computer-readable storage medium of aspect 433, wherein the stream of view list data values includes a plurality of data values that are not historical data values.

442. The computer-readable storage medium of aspect 433, wherein the stream of view list data values includes a plurality of historical values for a particular view list parameter.

443. The computer-readable storage medium of aspect 442, wherein the plurality of historical values are maintained by a data historian interconnected with the mobile server.

444. The computer-readable storage medium of aspect 433, wherein the view list is at least one of the following: a watch list, an alarm list, a batch list, or a list of lists.

445. The computer-readable storage medium of aspect 444, wherein when the view list is a list of lists, to send the request to retrieve data maintained at the mobile server that corresponds to the view list, the method executed by the processor further comprises: sending, from the mobile computing device to a mobile server via the communication network, a request to retrieve data maintained at the mobile server that corresponds to each list within the list of lists.

446. The computer-readable storage medium of aspect 445, wherein the method executed by the processor further comprises: determining, by the one or more processors, that the view list template for the list of lists excludes a portion of the data corresponding to a particular list within the list of lists; and caching, by the one or more processors, the excluded portion of the data corresponding to the particular list.

447. The computer-readable storage medium of aspect 446, wherein the method executed by the processor further comprises: receiving, from the application, an indication that a user has selected the particular list from the list of lists; retrieving, by the one or more processors, a view list template corresponding to the particular list; determining, by the one or more processors, that the view list template corresponding to the particular list includes a set of parameters not included in the view list template for the list of lists; and providing, to the application and from the cached excluded portion of the data, parameter values corresponding to the set of parameters not included in the view list template for the list of lists.

448. The computer-readable storage medium of aspect 433, wherein the method executed by the processor further comprises: receiving, from the application, an indication that a user has attempted to log into the application.

449. The computer-readable storage medium of aspect 448, wherein the method executed by the processor further comprises: sending, from the mobile computing device to the mobile server via the communication network, an authentication message requesting that the mobile server authorizes the mobile device to receive process data corresponding to the process control system.

450. The computer-readable storage medium of aspect 433, wherein the method executed by the processor further comprises: receiving, from the application, an indication that the application is no longer presenting the GUI.

451. The computer-readable storage medium of aspect 450, wherein the method executed by the processor further comprises: sending, from the mobile computing device to the mobile server via the communication network, an unsubscribe message requesting that the mobile server unsubscribes that mobile device from the stream of view list data values.

452. The computer-readable storage medium of aspect 450, wherein the indication that the application is no longer presenting the GUI includes a request to generate a second GUI corresponding to a second view list.

453. The computer-readable storage medium of aspect 452, wherein the method executed by the processor further comprises: sending, from the mobile computing device to a mobile server via a communication network, a request to retrieve data maintained at the mobile server that corresponds to the second view list.

What is claimed:

1. A system for securely disseminating information relating to a process control plant, the system comprising:
    a process control node of a distributed control system (DCS) comprising (i) a plurality of process control field devices including valves and/or valve positioners, controlling a continuous or batch production process in the process control plant, (ii) a controller, coupled to the plurality of process control field devices, the process control node further comprising a communicator module transmitting, via a first network, information of the process plant received from the controller, and (iii) a file interface module that transports configuration information from the process control node to a data services module, the configuration information comprising information specifying the configuration of the process control plant;
    the data services module receiving from the communicator module, via the first network, the information of the process plant and transmitting some or all of that information via a second network;

an indexing routine operating in the data services module, the indexing routine performing indexing operations on the configuration information to produce a searchable index to support searching operations performed by a mobile server; and the mobile server, coupled to the second network, and receiving from the data services module the some or all of the information of the process plant transmitted via the second network, the mobile server coupled to a third network and:

communicating with a plurality of mobile computing devices via the third network;

transmitting to each of the plurality of mobile computing devices, via the third network, a list, derived from a configuration file provided to the controller, of a set of alarms, process control parameters, and notifications of the process control system that are available to be transmitted in real-time as a data stream to the mobile computing devices;

receiving from each of the mobile computing devices an indication of a selection, from the set of alarms, process control parameters, and notifications of the process control system, of at least a plurality of process control parameters to be transmitted to the respective mobile computing device from the mobile server in real-time as the data stream; and in response to the received selections, transmitting to each of the mobile computing devices, in real-time as the data stream, at least data of the selected plurality of process control parameters according to the selection received from the respective mobile computing device.

2. A system according to claim 1, further comprising (i) a communication firewall disposed between the communicator module and the data services module, (ii) a communication firewall disposed between the first network and the second network, and/or (iii) a communication firewall disposed between the second network and the third network.

3. A system according to claim 1, wherein the mobile server further receives a list of selected alarms to be transmitted in real-time as part of the data stream to one or more of the mobile computing devices, and transmits to the one or more mobile computing devices, the data stream including the selected alarms.

4. A system according to claim 1, wherein the third network comprises a mobile telephony network or the Internet.

5. A system according to claim 1, wherein the mobile server sends system-level notifications to all of the plurality of mobile computing devices, and user-level notifications to specific ones of the mobile computer devices according to user preferences associated with each of the specific ones of the mobile computing devices.

6. A system according to claim 1, wherein the configuration information comprises data specifying physical and logical relationships between process entities in the process control plant.

7. A system according to claim 1, wherein the mobile server receives search queries from individual ones of the mobile computing devices, and identifies and retrieves information related to notifications, alarms, devices, control modules, and/or process control parameters according to the search queries using the searchable index.

8. A system according to claim 1, wherein the mobile server receives runtime values from the communicator module, and forwards the specific ones of the received runtime values to specific ones of the mobile computing devices subscribed to the specific ones of the received runtime values.

9. A system according to claim 1, wherein:
the information of the process control plant includes display graphics displayed on one or more workstations in the process control plant,
the display graphics are communicated to the mobile server, and
the mobile server communicates the display graphics to mobile computing devices with corresponding data of selected process control parameters.

10. A system according to claim 1, wherein the mobile server maintains a plurality of lists, each list corresponding to a set of items to which at least one of the mobile computing devices is subscribed, and each list including one or more of: a set of processes, a set of equipment, a set of alarms, a set of process values, a set of key performance indicators, and/or a set of batches.

11. A system according to claim 10, wherein the mobile server receives, from the mobile computing devices, customized lists to be added to the plurality of lists.

12. A system according to claim 10, wherein the mobile server receives, via a web page interface, customized lists to be added to the plurality of lists.

13. A mobile server, coupled to a first network and receiving from the first network information about a process control system, and to a second network coupled to a plurality of mobile computing devices, the mobile server operable to receive data from a data services module, the mobile server:

receiving from the data services module a searchable index generated from configuration information of the process plant;

receiving from each of the mobile computing devices, via the third network, a search query;

transmitting to each of the plurality of mobile computing devices, via the third network, a list, in response to the search query, of a set of alarms, process control parameters, and notifications of the process control system that are available to be transmitted in real-time as a data stream to the mobile computing devices;

receiving from each of the mobile computing devices a selection from the set of alarms, process control parameters, and notifications of the process control system of at least a plurality of process control parameters to be transmitted to the respective mobile computing device from the mobile server in real-time as the data stream; and in response to the received selections, transmitting to each of the mobile computing devices, in real-time as the data stream, at least data of the selected process control parameters according to the selection received from the respective mobile computing device, wherein the process control parameters are generated within a process control node of a distributed control system (DCS) comprising (i) a plurality of process control field devices including valves and/or valve positions, operable to control a continuous or batch production process in the process control plant, and (ii) a controller, coupled to the plurality of process control field devices.

14. A mobile server according to claim 13, wherein the mobile server further receives a list of selected alarms to be transmitted in real-time as part of the data stream to one or more of the mobile computing devices, and transmits to the one or more mobile computing devices, the data stream including the selected alarms.

15. A mobile server according to claim 13, wherein the mobile server sends system-level notifications to all of the plurality of mobile computing devices, and user-level notifications to specific ones of the mobile computer devices according to user preferences associated with each of the specific ones of the mobile computing devices.

16. A mobile server according to claim 13, wherein the mobile server receives runtime values from a communicator module operable to transmit information of a process plant received from a controller, and forwards specific received runtime values to specific ones of the mobile computing devices subscribed to the specific ones of the received runtime values.

17. A mobile server according to claim 13, wherein the mobile server maintains a plurality of lists, each list corresponding to a set of items to which at least one of the mobile computing devices is subscribed, and each list including one or more of: a set of processes, a set of equipment, a set of alarms, a set of process values, a set of key performance indicators, and/or a set of batches.

18. A mobile server according to claim 17, wherein the mobile server receives, from the mobile computing devices, customized lists to be added to the plurality of lists.

19. A mobile server according to claim 17, wherein the mobile server receives, via a web page interface, customized lists to be added to the plurality of lists.

* * * * *